United States Patent [19]

Imai et al.

[11] Patent Number: 5,408,153
[45] Date of Patent: Apr. 18, 1995

[54] INDEX POSITION DETECTING APPARATUS FOR AN ELECTROMAGNETIC ROTARY MACHINE

[75] Inventors: Yasuaki Imai, Chichibu; Toru Okada, Kumagaya, both of Japan

[73] Assignee: Canon Denshi Kabushiki Kaisha, Saitama, Japan

[21] Appl. No.: 280,380

[22] Filed: Jul. 26, 1994

Related U.S. Application Data

[63] Continuation of Ser. No. 907,140, Jul. 1, 1992, abandoned.

[30] Foreign Application Priority Data

| Jul. 5, 1991 | [JP] | Japan | 3-165545 |
| Aug. 20, 1991 | [JP] | Japan | 3-208060 |
| Aug. 20, 1991 | [JP] | Japan | 3-208061 |
| Sep. 17, 1991 | [JP] | Japan | 3-236035 |
| Sep. 17, 1991 | [JP] | Japan | 3-236036 |
| Sep. 18, 1991 | [JP] | Japan | 3-237645 |
| Sep. 27, 1991 | [JP] | Japan | 3-248914 |
| Jan. 10, 1992 | [JP] | Japan | 4-003187 |
| Jan. 10, 1992 | [JP] | Japan | 4-003188 |
| Jan. 23, 1992 | [JP] | Japan | 4-010272 |

[51] Int. Cl.⁶ ............... H02K 11/00; H02K 21/12; G05B 11/01; G05B 19/29
[52] U.S. Cl. ............... 310/68 B; 310/156; 318/560; 318/603
[58] Field of Search ............... 310/68 B, 156, DIG. 3, 310/DIG. 6; 318/560, 561, 603, 138

[56] References Cited

U.S. PATENT DOCUMENTS

| 3,764,869 | 10/1973 | Woodbury | 318/138 |
| 4,093,897 | 6/1978 | Fujita et al. | 318/138 |
| 4,668,900 | 5/1987 | Tabuchi | 318/603 |
| 4,680,515 | 7/1987 | Crook | 318/138 |
| 4,706,005 | 11/1987 | Iwako | 318/603 |
| 4,710,683 | 12/1987 | Bahn et al. | 318/138 |
| 4,922,175 | 5/1990 | Sugiura et al. | 318/603 |
| 4,924,161 | 5/1990 | Ueki et al. | 318/567 |
| 5,004,965 | 4/1991 | Otokawa et al. | 318/138 |
| 5,036,264 | 7/1991 | Ueki | 318/138 |
| 5,101,148 | 3/1992 | Yamashita et al. | 318/603 |

*Primary Examiner*—Steven L. Stephan
*Assistant Examiner*—Clayton E. LaBalle
*Attorney, Agent, or Firm*—Spencer, Frank & Schneider

[57] ABSTRACT

An electric rotary machine which prevents problems involved in leakage flux, and reduces the number of components so that it becomes thin and small in size, and inexpensive. The machine includes a first pulse generating device generating a first frequency generating signal consisting of P1 uniformly spaced pulses per one revolution of the rotor by detecting a counterelectromotive voltage induced in a rotary magnetic field generating device while a driving magnet is rotating, a magnetic body producing magnetic flux during rotation of the rotor, a second pulse generating device generating a second frequency generating signal consisting of P2 uniformly spaced pulses per one revolution of the rotor by detecting changes in the magnetic flux of the magnetic body, and an index position detecting circuit generating an index signal on the basis of a periodic phase difference between the first and second frequency generating signals. The numbers of poles of the driving magnet and the magnetic body are set so that the greatest common divisor of the pulse numbers P1 and P2 become an integer m.

58 Claims, 62 Drawing Sheets

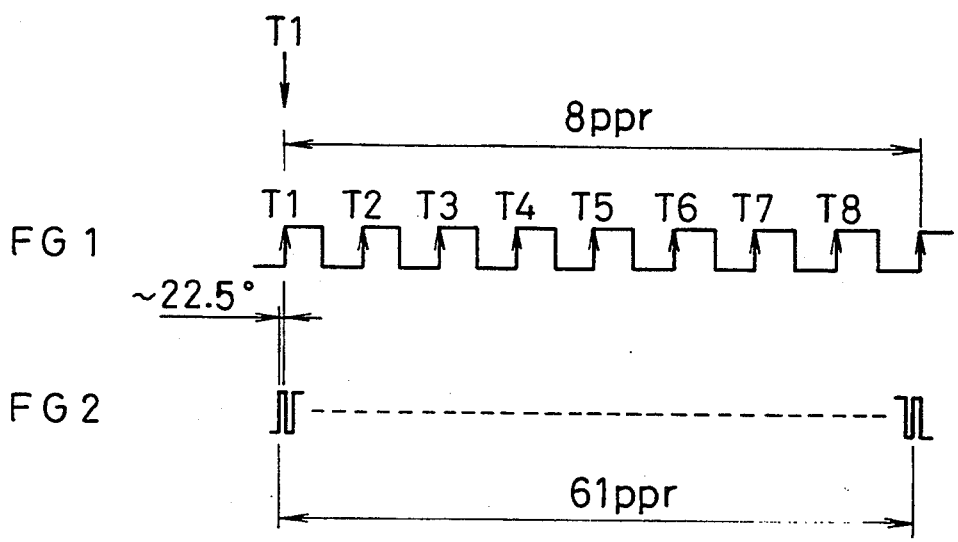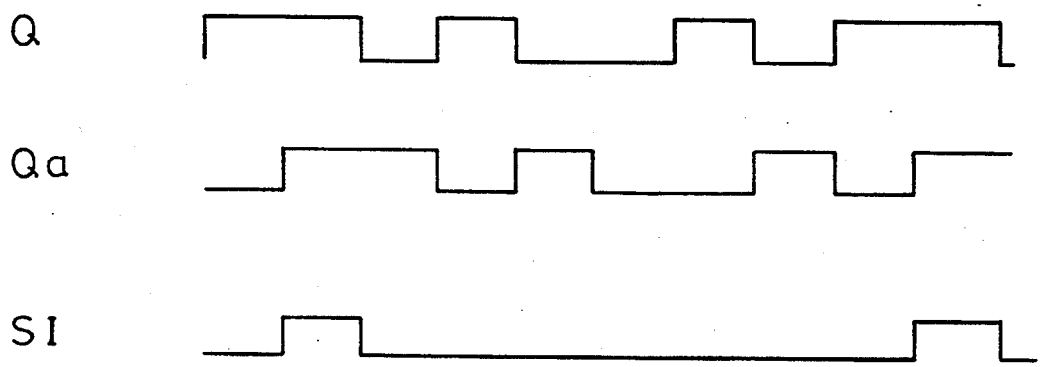
FIG.14

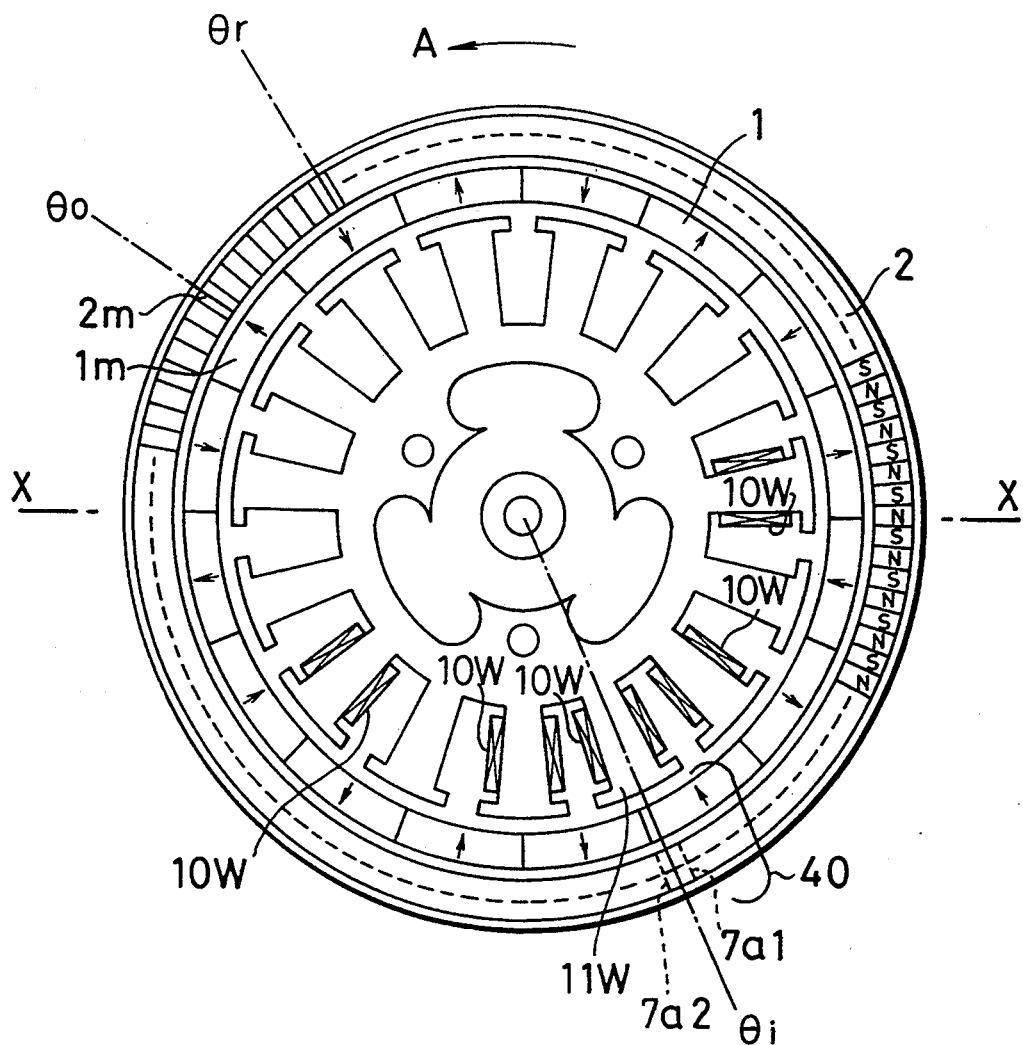
FIG.17
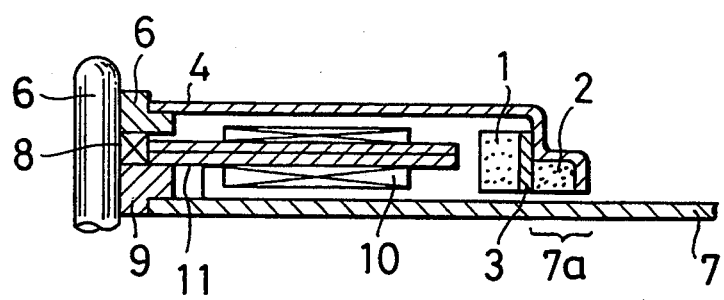
FIG.18

COIL 10U 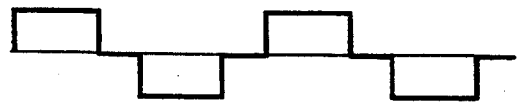
COIL 10V 
COIL 10W 
FIG.20
COIL 10U 
COIL 10V 
COIL 10W 
FG 1 
FIG.21

OUTPUT OF U-PHASE GENERATING WIRE 54

OUTPUT OF V-PHASE GENERATING WIRE 55

OUTPUT OF W-PHASE GENERATING WIRE 56

(a) FG1
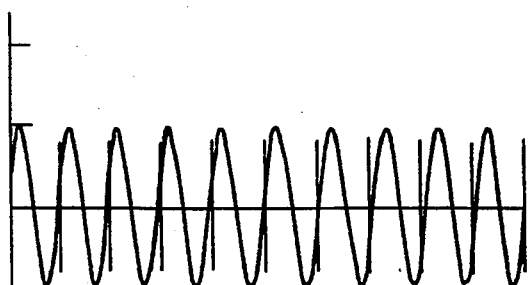
(b) FG2
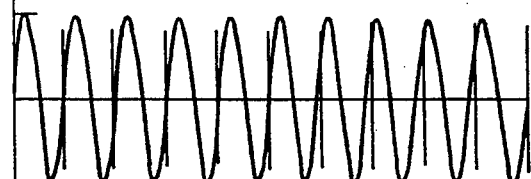
(c) SFG
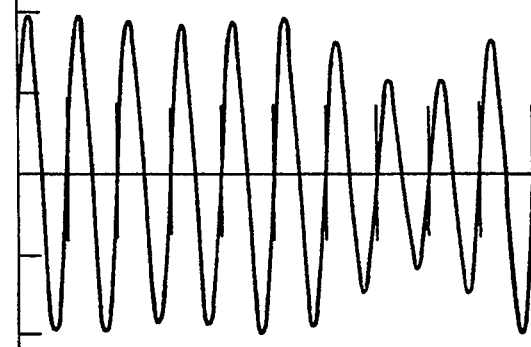
FIG.68

INDEX POSITION DETECTING APPARATUS FOR AN ELECTROMAGNETIC ROTARY MACHINE

This application is a continuation of application Ser. No. 07/907,140, filed Jul. 1992, now abandoned.

BACKGROUND OF THE INVENTION

1. Field of the Invention

The present invention relates to an index position detecting apparatus for an electric rotary machine such as a motor used in a floppy disk drive or the like, and more particularly to improvements in detection of the index position of the rotary machine and of timing for generating a rotating magnetic field.

2. Description of the Prior Art

As a conventional apparatus for detecting the rotating position of a motor, one that employs Hall effect sensors is known. The Hall effect sensors are disposed at positions facing magnetic poles of the driving magnet of a rotor so as to detect changes in the magnetic flux of the magnet, and the output signals of the Hall effect sensors are used as timing signals for producing the rotating magnetic field of the motor.

Likewise, as a conventional apparatus for detecting the index position of a motor, one that employs magnetic detector such as a Hall effect sensor is known. The Hall effect sensor is disposed on a stator of the motor so as to encounter a magnet fixed on the rotor of the motor. The sensor detects changes in the magnetic flux of the magnet and produces a pulse signal which is used as a rotating position signal indicating the index position.

Referring to drawings, a conventional motor will be described. FIG. 1 is a cross-sectional plan view showing the major portion of a conventional three-phase brushless motor, and FIG. 2 is a cross-sectional view taken along line X—X of FIG. 1. The conventional brushless motor has four magnetic circuits: a magnetic circuit for generating a rotating driving force; that for generating a frequency generating signal; that for generating an index signal indicating the rotating position of the rotor; and that for detecting exciting timings for generating the rotating magnetic field.

The construction of the three-phase brushless motor is shown schematically in FIG. 2. An oilless bearing 9 is press-inserted at the center of a substrate 7 made of a magnetic material such as iron, and a Hall effect sensor 14 functioning as an index position detecting device is disposed at the periphery of the substrate 7. A rotating shaft 5 on which a rotor yoke 4 is mounted via a shaft fixing member 6 is fixed into the inner ring of a bearing 8 and the oilless bearing 9. Thus, an integral structure including the rotor yoke 4, a driving magnet 1, a frequency generating magnet 2, and an index magnet 13 can freely rotate with respect to the substrate 7.

The driving magnet 1 is fixed on the inner wall of the periphery of the rotor yoke 4. As is well known, the rotor yoke 4 is driven to rotate by applying a rotating magnetic field on the driving magnet 1. The driving magnet 1 is subjected to a 16-pole magnetization along the circumference thereof, and is fixed on the inner wall of the periphery of the rotor yoke 4.

To produce the rotary magnetic field, a plurality of driving coils 10 are wound on stator yokes 11 which are radially formed around the rotating shaft 5. The stator yokes are fixed on the substrate 7 with fixing members such as screws.

In this structure, the stator yokes 11 form a close magnetic circuit together with the driving magnet 1, a driving magnet yoke 3, and the rotor yoke 4. Here, this type of brushless motor, wherein the driving magnet 1 is disposed in opposition to the circumference of the stator yokes 11 making a small gap between them, is called a circumference-opposing type motor.

In the outer wall of the periphery of the rotor yoke 4, a notch 4h is formed into which the index magnet 13 is embedded functioning as a part of a rotation position detecting means. The index magnet 13 forms another magnetic circuit.

Furthermore, a plurality of Hall effect sensors 12a, 12b and 12c are fixed at appropriate positions on the substrate 7 in order to detect the exciting timings of coils 10 of respective phases. The Hall effect sensors 12a, 12b and 12c detect changes in the magnetic flux caused by the passage of the driving magnet 1. Thus, the phase difference between the magnetic field produced by the coils 10 and the magnetic field produced by the rotating driving magnet 1 is detected so that each driving coil 10 is supplied with a current at appropriate timings to produce the rotating magnetic field. This rotating field rotates the rotor 4 in the direction shown by the arrow A in FIG. 1.

The frequency generating magnet 2, on the other hand, has a total of 120 magnetized poles, and is attached to the outer wall of the periphery of the rotor yoke 4. Opposing the frequency generating magnet 1, there is provided a generating wire 7a on the surface of the substrate 7. The generating wire a consists of 120 U-shaped elements corresponding to the number of poles of the frequency generating magnet 2, as shown in FIG. 3. The generating wire 7a is made of copper or the like etched on the substrate 7.

With this structure, when the rotor yoke 4 is driven to rotate, the generating wire 7a generates a sine wave of a frequency corresponding to the rotating speed of the rotor yoke 4. Thus, a control circuit not shown carries out a constant speed control.

When the rotor yoke 4 rotates, the index magnet 13 fixed in the rotor yoke 4 rotates with it so that the Hall effect sensor 14 for detecting index position senses the flux change of the magnet 13, and produces an index signal consisting of one pulse for each rotation of the rotor yoke 4, thus making it possible to detect the rotating phase of the rotor.

Furthermore, when the rotor yoke 4 is driven, the Hall effect sensors 12a, 12b and 12c for detecting the exciting timings of respective phases produce waveforms as shown in FIG. 4. On the basis of these signals, a coil driving signal synthesizing circuit 35 creates timing signals for exciting the driving coils 10U, 10V and 10W, and energizes coil driving amplifiers 36a, 36b and 36c. Thus, currents as shown in FIG. 6 flow through the driving coils 10U, 10V and 10W.

The Hall effect sensor 14, which detects the index position and generates the index signal, produces a waveform as shown in FIG. 7. This waveform is inputted to a comparator 15 as shown in FIG. 8 so that a waveform shown in the bottom of FIG. 7 is produced at the output of the comparator 15 as the index signal.

The conventional method of detecting the index position described above has the following problems:

(1) Since the index magnet 13 is attached to the outer wall of the periphery of the rotor yoke 4, and the magnetic circuit formed by the index magnet 13 is open, the magnetic flux originating from the index magnet 13 works as leakage flux. As a result, when the motor is employed to rotate a disk in a magnetic recording and reproducing apparatus, correct recording and reproduction of information may be degraded by the leakage flux entering a magnetic head for recording and reproduction.

(2) Spaces for providing the index magnet 13 and the Hall effect sensor 14 for detecting the index position are necessary. This prevents the multiple phase brushless motor from being made smaller in size and thinner in thickness, and in addition, makes the cost higher.

Furthermore, the above-described conventional method of detecting timings for driving the coils 10 necessitates spaces for providing the Hall effect sensors 12a, 12b and 12c for detecting the timings. This also prevents the multiple phase brushless motor from being made smaller and thinner. In addition, this increases the cost of the motor.

SUMMARY OF THE INVENTION

It is therefore an object of the present invention to provide an index position detecting apparatus for an electric rotary machine that can prevent the problems caused by the leakage flux, can reduce the number of components to reduce the cost, and is small in size and thin in thickness.

In a first aspect of the present invention, an electric rotary machine comprises:
 a stator;
 rotary magnetic field generating means included in the stator for generating a rotary magnetic field;
 a rotor;
 a driving magnet included in the rotor, the driving magnet having magnetized multiple poles that generate rotary torque in conjunction with the rotary magnetic field generating means;
 a first magnetic body included in the rotor so as to generate magnetic flux changes in proportion to a speed of the rotor;
 first pulse generating means for generating a first pulse train, which consists of P1 pulses (P1 is a natural number) per one revolution of the rotor, on the basis of magnetic flux changes caused by the driving magnet when the rotor rotates;
 second pulse generating means for generating a second pulse train, which consists of P2 pulses (P2 is a natural number) per one revolution of the rotor, on the basis of the magnetic flux change caused by the first magnetic body, a greatest common divisor of P1 and P2 being set at a natural number m; and
 index position detecting means for detecting an index position of the rotor in accordance with a phase difference between first and second pulse trains.

In a second aspect of the present invention, an electric rotary machine comprises:
 a stator;
 rotary magnetic field generating means included in the stator for generating a rotary magnetic field;
 a rotor;
 a driving magnet included in the rotor, the driving magnet having magnetized multiple poles that generate rotary torque in conjunction with the rotary magnetic field generating means;
 a first magnetic body included in the rotor so as to generate magnetic flux changes in proportion to a speed of the rotor;
 a second magnetic body included in the rotor so as to generate magnetic flux changes in proportion to a speed of the rotor;
 first pulse generating means for generating a first pulse train, which consists of P1 pulses (P1 is a natural number) per one revolution of the rotor, on the basis of magnetic flux changes caused by the first magnetic body when the rotor rotates;
 second pulse generating means for generating a second pulse train, which consists of P2 pulses (P2 is a natural number) per one revolution of the rotor, on the basis of the magnetic flux change caused by the first magnetic body when the rotor rotates, a greatest common divisor of P1 and P2 being set at a natural number m; and
 index position detecting means for detecting an index position of the rotor in accordance with a phase difference between first and second pulse trains.

In a third aspect of the present invention, an electric rotary machine comprises:
 a stator;
 rotary magnetic field generating means disposed on the stator for generating a rotary magnetic field, the rotary magnetic field generating means having a round shape and generating the rotary magnetic field by a plurality of exciting currents supplied to respective phases;
 a rotor;
 a driving magnet included in the rotor, the driving magnet having magnetized multiple poles that generate rotary torque in conjunction with the rotary magnetic field; and
 detecting means for detecting magnetic flux changes caused by the driving magnet when the rotor rotates, the detecting means including a generating wire etched on the stator.

In a fourth aspect of the present invention, an electric rotary machine including a rotor and a stator, comprises:
 a first electromagnetic coupling element disposed on the rotor;
 a second electromagnetic coupling element disposed on the stator, and making an electromagnetic coupling with the first electromagnetic coupling element;
 means for providing a change to an output signal of at least one of first and second electromagnetic coupling elements when the rotor rotates, the change being one cycle per one revolution of the rotor, and caused by changes of magnetic flux between the first and second electromagnetic coupling elements; and
 index position detecting means for generating an index signal of the rotor on the basis of the output signal.

According to the first and second aspects of the present invention, the numbers of pulses of the first and second pulse trains are P1 and P2, respectively. Since the greatest common divisor is m, P1/m and P2/m are prime to each other. Accordingly, the phase of the rotor returns to its original phase every time the pulses of the first and second pulse trains are generated P1/m and P2/m, respectively. When the phase returns to its original phase, the index signal is generated. Thus, the index magnet and the Hall effect sensor for detecting the index position can be obviated. This makes it possible to reduce the size and thickness of the magnetic rotary machine. In addition, the leakage flux originated from the index magnet can be eliminated.

According to the third aspect of the present invention, the exciting timings of the driving coils can be detected by using the generating wire. This makes it possible to obviate the exciting timing detection devices such as Hall effect sensors, and to reduce the thickness and cost of the rotary machine.

According to the fourth aspect of the present invention, since the intensity of the magnetic flux formed between the two electromagnetic coupling elements is modulated one cycle per one rotation of the rotor, the index signal can be generated by the modulated component. As a result, the index magnet and the Hall effect sensor for detecting the index position can be obviated. This makes it possible to reduce the size and thickness of the magnetic rotary machine. In addition, the leakage flux originated from the index magnet can be eliminated.

The above and other objects, effects, features and advantages of the present invention will become more apparent from the following description of the embodiments thereof taken in conjunction with the accompanying drawings.

BRIEF DESCRIPTION OF THE DRAWINGS

FIG. 14 is a timing chart illustrating a method for generating an index signal in accordance with embodiments 2, 4 and 9 of the present invention, wherein the number of poles of a driving magnet 1 is N (=16) and that of a frequency generating magnet 2 is P (=122);

FIG. 17 is a cross-sectional plan view showing a rotor and a stator of a circumference-opposing type motor in accordance with embodiments 3 and 4 of the present invention, which illustrates a magnetized pattern common to those embodiments;

FIG. 18 is a cross-sectional view taken along line X—X of FIG. 17;

FIG. 20 is a timing chart illustrating the driving mode of the coils 10;

FIG. 21 is a diagram illustrating relationships between the waveforms of counterelectromotive voltages induced in coils 10U, 10V and 10W, which are applied to comparators 16U, 16V and 16W, and the first pulse train FG1;

FIG. 58 illustrates another variation of embodiments 12, 13 and 14, which prevents a fluctuation of pulse widths due to the deviation of concentricity of a frequency generating magnet 2 and generating wire 7a;

FIG. 68 is a diagram illustrating waveforms at various portions in an index position detecting circuit 100 in accordance with the fourteenth embodiment;

DETAILED DESCRIPTION OF PREFERRED EMBODIMENTS

The invention will now be described with reference to the accompanying drawings.

FIRST EMBODIMENT

Figure 9:
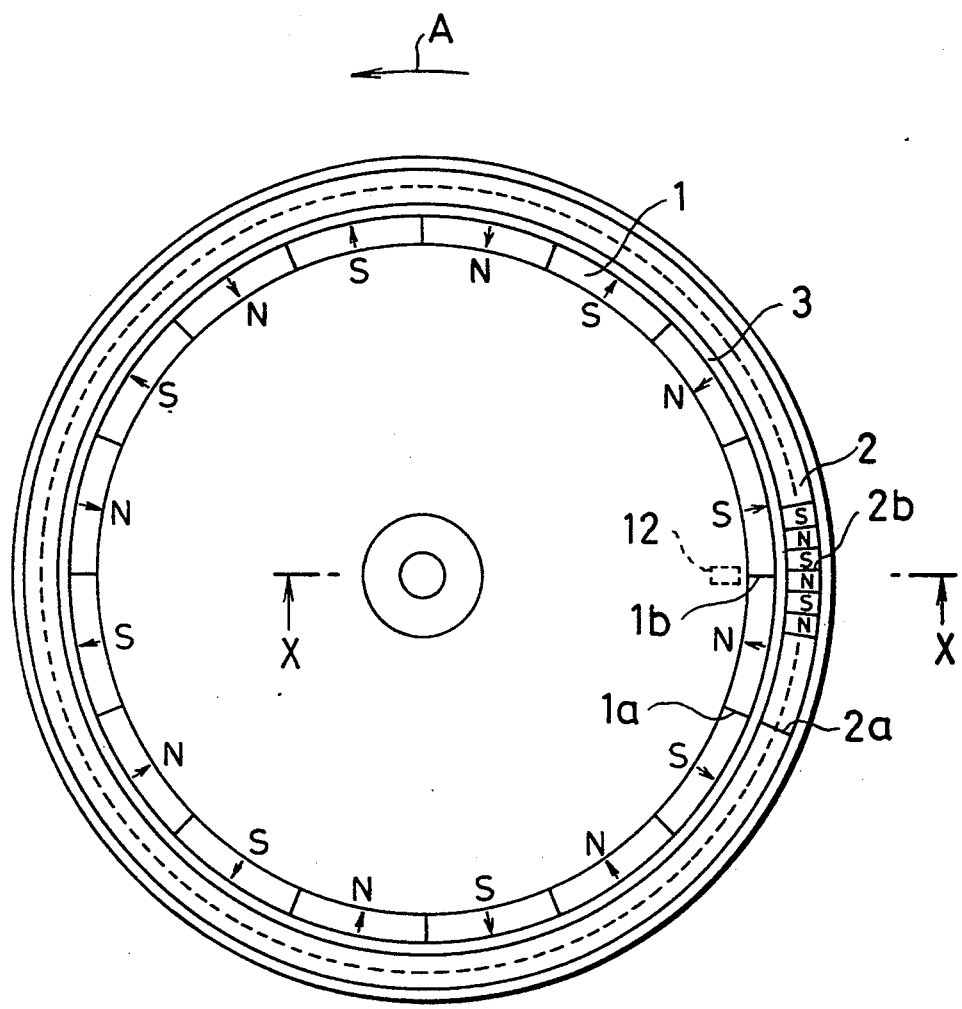
FIG. 9 is a plan view showing a circumference-opposing type spindle motor having an index position detecting apparatus in accordance with the present invention.
Figure 10:
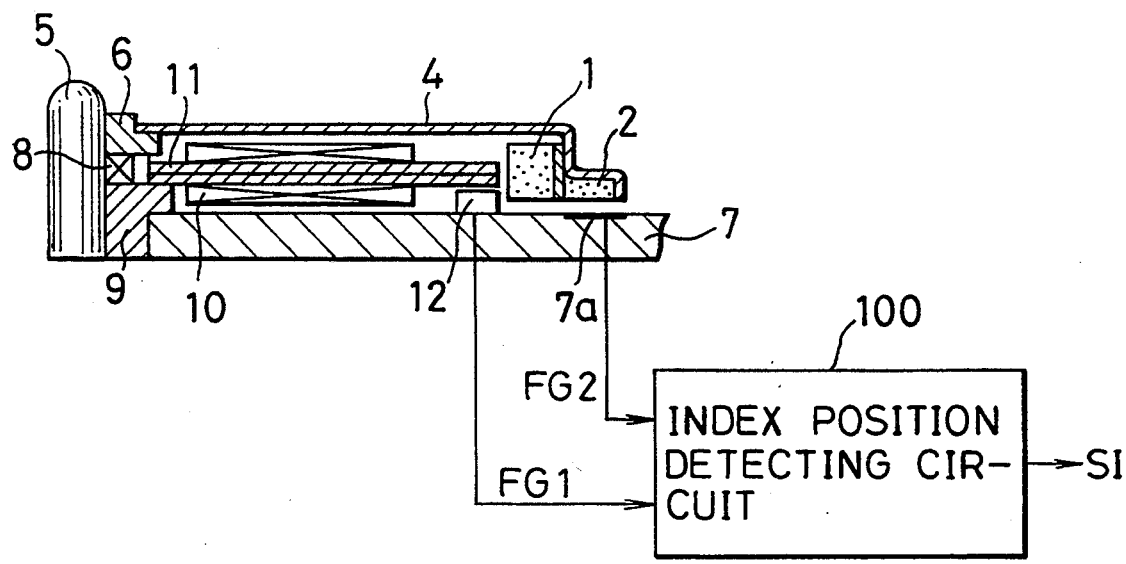
FIG. 10 is a cross-sectional view of a circumference-opposing type spindle motor taken along line X—X of FIG. 9.

FIGS. 9 and 10 are plan and cross-sectional views of a circumference-opposing type spindle motor having an index position detecting apparatus in accordance with the present invention. In these figures, like reference numerals designate the same or functionally similar elements as those of the conventional apparatus of FIGS. 1–8, and hence the description thereof is omitted here. A generating wire 7a and a driving timing detecting device 12 are connected to an index position detecting circuit 100 which outputs index signal SI.

Figure 11:
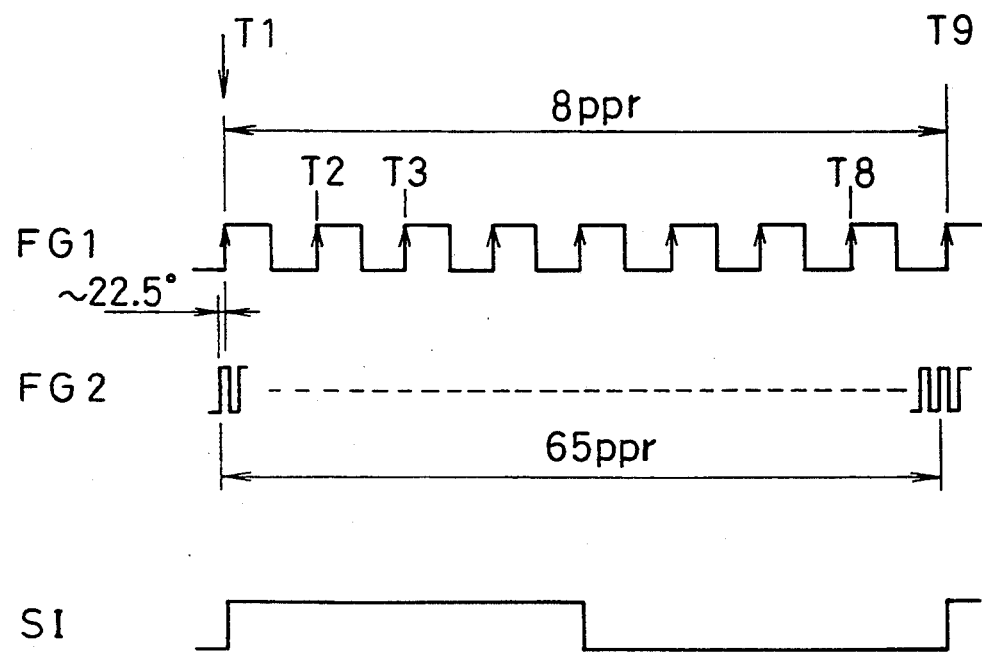
FIG. 11 is a timing chart illustrating a method for generating an index signal in accordance with embodiments 1, 3 and 8 of the present invention, wherein the number of poles of a driving magnet 1 is N (=16) and that of a frequency generating magnet 2 is P (=130)
Figure 12:
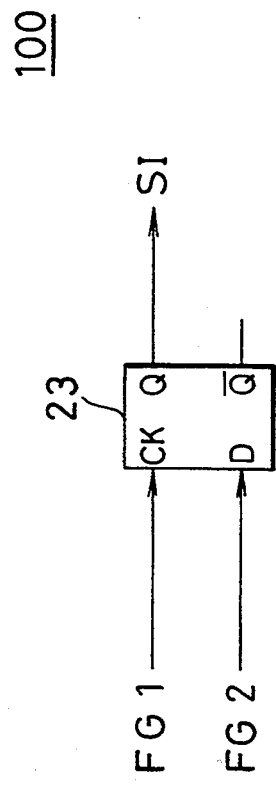
FIG. 12 is a block diagram of an index position detecting circuit 100 implementing the relationships illustrated in FIG. 13.
Figure 13:
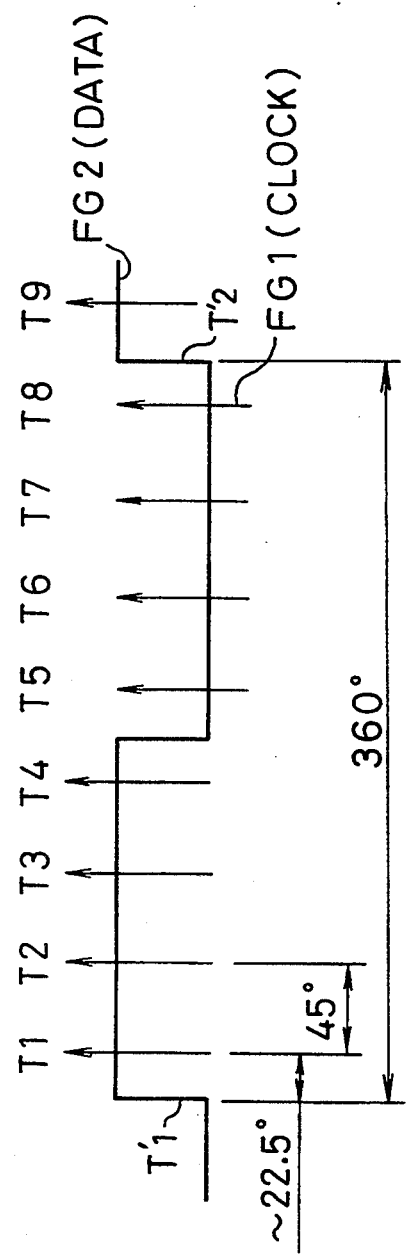
FIG. 13 is a diagram illustrating the phase relationship between the first and second binary signals FG1 and FG2.
Figure 15:
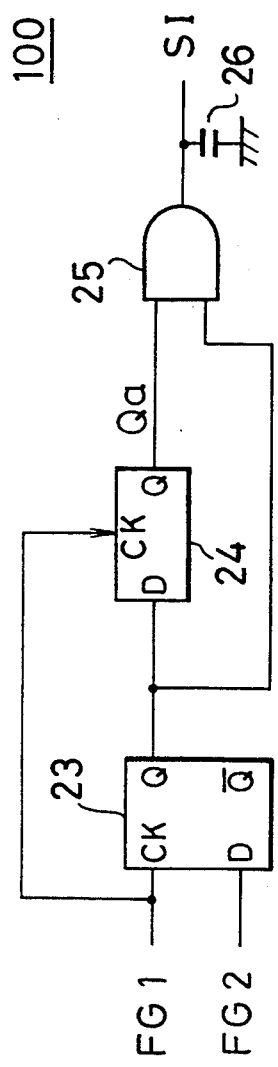
FIG. 15 is a block diagram of an index position detecting circuit 100 implementing the relationships illustrated in FIG. 14.
Figure 16:
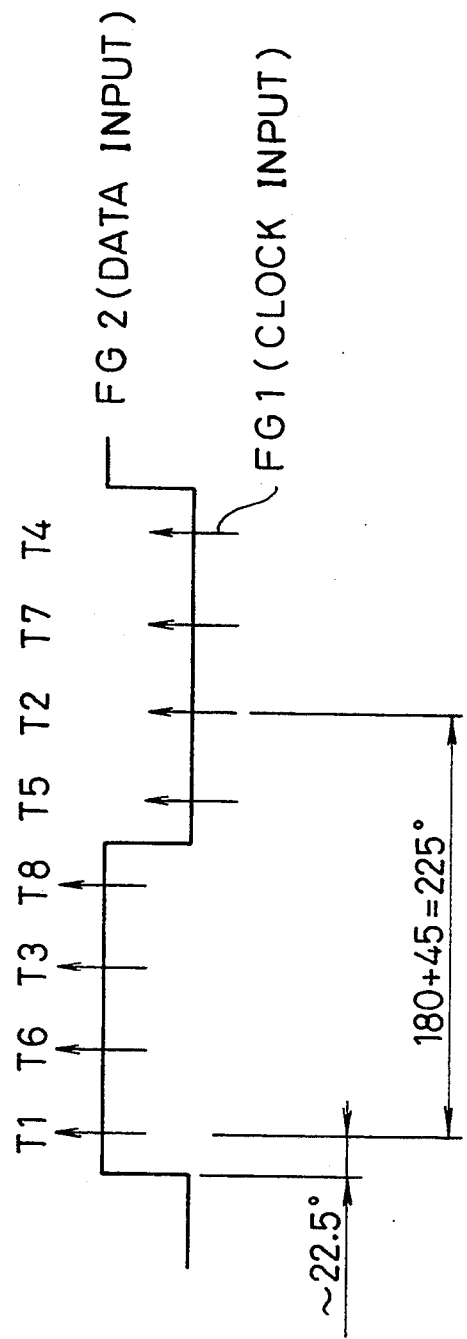
FIG. 16 is a diagram illustrating the phase relationship between the first and second binary signals FG1 and FG2.

FIGS. 11–13 are timing charts and a block diagram illustrating a method for generating an index signal when the number of poles of a driving magnet 1 is N and that of a frequency generating magnet 2 is P, and they are related by equation $P=N \times n \pm 2$, where n is an integer. Similarly, FIGS. 14–16 are timing charts and a block diagram illustrating a method for generating an index signal when the number of poles of a driving magnet 1 is N and that of a frequency generating magnet 2 is P, and they are related by equation $P=N \times (n+0.5) \pm 2$.

Figure 1:
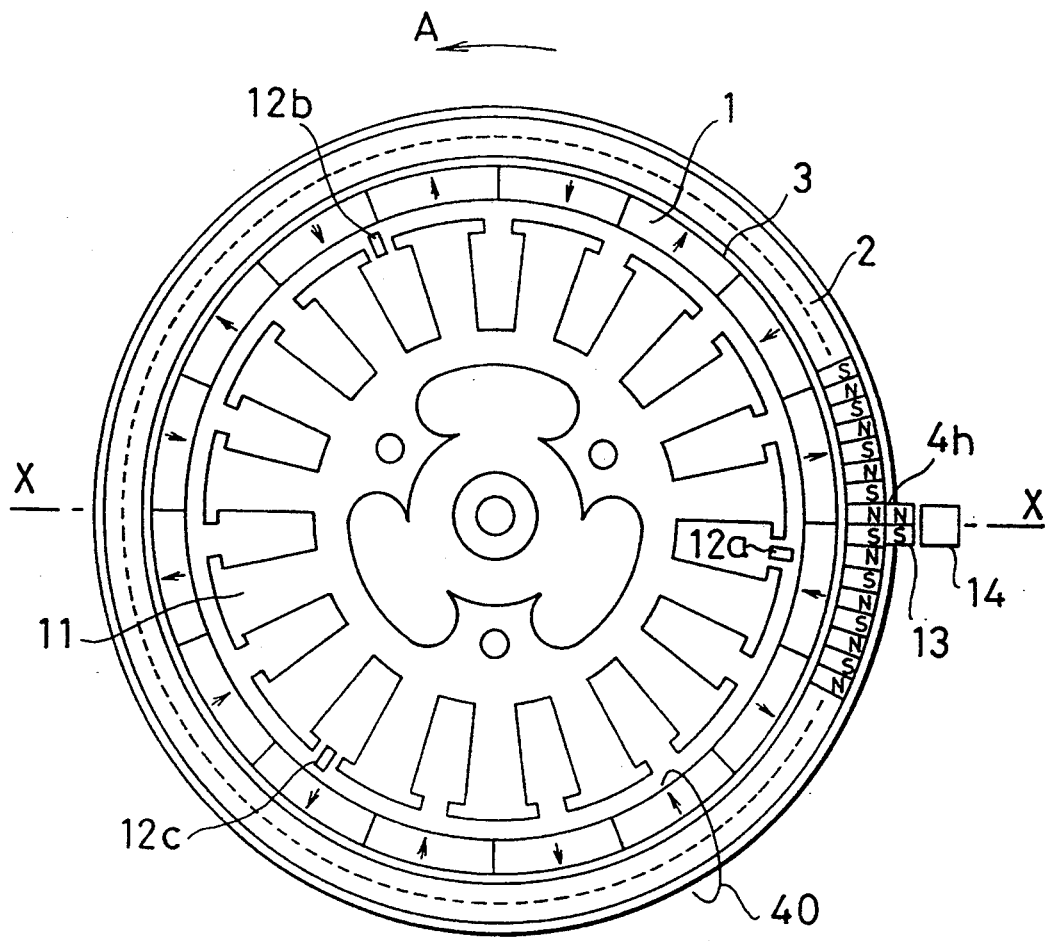
FIG. 1 is a cross-sectional plan view showing the major portion of a conventional three-phase brushless motor.
Figure 2:
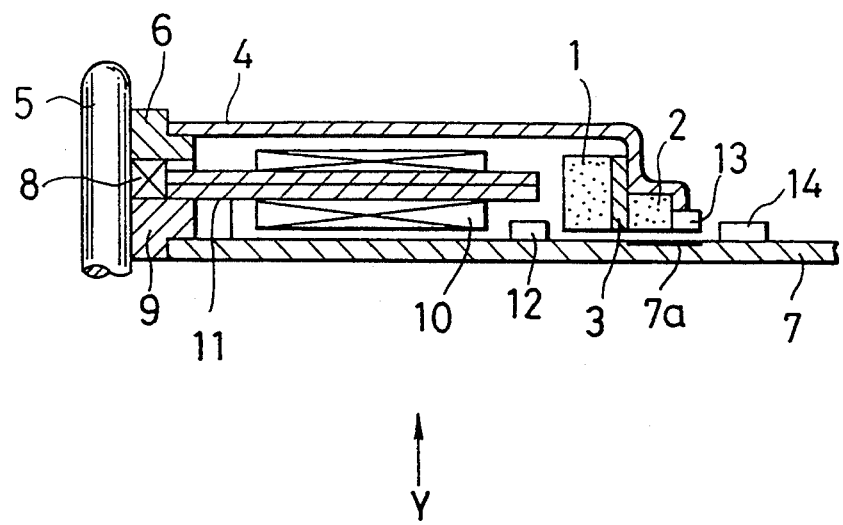
FIG. 2 is a cross-sectional view taken along line X—X of FIG. 1.

The apparatus shown in FIGS. 9 and 10 differs from the conventional apparatus shown in FIGS. 1 and 2 in that the index magnet 13 and the Hall effect sensor 14 for detecting the index position are omitted, and in that the pole number N of the driving magnet 1 is related to the pole number P of the frequency generating magnet 2 by the following equation.

$$P=N \times n \pm 2 \tag{1}$$

or $$P=N \times (n+0.5) \pm 2 \tag{2}$$

where n is an integer.

In other words, N/2 and P/2 are prime to each other. By setting the relationship between P and N, the index position can be detected without employing the index magnet 13 and the Hall effect sensor 14.

In the conventional apparatus, not only is the positional relationship between magnetized patterns of the driving magnet 1 and the frequency generating magnet 2 free, but also the positional relationship between the Hall effect sensors 12a, 12b and 12c for detecting the exciting timings and the frequency generating wire 7a is free.

Next, the index position detecting circuit 100 will be described with reference to FIGS. 11-13. Here, it is assumed that P=130, N=16, and n=8, which satisfies the relationship of equation (1). A binary signal FG1 is obtained by inputting the output of the driving timing detecting device 12 shown in FIG. 10 to a comparator similar to the comparator 15 shown in FIG. 8. Likewise, a binary signal FG2 is obtained by inputting the output of the frequency generating wire 7a to a comparator similar to the comparator 15.

As shown in FIG. 11, the binary signal FG1 is a pulse train consisting of eight pulses per revolution of the rotor yoke 4 in accordance with the pole number N of the driving magnet 1. On the other hand, the binary signal FG2 is a pulse train consisting of 65 pulses per revolution in accordance with the pole number P of the frequency generating magnet 2. The phase difference between the two binary signals FG1 and FG2 is set at approximately 22.5 degrees at time T1 to prevent faulty operation of a D latch 23 shown in FIG. 12.

As shown in FIG. 12, the binary signal FG1 is supplied to the clock input CK of the D latch 23 and the binary signal FG2 is supplied to the data input D of the D latch 23. Accordingly, pulses of the binary signal FG2 are latched by the leading edges of pulses of the binary signal FG1, thus providing the index signal SI at the output Q of the D latch 23.

The process of generating the index signal SI will be explained with regard to FIGS. 11-13. FIG. 13 illustrates the phase relationship between the data input FG2 and the clock FG1. In this figure, the suffix x of Tx designates the sequence of the clock pulses numbered from T1. Each clock pulse applied to the D latch 23 lags the phase of the clock pulses FG1 by 45 degrees with regard to the data input FG2. Accordingly, the output SI of the D latch 23 is reversed at the clock pulse inputs of T5 and T9, thus generating the index signal SI consisting of one pulse per revolution.

When a Hall effect sensor is used as the driving timing detecting device 12 for generating the clock signal FG1, the duty ratio of the binary signal FG1 will fluctuate owing to the offset voltage of the Hall effect sensor. This may change the timing of the clock signal FG1, and may cause mislatches. In addition, offset voltages of amplifiers for the binary signals FG1 and FG2 may cause faulty operation.

To prevent this, the phase of the clock pulses FG1 to the D latch 23 is made separate by more than 360/N degrees (360/16=22.5 degrees in FIG. 13) apart from the rising or falling edge of the data input FG2 to the D latch 23 when the period of the data input FG2 is assumed 360 degrees and the number of poles of the driving magnet 1 is N. This is achieved by arranging the magnetized pattern of the driving magnet 1 and the frequency generating magnet 2, and by setting the phase relationship between the driving timing detecting device 12 and the frequency generating wire 7a.

More specifically, the magnetized patterns of the driving magnet 1 and the frequency generating magnet 2, and the positional relationship between the driving timing detecting device 12 and the frequency generating wire 7a are set as follows: First, the detecting device 12 is set at the position indicated by a broken rectangle 12 in FIG. 9. Second, the pitch of radial lines constituting the frequency generating wire 7a on the substrate 7 is identical to the pitch of boundary lines 2a and 2b of each pole of the frequency generating magnet 2. Third, the pitch of the boundary lines 1a and 1b of each driving magnet 1 is set so that when the boundary line 1a aligns is aligned with one of the boundary line 2a, the boundary line 1b has a phase difference no less than 360/N degrees with the boundary line 2b closest to the boundary line 1b, assuming that the number of the poles of the driving magnet 1 is N, and that the pitch of a pair of N and S poles of the frequency magnet 2, that is, the pitch from one boundary line 2a to the next boundary line 2a, is 360 degrees as implicitly indicated in FIG. 13.

With this arrangement, the binary signals FG1 and FG2 as shown in FIGS. 11 and 13 are generated. Since the edge of the data input FG2 to the D latch 23 is set to make a greatest phase difference with the clock FG1 (22.5 degrees in FIGS. 11 and 13), faulty operation is prevented.

SECOND EMBODIMENT

Next, referring to FIGS. 14–16, a second embodiment of the present invention will be described. In these figures, it is assumed that P=122, N=16, and n=7, which satisfies the relationship of equation (2). Binary signals FG1 and FG2 are obtained in a manner similar to that of the first embodiment.

As shown in FIG. 14, the binary signal FG1 obtained from a driving timing detecting device 12 is a pulse train consisting of eight pulses per revolution of the rotor yoke 4 in accordance with the pole number N of the driving magnet 1. On the other hand, the binary signal FG2 obtained from the output of a generating wire 7a is a pulse train consisting of 61 pulses per revolution in accordance with the pole number P of the frequency generating magnet 2. As described above, the phase difference between the two binary signals FG1 and FG2 is set at approximately 22.5 degrees at time T1.

As shown in FIG. 15, the binary signal FG1 is supplied to the clock input CK of a D latch 23 and the clock input CK of a 1-bit shift register 24, and the binary signal FG2 is supplied to the data input D of the D latch 23. Pulses of the binary signal FG2 are latched by rising edges of pulses of the binary signal FG1. The output of the D latch 23 is supplied to the data input D of the 1-bit shift register 24 and an AND gate 25. The AND gate 25 ANDs the outputs Q and Qa of the D latch 23 and the 1-bit shift register 24, thus providing the index signal SI. A capacitor 26 removes glitches caused by deviation of timings between the outputs Q and Qa of the D latch 23 and the 1-bit shift register 24.

The process of generating the index signal SI will be explained with regard to FIGS. 14–16. FIG. 16 illustrates the phase relationship between the data input FG2 and the clock pulses FG1. In this figure, the suffix x of Tx designates the sequence of the clock pulses numbered from T1. Each clock applied to the D latch 23 lags the phase of the clock pulses FG1 by 225 degrees with regard to the data input FG2. Accordingly, as shown at the bottom of FIG. 14, the AND gate 25 outputs a pulse train consisting of one pulse per revolution, thus generating the index signal SI.

Here, the AND operation of FIG. 15 may be replaced with an OR operation. In this case, although positions where pulses occur are changed, an index signal similar to that shown at the bottom of FIG. 14 is generated.

Furthermore, although the driving magnet 1 and the frequency generating magnet 2 are separately constructed as two components in the above embodiments, they can be integrally arranged into one part. For example, the frequency generating pattern may be formed by magnetizing a surface of the driving magnet 1, the surface facing the substrate 7.

Next, three other embodiments will be described, wherein the present invention is applied to a circumference-opposing type spindle motor or a plane-opposing type spindle motor, which includes an index detecting apparatus. The first two embodiments, that is, the third and fourth embodiments, are the same in that they generate two pulse trains, but are different in the processing of the two pulse trains. In a fifth embodiment, the present invention is applied to a plane-opposing type spindle motor.

GENERAL DESCRIPTION OF THE THIRD, FOURTH AND FIFTH EMBODIMENTS

As shown in FIGS. 17 and 18, these embodiments obviate the driving timing detecting device 12, the index magnet 13 and the Hall effect sensor 14, which are necessary in the conventional apparatus as shown in FIGS. 1 and 2. This becomes possible for the first time by generating an index signal SI from the counterelectromotive voltage of coils 10 and an output of a generating wire 7a. Thus, the motors of these embodiments as shown in FIGS. 17 and 18 are rather reduced in their size in comparison with the conventional motor as shown in FIGS. 1 and 2. Arrangements for generating two pulse trains, which enable the reduction in size of motors, will be described below.

First, a the generation of a first pulse train FG1 will be explained in principle regard to FIGS. 17–21.

As clearly shown in FIGS. 17 and 18, the Hall effect sensor 12 for detecting timings for driving coils 10 is not provided in these embodiments. The timings are detected from the counterelectromotive voltage of the coils 10. Although a similar method has been already employed in some motors, the conventional method uses the counterelectromotive voltages of all the phases. In contrast with this, the method of these embodiments is novel in that it generates the first pulse train FG1 by utilizing a counterelectromotive voltage obtained from only one phase.

Figure 19:
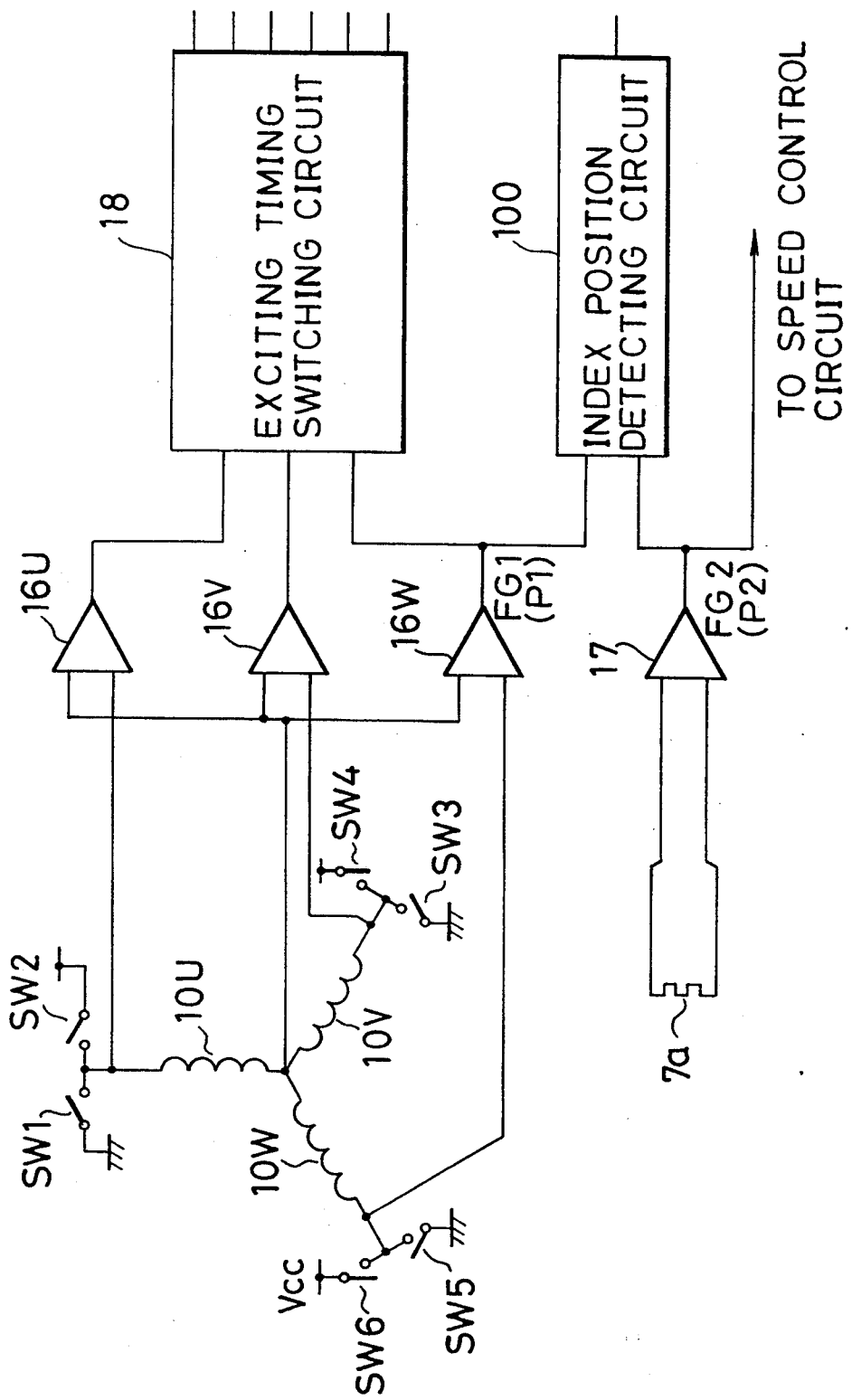
FIG. 19 is a block diagram showing a circuit for detecting first and second pulse trains FG1 and FG2 on the basis of the counterelectromotive voltage of one of the coils 10 to form driving timing signals and an index signal in accordance with embodiments 3–5.

FIG. 19 is a block diagram showing a circuit for detecting the counterelectromotive voltage of one of the coils 10.

Coils 10U, 10V and 10W are Y-connected, and the terminals of the Y-connection are switched by switches SW1-SW6 to be connected to a supply voltage, to the ground, or to open terminals. The switches SW1-SW6 are controlled by an exciting timing switching circuit 18. Here, the switches SW1-SW6 correspond to sink or source transistors of an output circuit of a driving circuit of a motor.

FIG. 20 illustrates a driving mode of the coils 10. In this figure, the horizontal axis represents time, the positive direction of the vertical axis indicates that the source transistors SW2, SW4 and SW6 are in the ON state, and the zero level of the vertical axis indicates that the transistors are open. This conduction method is generally called the 120° conduction method. It has 60° nonconducting (open) states in terms of the electrical angle, during which the counterelectromotive voltage is detected.

FIG. 21 illustrates voltage waveforms at the terminals of the coils 10U, 10V and 10W, which are applied to comparators 16U, 16V and 16W. In FIG. 21, sine wave components are the counterelectromotive voltages which are converted into binary signals by the comparators 16U, 16V and 16W. In these embodiments, only the binary output of the comparator 16W connected to the coil 10W is used as the first pulse train FG1.

As shown in FIG. 19, the outputs of the comparators 16U, 16V and 16W are inputted to the exciting timing switching circuit 18 which synthesizes exciting timing signals. In response to the exciting timing signals, currents supplied to the coils 10 are controlled, and the rotor of the motor rotates.

Next, the generation of the second pulse train FG2 will be described in principle. The second pulse train FG2 is generated by converting the output of the generating wire 7a into a binary signal by a comparator 17. This binary signal is also inputted to a speed control circuit (not shown), and is used to control the speed of the motor at a constant speed.

The outputs of the comparators 16W and 17 are inputted to the index position detecting circuit 100 which outputs the index signal SI. The principle of operation of the index position detecting circuit 100 will now be described.

Let us assume that the comparator 16W (or the coil 10W) and the comparator 17 (or the generating wire 7a) produces P1 and P2 pulses per one revolution of the rotor yoke 4, respectively. The numbers P1 and P2 are determined by the number of poles of the driving magnet 1, and the number of elements of the generating wire 7a and the number of poles of the frequency generating magnet 2. The numbers P1 and P2 are determined such that their greatest common divisor is one, that is, they are prime to each other. The index signal is usually generated once per one revolution. This is because the index position detecting circuit 100 is constructed to generate the index signal when the phases of the two signals FG1 and FG2 outputted from the comparators 16W and 17 coincide.

A more general relationship between the pulse numbers P1 and P2 can be obtained as follows: To generate an index signal SI consisting of m pulses per one revolution, the phases of the two pulse trains FG1 and FG2 must coincide m times per revolution. This relationship can be expressed by $$P1 = m \times k1 \quad (3)$$

$$P2 = m \times k2 \quad (4)$$

where m, k1 and k2 are integers. Equations (3) and (4) indicate that when the pulses of the pulse trains FG1 and FG2 are produced k1 and k2 times, respectively, the first match of the phases of the pulse trains FG1 and FG2 occurs, that when the pulses of the pulse trains FG1 and FG2 are produced k1 and k2 times once again, the second match of the phases of the pulse trains FG1 and FG2 occurs, and that when the pulses of the pulse trains FG1 and FG2 are produced $m \times k1$ and $m \times k2$ times, respectively, the m-th match of the phases of the pulse trains FG1 and FG2 occurs. In other words, the index signal takes place m times per revolution when m is the greatest common divisor of P1 and P2.

As a special case, when k1 and k2 are prime to each other in equations (3) and (4), the match of phases of the pulse trains FG1 and FG2 does not take place until the pulses of FG1 and FG2 occur k1 and k2 times, respectively. This means that the necessary and sufficient conditions for generating the index signal SI consisting of m pulses per revolution are that the greatest common divisor of P1 and P2 is m.

In particular, when m=1, P1 and P2 are prime to each other, the index signal SI consists of one pulse per one revolution, which is the case for common motors.

The above is the principle of the third to fifth embodiments. Each of these embodiments will be described highlighting the way of obtaining the index signal from the two pulse trains FG1 and FG2. In these embodiments, it is assumed that the index signal consists of one pulse per one revolution, which is most commonly used. In other words, it is assumed that P1 and P2 are prime to each other.

THIRD EMBODIMENT

FIG. 12 is a circuit diagram of an index position detecting circuit 100 in accordance with the third embodiment of the present invention. This circuit consists of a D latch 23. The binary signal FG1 is supplied to the clock input CK of the D latch 23 and the binary signal FG2 is supplied to the data input D of the D latch 23. The duty ratio of the binary signal FG2 is preferably 1:1. The output of the D latch 23 is the index signal SI.

One of the most simple examples wherein P1 and P2 are prime to each other can be given by $$P2 = P1 \pm 1 \quad (5)$$

By generalizing this relation, the following equation is obtained.

$$P2 = P1 \times n \pm 1 \quad (6)$$

As shown in FIGS. 17 and 11, the binary signal FG1 is a pulse train consisting of eight pulses per revolution of the rotor yoke 4 in accordance with the pole number N (=16) of the driving magnet 1. On the other hand, the binary signal FG2 is a pulse train consisting of 65 pulses per revolution in accordance with the pole number P (=130) of the frequency generating magnet 2. FIG. 11 illustrates waveforms of the pulse trains FG1 and FG2 inputted to the D latch 23 of FIG. 12, and of the index signal SI outputted from the D latch 23 of FIG. 12. In FIG. 11, P1=8, P2=65, and n=8. With this arrangement, each pulse applied to the D latch 23 lags the phase of the clock pulses FG1 by 45 degrees with respect to the data input FG2, when the period of the signal FG2 is assumed to be 360 degrees. Accordingly, when the data FG2 is latched by the D latch 23 by the clock FG1 at time T1, the D latch 23 is reset by the clock pulse input of T5 at half a revolution, and is set again by the clock pulse input of T9 at a full revolution, thus repeating set/reset per revolution.

Deviation between the positions of coils 10U, 10V and 10W and the generating wire 7a, fluctuation in the magnetized positions and intensity of frequency generating magnet 2, and offset voltages of the comparators 16W and 17 may change the duty ratios of the signals FG1 and FG2. This may cause changes in the timings of clock pulses FG1 and data FG2, resulting in a mislatch. To prevent this, the phase of the clock FG1 to the D latch 23 is made separate by more than 360/2P1 degrees (360/16=22.5 degrees) apart from the rising or falling edge of the data input FG2 to the D latch 23 when the period of the data input FG2 is assumed 360 degrees. This is achieved by appropriately setting the positional relationship between the stator yokes 11 (or the driving coils 10) and the elements of the generating wire 7a, and by suitably setting the phase relationship between the magnetized patterns of the driving magnet 1 and the frequency generating magnet 2.

This will be described in more detail. In FIG. 17, let us assume that a line $\theta_o$ passing through the center of a magnetized pole $1m$ of the driving magnet 1 and the axis of rotation makes an angle $\theta_o$ with a predetermined radius, that the center of a magnetized pole $2m$ of the frequency generating magnet 2 is also placed on the line $\theta_o$, and that a line $\theta_r$ passes through the center of the magnetized pole of the driving magnet 2 that is closest or next to the pole $1m$. The W-phase coils 10W that are associated with the signal FG1 are wound on five stator yokes 11W as shown in FIG. 17. The center line $\theta_i$ of the stator yokes 11W is equally separated apart from the two adjacent radial element lines $7a1$ and $7a2$ of the generating wire 7a, which are closest to the line $\theta_i$ and are indicated by broken lines in FIG. 17. In other words, the line $\theta_i$ passes through the center of the two adjacent radial element lines $7a1$ and $7a2$ of the generating wire 7a.

With this arrangement in conjunction with the circuit in FIG. 19, the line $\theta_o$ coincides with the line $\theta_i$ at time TI', when the signal FG1 falls and the signal FG2 rises as shown in FIG. 13. Subsequently, at time T1 in FIGS. 11 and 13, when the line $\theta_r$ passes the line $\theta_i$, the phase difference between the rising edges of the signals FG1 and FG2 becomes minimum, and takes a value of about 22.5 (360/(8×2)) degrees when the period of the signal FG2 is assumed to be 360 degrees.

Thus, the phase difference between the data FG2 and the clock FG1 to the D latch 23 is separated apart as large as possible. This makes it possible to prevent faulty operation.

FOURTH EMBODIMENT

In this embodiment, pulse numbers P1 and P2 are prime to each other as in the third embodiment. In the fourth embodiment, however, P1 and P2 are related by the following expression.

$$P2 = P1 \times (n+0.5) \pm 1 \quad (7)$$

FIG. 14 illustrates the relationship between the signals FG1 and FG2 in the fourth embodiment when P1=8, P2=61 and n=7. As shown in FIG. 14, the binary signal FG1 outputted from the comparator 16W of FIG. 19 is a pulse train consisting of eight pulses per revolution of the rotor yoke 4 in accordance with the pole number N of the driving magnet 1. On the other hand, the binary signal FG2 outputted from the comparator 17 of FIG. 19 is a pulse train consisting of 61 pulses per revolution in accordance with the pole number P2 of the frequency generating magnet 2.

FIG. 15 shows an index position detecting circuit 100 of the fourth embodiment. As shown in FIG. 15, the binary signal FG1 is supplied to the clock input CK of a D latch 23 and the clock input CK of a 1-bit shift register 24, and the binary signal FG2 is supplied to the data input D of the D latch 23. Pulses of the binary signal FG2 are latched by rising edges of pulses of the binary signal FG1. The output of the D latch 23 is supplied to the data input D of the 1-bit shift register 24 and an AND gate 25. The AND gate 25 ANDs the outputs Q and Qa of the D latch 23 and the 1-bit shift register 24, thus providing the index signal SI. A capacitor 26 removes glitches caused by deviation of timings between the outputs Q and Qa of the D latch 23 and the 1-bit shift register 24.

FIG. 14 is a timing chart illustrating the operation of the D latch 23, 1-bit shift register 24 and the AND gate 25, and FIG. 16 illustrates the phase relationship between the data input FG2 and the clock FG1. In this figure, the suffix x of Tx designates the sequence of the clock pulses numbered from T1. Each pulses applied to the D latch 23 lags the phase of the clock pulses FG1 by 225 degrees with regard to the data input FG2. Accordingly, as shown at the bottom of FIG. 14, the AND gate 25 outputs a pulse train consisting of one pulse per revolution, thus generating the index signal SI. As described in the third embodiment, the phase difference between the two binary signals FG1 and FG2 is set at least 22.5 (=360/(2×8)) degrees apart when the interval of the data input signal FG2 is assumed to be 360 degrees.

As a variation of the fourth embodiment, the AND gate 25 may be replaced by an OR gate. In this case, although the positions where pulses occur are changed, an index signal similar to that shown at the bottom of FIG. 14 is generated.

The index position detecting circuits of the present invention are constructed using the D latch as its major component. The D latch, however, can be replaced with a counter. Although a drawing is omitted here for simplicity, the fundamental idea of using a counter is as follows:

The signal FG1 is used as a set/reset signal, and the signal FG2 is used as a clock signal for a counter. Assuming that P1=8 and P2=65, the counter increments eight times or nine times until it is reset after set by the signal FG1. This means that nine time increments occur only once per revolution of the rotor, and that timing can be found by a preset circuit or the like. Thus, the index signal can be generated.

FIFTH EMBODIMENT

Figure 22:
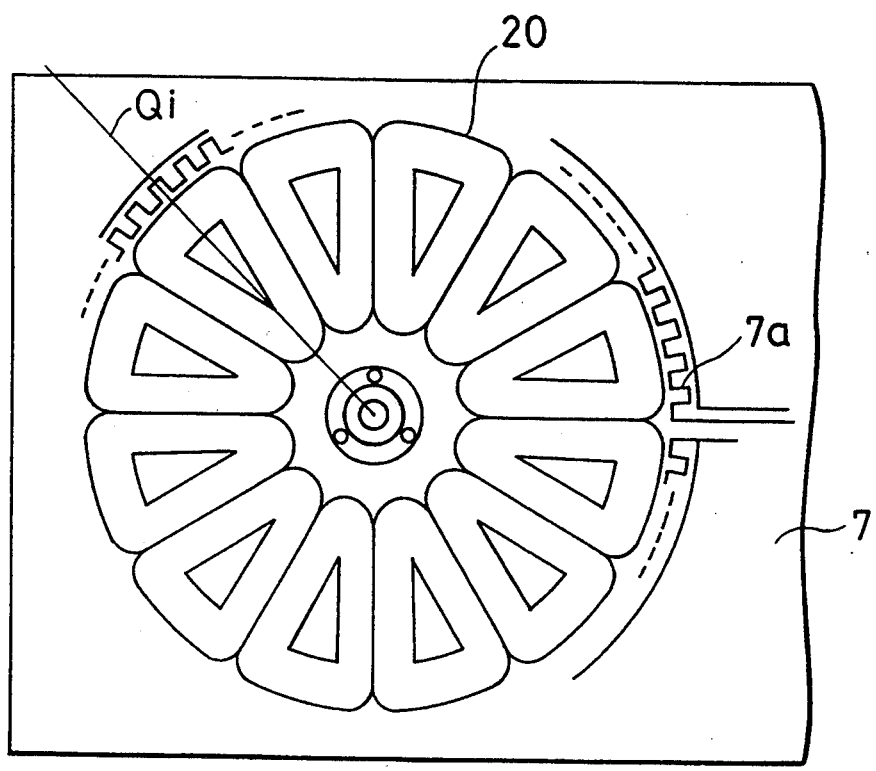
FIG. 22 is a plan view showing a stator portion of a circumference-opposing motor in accordance with a fifth embodiment, which is seen looking along the arrow B of FIG. 24 after removing a rotor unit 4.
Figure 23:
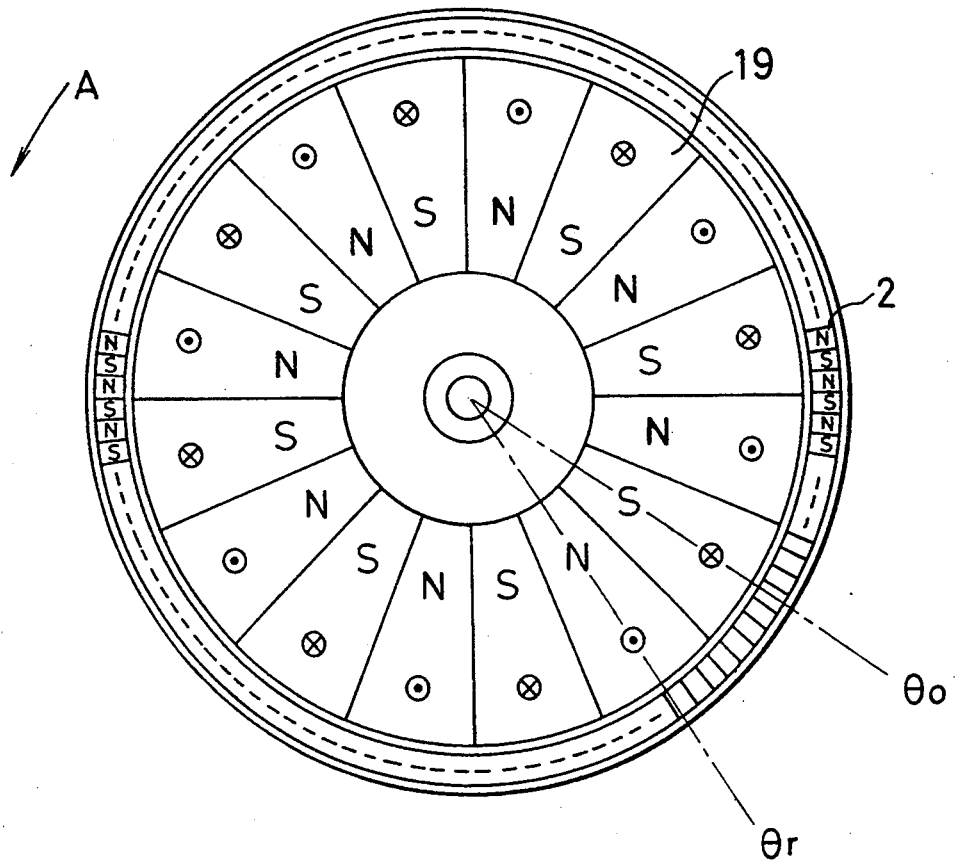
FIG. 23 is a horizontal sectional view showing a rotor portion of the circumference-opposing motor in accordance with the fifth embodiment, which is taken along line X—X of FIG. 24.
Figure 24:
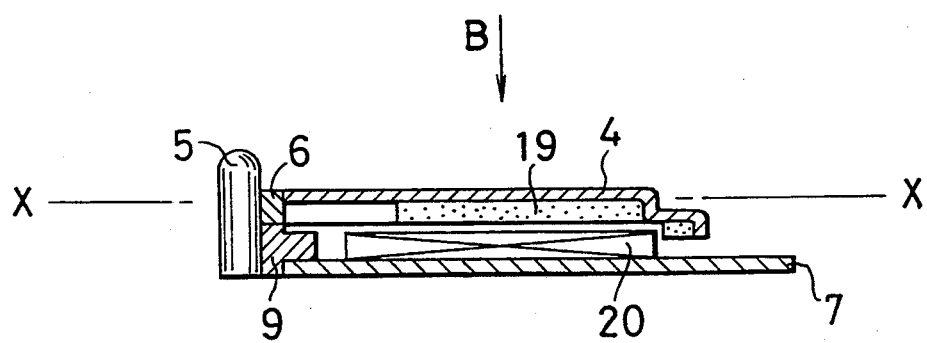
FIG. 24 is a partially sectional view of the circumference-opposing motor in accordance with the fifth embodiment.

As a fifth embodiment, an example will be explained wherein the third and fourth embodiments are applied to a plane-opposing type motor. FIG. 22 is a plan view seen looking along the arrow B of FIG. 24 after removal of a rotor unit 4, and FIG. 23 is a horizontal sectional view taken along line X—X of FIG. 24.

The plane-opposing type motor differs from the circumference-opposing type motor in that the ring-like driving magnet 1 is replaced by a disk-like driving magnet 19, the stator yokes 11 are removed, and the coils 10 are replaced with flat coils 20.

Compared with the conventional circumference-opposing type motor as shown in FIG. 1, the motor of this embodiment obviates the driving timing detecting Hall effect sensors 12a, 12b and 12c, and the Hall effect sensor 14 for detecting the index position. This makes it possible to enlarge the space for placing the coils 20, and hence, to increase the torque of the motor despite reducing the thickness thereof.

As an index position detecting circuit, the same circuit as that used by the third and fourth embodiments can be employed. Lines $\theta o$, $\theta r$ and $\theta i$ shown in FIGS. 22 and 23 correspond to those of FIG. 17. When the line $\theta r$ coincides with the $\theta i$, an index signal SI rises or falls, thus generating the index signal SI consisting one pulse per one revolution of the rotor.

In the third to fifth embodiments, two pulse trains are generated from the counterelectromotive voltages of coils and the frequency generating signal, and the index signal SI is formed from these signals. Thus, the driving timing detecting device 12, the index magnet 13 and the Hall effect sensor 14 for detecting the index position can be obviated. This makes it possible to reduce the size and thickness of the motor. In addition, the leakage flux originated from the index magnet can be eliminated.

Figure 25:
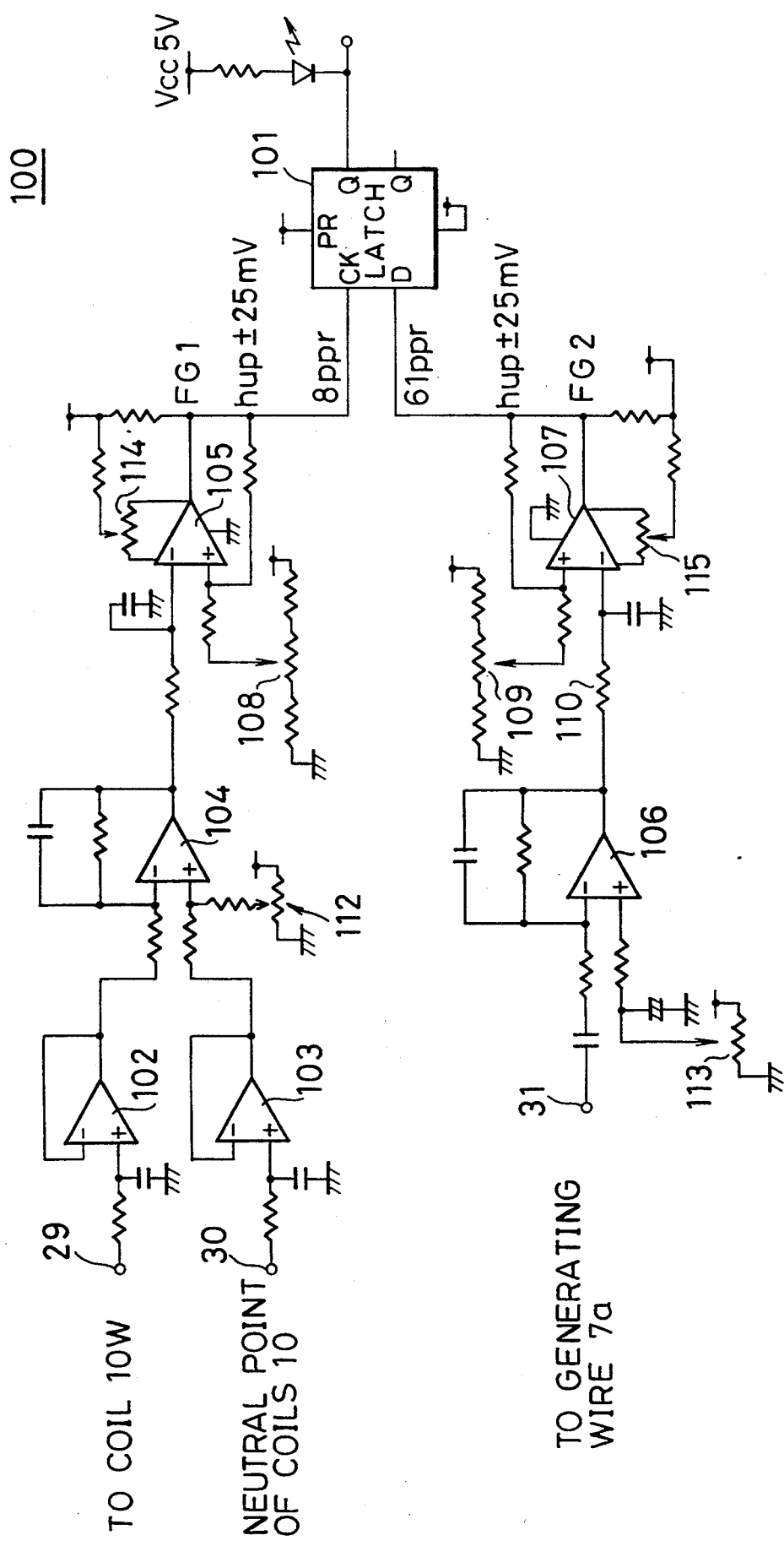
FIG. 25 is a circuit diagram illustrating an index position detecting circuit 100 and its associated circuits according to embodiments 3–5 of the present invention.

FIG. 25 is a circuit diagram illustrating an index position detecting circuit 100 and its associated circuits according to the third embodiment of the present invention. Amplifiers 102, 103 and 104, and a comparator 105 correspond to the comparator 16W shown in FIG. 19, and generate the signal FG1 on the basis of the counterelectromotive voltage of the coil 10W. Terminals 29 and 30 are connected to the coil 10W and the neutral point of the coils 10, respectively. On the other hand, an amplifier 106 and a comparator 107 correspond to the comparator 17 in FIG. 19, and generates the signal FG2.

With this arrangement, deviation between the positions of coils 10U, 10V and 10W and the generating wire 7a, fluctuation in the magnetized positions and intensity of frequency generating magnet 2, and offset voltages of the comparators may change the duty ratios and timings of the signals FG1 and FG2, and may cause the D latch 23 to mislatch. To prevent this, the threshold levels of the comparators 105 and 107 are adjusted as shown in FIG. 25. By adjusting the threshold levels of the comparators 105 and 107 with variable resistors, the phase of the pulses clock FG1 to the D latch 23 is made separate by more than 360/2P1 degrees (360/16=22.5 degrees) apart from the rising or falling edge of the data input FG2 to the D latch 23 when the interval of the data input FG2 is assumed 360 degrees. This makes it possible to prevent mislatch.

The above-mentioned index position detecting circuit 100, however, employs variable resistors to adjust the threshold levels of the comparators so as to control timings of the signals FG1 and FG2. Thus, space for mounting the variable resistors is necessary, and this hinders the motor from being made smaller in size and thinner in thickness. In addition, the cost increases because of additional steps for adjusting the variable resistors.

For this reason, a small, thin, inexpensive motor is proposed which obviates the volumes, variable resistors, and so the adjusting steps thereof.

SIXTH EMBODIMENT

Figure 26:
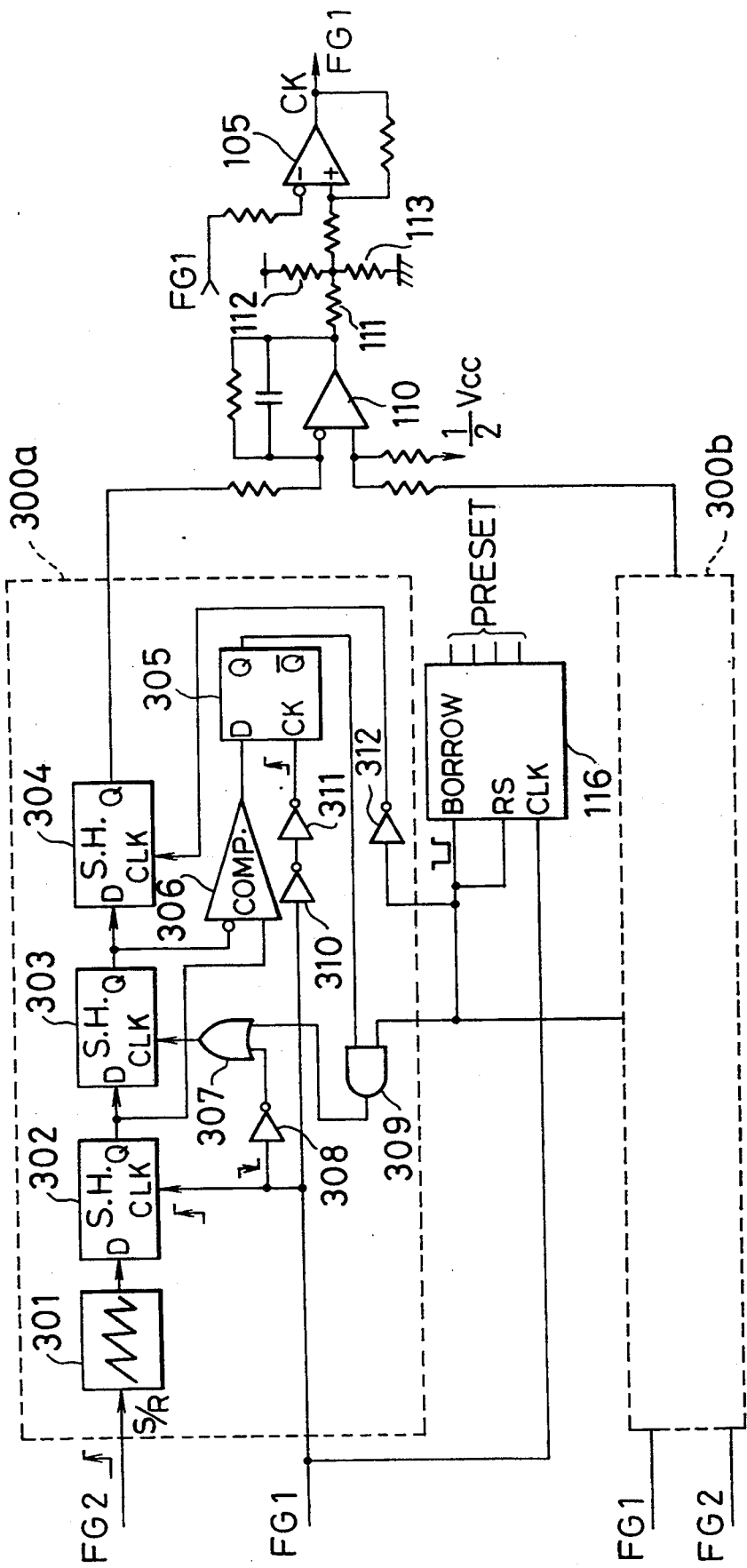
FIG. 26 is a block diagram showing an automatic adjusting circuit for the threshold levels in accordance with a sixth embodiment of the present invention.

FIG. 26 is a block diagram showing an automatic adjusting circuit for the threshold levels as a sixth embodiment of the present invention. The outputs of a first phase difference detecting circuit 300a and a second phase difference detecting circuit 300b are differentially amplified by a differential amplifier 110 whose output is applied through a resistor 111 to the noninverting input terminal of a comparator 105. Here, the first phase difference detecting circuit 300a detects the minimum value of the phase differences from the signal FG2 to the signal FG1 (that is, the interval from T1' to T1 of FIG. 13), whereas the second phase difference detecting circuit 300b detects the minimum value of the phase differences from the signal FG1 to the signal FG2 (that is, the interval from T8 to T2' of FIG. 13). According to this embodiment, the variable resistors 108, 109, 112, 113, 114 and 115 of FIG. 25 can be replaced by fixed resistors.

Next the operation of the automatic adjusting circuit will be described. First, the operation of the first phase difference detecting circuit 300a will be explained. The pulse train FG2 is inputted to the set/reset terminal of a triangular-wave oscillator 301. The edge of the pulse train FG2 triggers the oscillation of a triangular wave. The triangular-wave oscillator 301 converts the phase difference between the pulse trains FG1 and FG2 into a crest value. The output of the triangular-wave oscillator 301 is inputted to a first sample-and-hold circuit 302 which sample-and-holds the triangular wave by a rising edge of the pulse train FG1. Thus, the phase difference (or the time interval) from a rising edge of the pulse train FG2 at time T1' of FIG. 13 to a rising edge of the pulse train FG1 at one of the times T1–T8 is outputted at the output Q of the sample-and-hold circuit 302. Thus, the phase difference between time T1' at which the signal FG2 rises and time Tx (Tx is one of the times T1 to T8) at which a pulse of signal FG1 occurs is sampled and held. The output of the first sample-and-hold circuit 302 is inputted to a second sample-and-hold circuit 303 which selects the minimum value of the phase differences from a pulse of the signal FG2 to a pulse of signal FG1 detected by the first sample-and-hold circuit 302, that is, the time interval from time T1' to time T1 as shown in FIG. 13.

Thus, the second sample-and-hold circuit 303 holds the detected minimum value. It sample-and-holds the output of the first sample-and-hold circuit 302 only when the current output of the circuit 302 is smaller than the previous value. As shown in FIG. 26, this operation is accomplished by a comparator 306 comparing the outputs of the first and second sample-and-hold circuits 302 and 303, a D latch 305, inverters 308, 310 and 311, and an OR gate 307. The output of the second sample-and-hold circuit 303 is sampled and held by a third sample-and-hold circuit 304 once per one revolution of the rotor, and is supplied to the differential amplifier 110.

The clock signal for the third sample-and-hold circuit 304 is supplied from the borrow output of a presettable counter 116 to the clock terminal of the third sample-and-hold circuit 304 via an inverter 312. The borrow output of the counter 116 is also inputted to an AND gate 309 so as to reset the second sample-and-hold circuit 303 once per revolution of the rotor. The preset value of the counter 116 is eight, and the number of pulses of the pulse train FG1 is also eight per one revolution of the rotor. Therefore, the borrow signal is outputted once per one revolution of the rotor 4.

The second phase difference detecting circuit 300b operates in a manner similar to the first phase difference detecting circuit 300a, and detects the time interval from T8 to T2' of FIG. 13. The output of the second phase difference detecting circuit 300b is inputted to the differential amplifier 110.

The output of the first phase difference detecting circuit 300a, i.e., the phase difference from time T1' to time T1, and the output of the second phase difference detecting circuit 300b, i.e., the phase difference from time T8 to time T2', are inputted to the inverting and noninverting inputs of the differential amplifier 110, respectively. The differential amplifier 110 integrates the difference of the two inputs, and the output thereof is supplied via the resistor 111 to the noninverting input of the comparator 105 converting the signal FG1 into a binary signal. This corresponds to changing the threshold level of the comparator 105, and alters the timing of the rising or falling edge of pulses of the signal FG1. This means that the timings (or phases) of the times T1–T8 are uniquely changed: the phase difference of the pulses of the signals FG1 and FG2 are made as large as possible by appropriately setting the threshold level of the comparator 105 by using resistors 112 and 113, and by feeding back through the resistor 111 the output of the differential amplifier 110 (that is, the difference between the phase difference from T1' to T1 and the phase difference from T8 to T2') to the threshold level of the comparator 105. Thus, an automatic adjusting circuit for setting the phase difference as large as possible can be achieved.

SEVENTH EMBODIMENT

Figure 27:
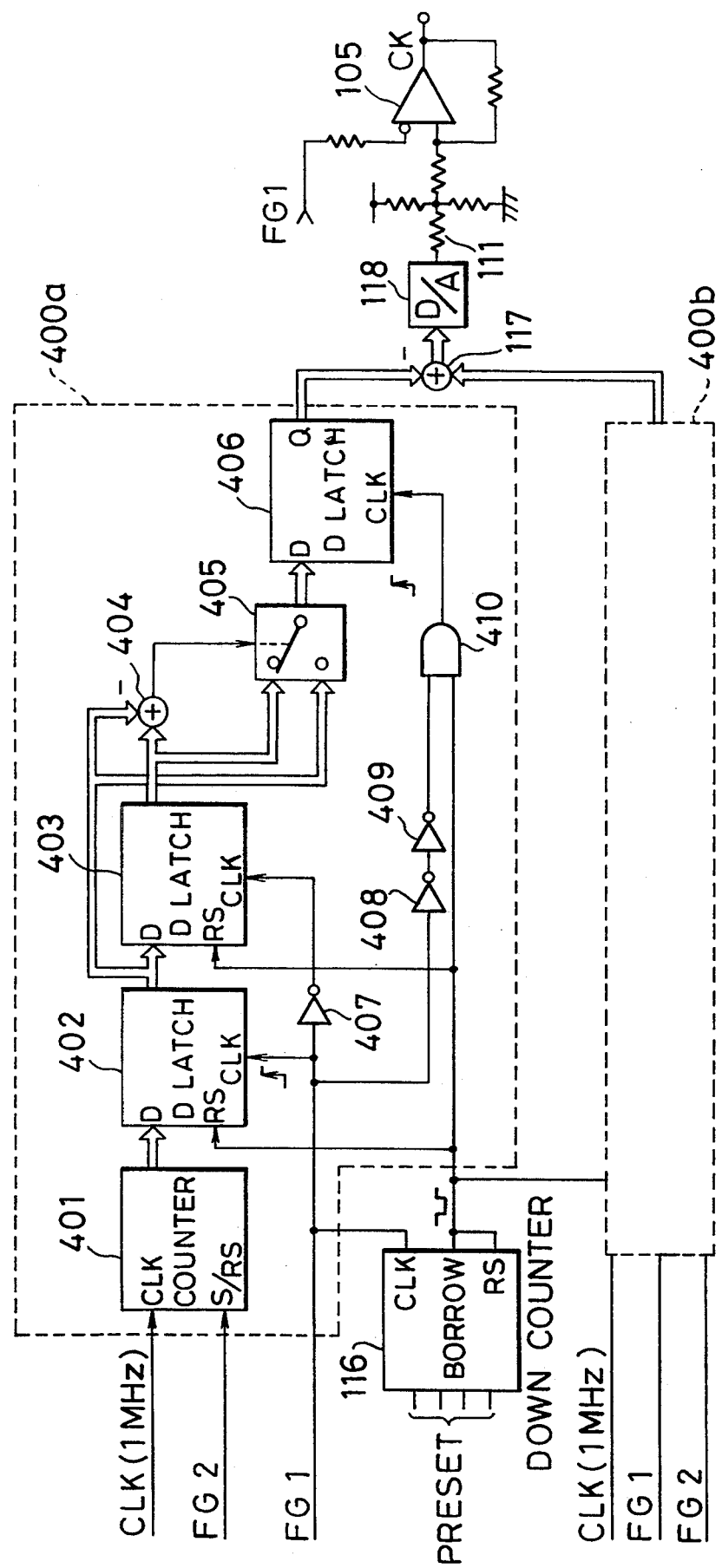
FIG. 27 is a block diagram showing an automatic adjusting circuit for the threshold levels in accordance with a seventh embodiment of the present invention.

FIG. 27 is a block diagram showing an automatic adjusting circuit for the threshold levels as a seventh embodiment of the present invention. This embodiment employs a counter and D latches instead of the triangular-wave oscillator and the sample-and-hold circuits. The outputs of a first phase difference detecting circuit 400a and a second phase difference detecting circuit 400b are supplied to a subtracter 117 which outputs the difference of the two input signals. The output of the subtracter 117 is converted into an analog signal by a DA converter 118, and the analog signal is applied to the noninverting input terminal of a comparator 105 via a resistor 111. Here, the first phase difference detecting circuit 400a detects the minimum value of the phase differences from the signal FG2 to the signal FG1 (that is, the interval from T1' to T1 of FIG. 13), whereas the second phase difference detecting circuit 400b detects the minimum value of the phase differences from the signal FG1 to the signal FG2 (that is, the interval from T8 to T2' of FIG. 13). According to this embodiment, the variable resistors 108, 109, 112, 113, 114 and 115 of FIG. 25 can be replaced by fixed resistors.

Next the operation of the automatic adjusting circuit will be described. First, the operation of the first phase difference detecting circuit 400a will be explained. The pulse train FG2 is inputted to the set/reset terminal of a first counter 401. A clock signal of 1 MHz is applied to the clock terminal of the first counter 401 as a reference signal. The output of the first counter 401 is inputted to a first D latch 402 which latches the output of the first counter 401 by the rising edge of pulses of the signal FG1. Thus, the first D latch 402 latches the phase difference between the pulses of the pulse trains FG2 and FG1 in terms of count value. The output of the first D latch 402 is supplied to a second D latch 403.

The second D latch circuit 403 latches the output of the first D latch 402 at a timing half a cycle later than that of the first D latch 402. The clock signal for the second D latch circuit 403 is generated by inputting the pulse train FG1 to an inverter 407. The outputs of the first and second D latches 402 and 403 are compared by a subtracter 404. The output of the subtracter 404 is converted into a binary signal, and is inputted to the control terminal of a multiplexer 405. The multiplexer 405 outputs the smaller one of the outputs of the first and second D latches 402 and 403, and supplies it to the data input terminal of a third D latch 406. The third latch 406 latches the input by a rising edge of a signal formed by delaying the pulse train FG1 through delay circuits 408 and 409. The output of the third latch circuit 406 is inputted to the subtracter 117 as a minimum value of the phase differences from pulses of the pulse train FG2 to pulses of the pulse train FG1.

The clock signal to the third D latch circuit 406 is produced by an AND gate 410 which ANDs the borrow output of a presettable counter 116 and the output of the delay circuit 408, 409. The borrow output of the presettable counter 116 resets the first and second D latches 402 and 403 once per one revolution of the rotor.

The second phase difference detecting circuit 400b operates in a manner similar to the first phase difference detecting circuit 400a, and supplies its output to the subtracter 117.

In the index position detecting circuit described above, the pulse train FG2 is generated from the counterelectromotive voltage induced in the coil. The pulse train, however, can be produced by utilizing the output of the Hall effect sensor for detecting driving timings, or the output of a second generating wire.

Next, three embodiments employing a pair of frequency generating signals to detect an index position will be explained as eighth to tenth embodiments. These embodiments are common in that they generate two frequency generating signals, but are different in the ways they process the two frequency generating signals.

Referring to FIGS. 28–31, the principle of producing two frequency generating signals will be explained, which is common to the three embodiments.

Figure 28:
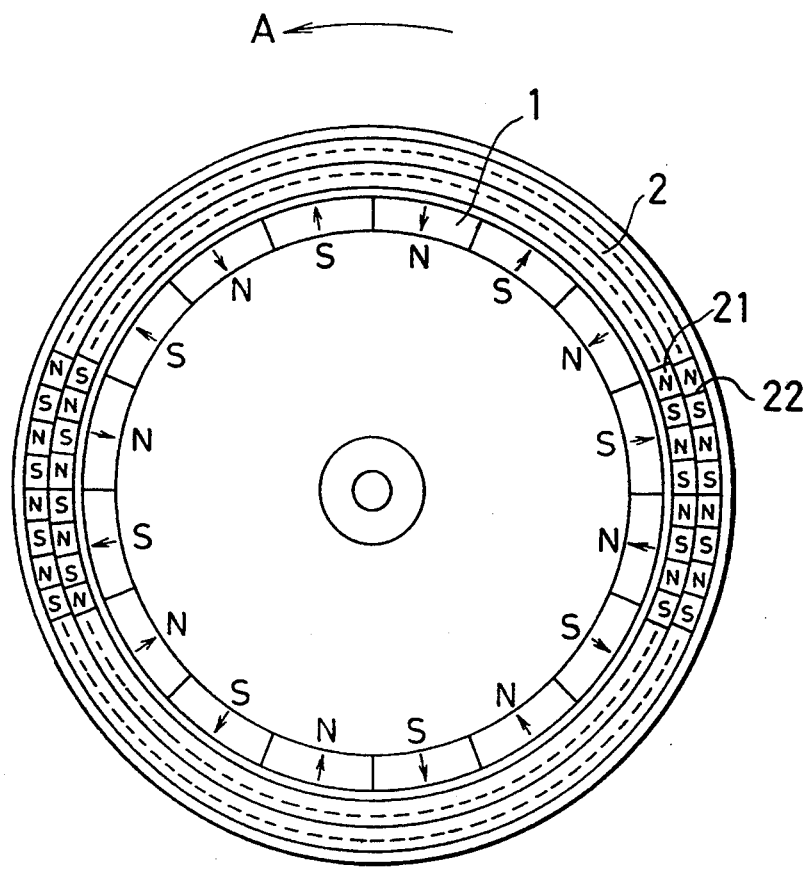
FIG. 28 is a plan view showing a rotor and a stator of a circumference-opposing type motor in accordance with embodiments 8–10, which illustrates a magnetized pattern common to those embodiments.
Figure 29:
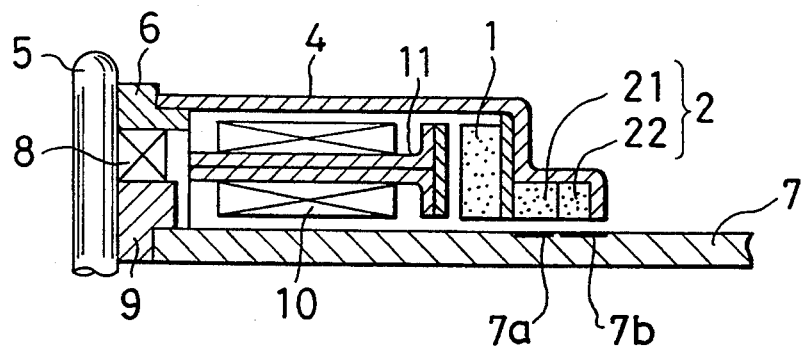
FIG. 29 is a cross sectional view associated with FIG. 28.
Figure 30:
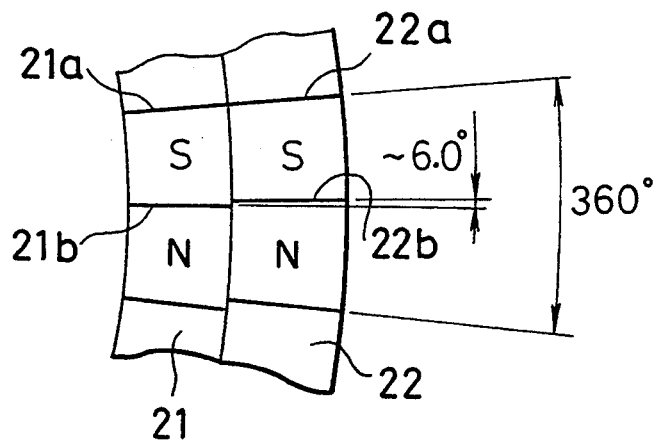
FIG. 30 is a partially enlarged plan view illustrating an example of a method for forming the frequency magnetized patterns of FIG. 28.

FIG. 28 is a plan view showing a rotor and a stator of a circumference-opposing type motor in accordance with the embodiments, FIG. 29 is a cross sectional view associated with FIG. 28, and FIG. 30 is a partially enlarged plan view illustrating an example of a method for forming frequency magnetized patterns.

As shown in FIGS. 28 and 29, these embodiments have two frequency generating magnets 21 and 22, and generate an index signal from these two frequency generating signals. As a result, they obviate the driving timing detecting device 12, the index magnet 13, and the Hall effect sensor 14, which are needed in the conventional apparatus as shown in FIGS. 1 and 2. Thus, as is easily seen by comparing FIGS. 28 and 29 with FIGS. 1 and 2, the apparatus of the embodiments as shown in FIGS. 28 and 29 has a considerably smaller size than the conventional apparatus as shown in FIGS. 1 and 2.

An arrangement for generating the two frequency generating signals, which enables the motor to be reduced in size, will now be described.

A frequency generating means comprises a frequency generating magnet 2 and two generating wires 7a and 7b. The frequency generating magnet 2 includes two concentric magnetized patterns 21 and 22 each of which consists of alternate N and S poles as shown in FIGS. 28 and 30. The generating wires 7a and 7b are disposed in opposition to these magnetized patterns 21 and 22, respectively, as shown in FIG. 29.

Figure 31:
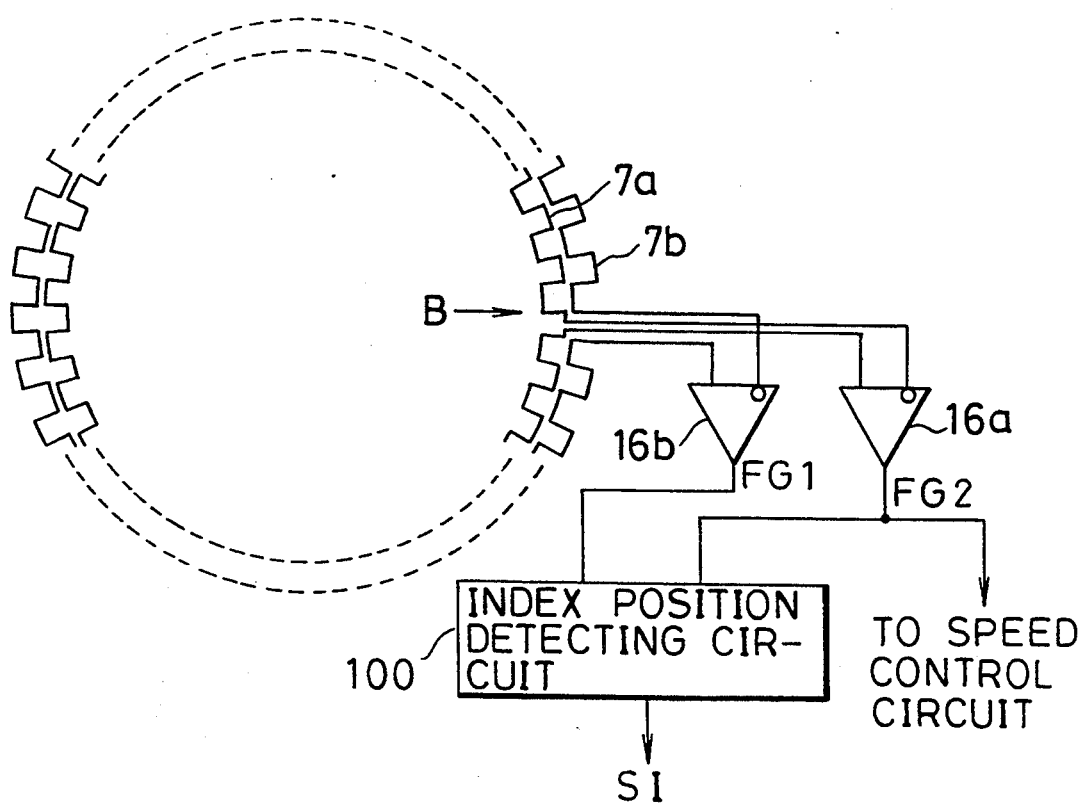
FIG. 31 is a plan view showing the arrangement of generating wires 7a and 7b in FIG. 29.

FIG. 31 is a plan view showing an arrangement of the generating wires 7a and 7b. The generating wires 7a and 7b are formed on a substrate 7 as copper patterns or the like. The generating wire 7a detects changes in the magnetic flux of the magnetized pattern 21 as a voltage, whereas the generating wire 7b detects those of the magnetized pattern 22 as a voltage.

In FIG. 31, outputs of the generating wires 7a and 7b are amplified by differential amplifiers 16a and 16b, respectively. The output of the amplifier 16a, corresponding to a signal detected by the inner generating wire 7a, is sent to an index position detecting circuit 100 and a speed control circuit. Since the arrangement and operation of the speed control circuit is not involved in the present invention, the description thereof is omitted here. The index position detecting circuit 100 receives the outputs of the differential amplifiers 16a and 16b, and outputs an index signal.

The operational principle of the index position detecting circuit 100 will now be described.

Let us assume that the generating wire 7a, the magnetized pattern 21 and the amplifier 16a generate P1 pulses per one revolution of the rotor yoke 4, and that the generating wire 7b, the magnetized pattern 22 and the amplifier 16b generate P2 pulses per one revolution of the rotor yoke 4. The number P1 is determined by the number of elements of the generating wire 7a and the number of transitions of the magnetized patter 21, whereas the number P2 is determined by the number of elements of the generating wire 7b and the number of transitions of the magnetized patter 22. The numbers P1 and P2 are determined such that their greatest common divisor is one, that is, they are prime to each other. The index signal is usually generated once per one revolution. This is because the index position detecting circuit 100 is constructed to generate the index signal when the phases of the two signals FG1 and FG2 outputted from the amplifiers 16a and 16b coincide.

A more general relationship between the pulse numbers P1 and P2 can be obtained as follows: To generate an index signal SI consisting of m pulses per one revolution, the phases of the two pulse trains FG1 and FG2 must coincide m times per revolution. This relationship can be expressed by $$P1 = m \times k1 \quad (8)$$

$$P2 = m \times k2 \quad (9)$$

where m, k1 and k2 are natural numbers. Equations (8) and (9) indicate that when the pulses of the pulse trains FG1 and FG2 are produced k1 and k2 times, respectively, the first match of the phases of the pulse trains FG1 and FG2 occurs, that when the pulses of the pulse trains FG1 and FG2 are produced k1 and k2 times once again, the second match of the phases of the pulse trains FG1 and FG2 occurs, and that when the pulses of the pulse trains FG1 and FG2 are produced $m \times k1$ and $m \times k2$ times, respectively, the m-th match of the phases of the pulse trains FG1 and FG2 occurs. In other words, the index signal takes place m times per revolution when m is the greatest common divisor of P1 and P2.

As a special case, when k1 and k2 are prime to each other in equations (8) and (9), the match of phases of the pulse trains FG1 and FG2 does not take place until the pulses of FG1 and FG2 occur k1 and k2 times, respectively. This means that the necessary and sufficient conditions for generating the index signal SI consisting of m pulses per revolution are that the greatest common divisor of P1 and P2 is m.

In particular, when m=1, P1 and P2 are prime to each other, the index signal SI consists of one pulse per one revolution, which is the case for common motors.

The above is the principle of the eighth to tenth embodiments. Each of these embodiments will be described highlighting the way of obtaining the index signal from the two pulse trains FG1 and FG2. In these embodiments, it is assumed that the index signal consists of one pulse per one revolution, which is most commonly used. In other words, it is assumed that P1 and P2 are prime to each other.

EIGHTH EMBODIMENT

FIG. 12 is a circuit diagram of an index position detecting circuit 100 in accordance with an eighth embodiment of the present invention. This circuit consists of a D latch 23. The binary signal FG1 is supplied to the clock input CK of the D latch 23 and the binary signal FG2 is supplied to the data input D of the D latch 23. The output of the D latch 23 is the index signal SI.

One of the most simple examples wherein P1 and P2 are prime to each other can be given by $$P2 = P1 \pm 1 \quad (10)$$

By generalizing this relation, the following equation is obtained.

$$P2 = P1 \times n \pm 1 \quad (11)$$

As shown in FIGS. 28 and 30, the generating wire 7a generates 30 (=P1) pulses per one revolution of the rotor yoke 4, corresponding to the number of poles of the frequency generating magnetized pattern 21 and the number of elements of the generating wires 7a. The generating wire 7b, on the other hand, generates 31 (=P2) pulses per one revolution of the rotor yoke 4, corresponding to the number of poles of the frequency generating magnetized pattern 22 and the number of elements of the generating wires 7b.

Figure 32:
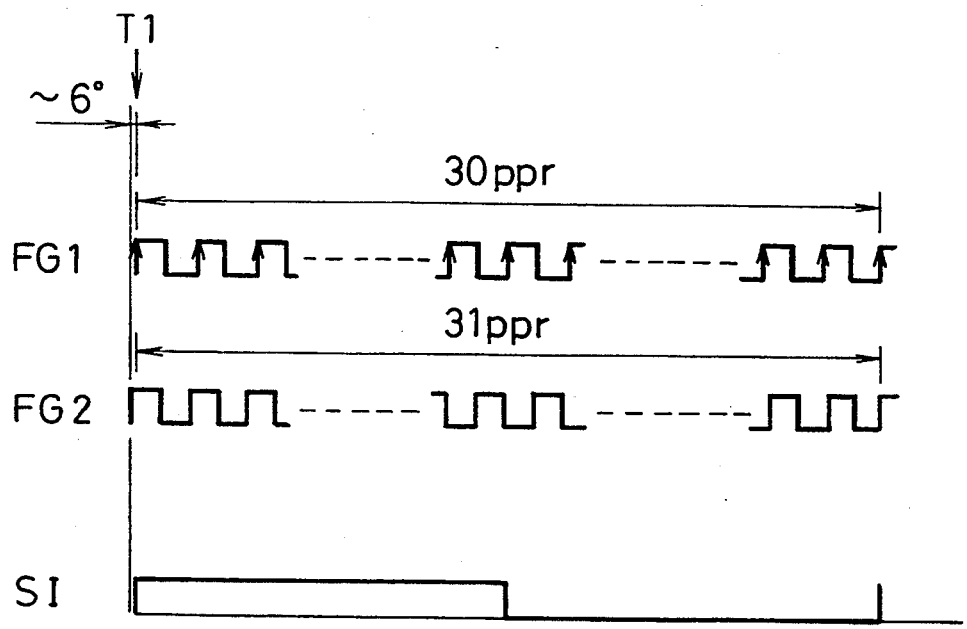
FIG. 32 is a diagram illustrating the waveforms of signals FG1 and FG2 inputted to the index position detecting circuit 100 of FIG. 12, and the waveform of an index signal SI outputted therefrom, when P1=30, and P2=31, in accordance with the eighth embodiment.

FIG. 32 illustrates the waveforms of signals FG1 and FG2 inputted to the index position detecting circuit 100 of FIG. 12, and the waveform of an index signal SI outputted therefrom, when P1=30, P2=31, and n=1. When P1<P2, the phase of the signal FG1 gradually lags with regard to the phase of the signal FG2. As a result, after the signal FG2 has been latched to the D latch 23 by a rising edge of the signal FG1 at time T1 as shown in FIG. 32, the D latch 23 is reset when the rotor rotates half a revolution, and is set again when the rotor rotates another half a revolution. Thus, the latch 23 repeats a set/reset operation per one revolution of the rotor.

Figure 33:
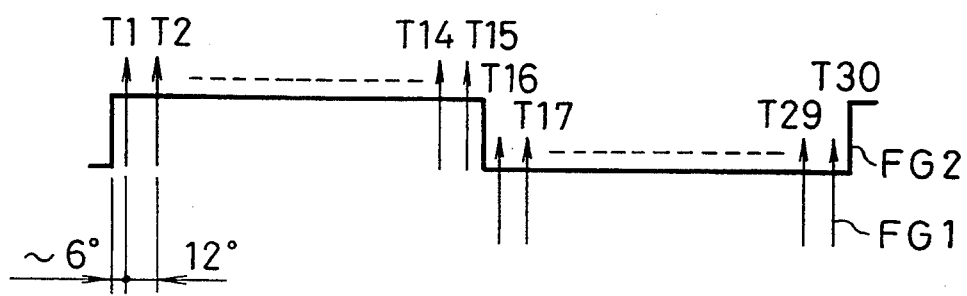
FIG. 33 is a diagram illustrating the phase relationship between the data input FG2 and the clock signal FG1 in accordance with the eighth embodiment.

As is well-known, the operation of the D latch 23 becomes unstable when the phase difference between the clock signal and the data signal is very small. To prevent such faulty operation, the phase difference between the two binary signals FG1 and FG2 is set at about 6 (=360/(2×30)) degrees apart at time T1 when the interval of the data input signal FG2 is assumed to be 360 degrees. FIG. 33 illustrates the phase relationship between the data input FG2 and the clock pulses FG1. In this figure, the suffix x of Tx designates the sequence of the clock pulses numbered from T1. Each pulse applied to the D latch 23 lags the phase of the clock pulses FG1 by 12 degrees with regard to the data input FG2. Accordingly, the output SI of the D latch 23 is reversed at the 16-th and 31-th pulse inputs as shown in FIG. 33, thus producing an index signal SI consisting of one pulse per one revolution as shown at the bottom of FIG. 32.

Fluctuation the magnetized positions and intensity of frequency generating magnetized patterns 21 and 22, positional deviation of the generating wires 7a and 7b, and offset voltages of the differential amplifiers 16a and 16b may change the duty ratios and timings of the signals FG1 and FG2, and may cause mislatch of the D latch 23. To prevent this, the phase relationships between the frequency generating magnetized patterns 21 and 22, and between the generating wires 7a and 7b are set such that the phase of the clock pulses FG1 to the D latch 23 is made separate by more than 360/2P1 degrees (360/60=6 degrees) apart from the rising or falling edge of the data input FG2 to the D latch 23 when the interval of the data input FG2 is assumed to be 360 degrees.

More specifically, in an example illustrated in FIGS. 28, 30 and 31, the boundary line 21b of the frequency generating magnetized pattern 21 is separated six degrees apart from the boundary line 22b of the frequency generating magnetized pattern 22, where it is assumed that P1=30, P2=31 and n=1, the interval of the data input FG2 corresponding to a couple of N and S poles is 360 degrees, the rotor yoke 4 rotates in the direction indicated by the arrow A in FIG. 28, the phases of the two frequency generating magnetized patterns 21 and 22 coincide at boundary lines 21a and 22a immediately before the boundary lines 21b and 22b, and the phases of the generating wires 7a and 7b coincide at the position indicated by the arrow B.

With this setting, two pulse trains FG1 and FG2 are generated as shown in FIG. 32, and the phase difference between an edge of the data input FG2 and a rising edge of the signal FG1 is made great as possible. This makes it possible to prevent faulty operation.

NINTH EMBODIMENT

In this embodiment, pulse numbers P1 and P2 are prime to each other as in the eighth embodiment. In the ninth embodiment, however, P1 and P2 are related by the following expression.

$$P2 = P1 \times (n+0.5) \pm 1 \quad (12)$$

FIG. 14 illustrates a relationship between the binary signals FG1 and FG2 when P1=8, P2=61, and n=7 in equation (12) expressing the relation of these values. In other words, the signals FG1 and FG2 consist of eight and 61 pulses per one revolution of the rotor yoke 4, respectively.

FIG. 15 shows an arrangement of the ninth embodiment of the index position detecting circuit 100. As shown in FIG. 15, the binary signal FG1 is supplied to the clock input CK of a D latch 23 and the clock input CK of a 1-bit shift register 24, and the binary signal FG2 is supplied to the data input D of the D latch 23. Pulses of the binary signal FG2 are latched by rising edges of pulses of the binary signal FG1. The output of the D latch 23 is supplied to the data input D of the 1-bit shift register 24 and an AND gate 25. The AND gate 25 ANDs the outputs Q and Qa of the D latch 23 and the 1-bit shift register 24, thus producing the index signal SI. A capacitor 26 removes glitches caused by deviation of the timings between the outputs Q and Qa of the D latch 23 and the 1-bit shift register 24.

FIG. 14 is a timing chart illustrating the operation of the latch 23, the 1-bit shift register 24 and the AND gate 25. FIG. 16 shows the relationship of phases between the data input FG2 and the clock input FG1. In this figure, the suffix x of Tx designates the sequence of the clock pulses numbered from T1. Each pulse applied to the D latch 23 lags the phase of the clock pulses FG1 by 22.5 degrees with regard to the data input FG2. Accordingly, as shown at the bottom of FIG. 14, the AND gate 25 outputs a pulse train consisting of one pulse per revolution, thus generating the index signal SI.

As a variation of the ninth embodiment, the AND operation of FIG. 15 may be replaced with an OR operation. In this case, although the positions where pulses occur are changed, an index signal similar to that shown at the bottom of FIG. 14 is generated.

TENTH EMBODIMENT

Figure 34:
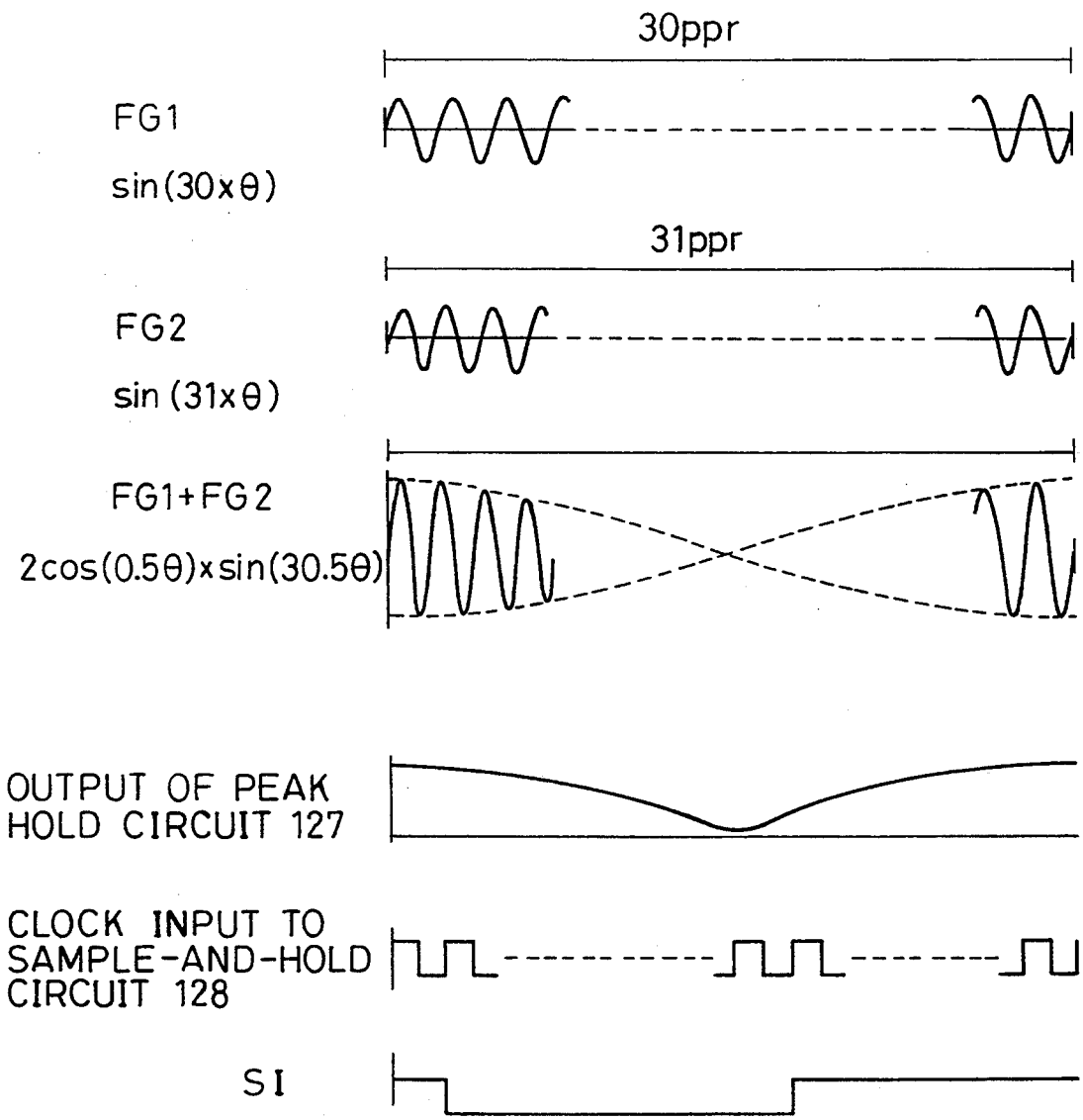
FIG. 34 is a diagram illustrating phase relationships among various signals of a tenth embodiment.
Figure 35:
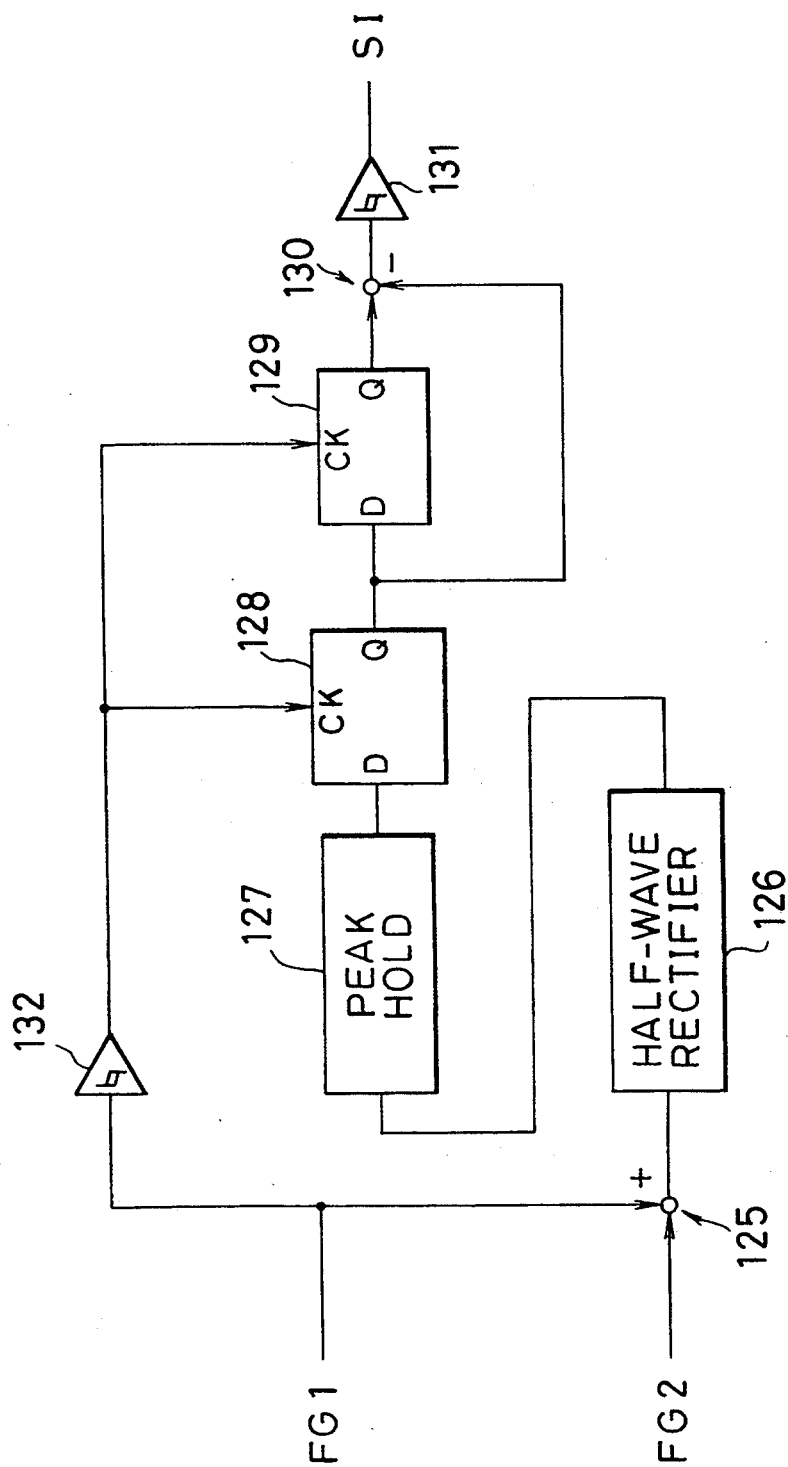
FIG. 35 is a block diagram of an index position detecting circuit 100 in accordance with the tenth embodiment.

Referring to FIGS. 34 and 35, a tenth embodiment will be described. The eighth and ninth embodiments detect coincident timings of the phases of the signals FG1 and FG2 by detecting the phase difference between the signals FG1 and FG2. In contrast, the tenth embodiment detects coincident timings of the phases of signals FG1 and FG2 by detecting changes in the levels of signals FG1 and FG2. In this embodiment, it is assumed that the numbers P1 and P2 of pulses of the pulse trains FG1 and FG2 are limited by the following expression for convenience of comparison with the eighth embodiment.

$$P1 = P2 \pm 1 \quad (13)$$

In other words, P1 and P2 are primes to each other, and P1=30 and P2=31, in this embodiment FIG. 35 is a block diagram of an index position detecting circuit 100 in accordance with the tenth embodiment. In this embodiment, the signals FG1 and FG2 can be expressed by the following equations:

$$FG1 = \sin(30\theta) \quad (14)$$

$$FG2 = \sin(31\theta) \quad (15)$$

where the angle of rotation of the rotor yoke 4 is $\theta$. The signals FG1 and FG2 are added by an adder 125. The result of the addition is given by $$FG1 + FG2 = 2\cos(0.5\theta) \times \sin(30.5\theta) \quad (16)$$

and is AM modulated as shown in FIG. 34. The output of the adder 125 is inputted to a half-wave rectifier 126 where it is half-wave rectified. The output of the rectifier 126 is inputted to a peak hold circuit 127 which outputs a waveform illustrated in FIG. 34.

In FIG. 35, the FG1 signal is converted into a binary signal by a comparator 132. The FG1 signal outputted from the comparator 132 is supplied as clock signal to a zero-order sample-and-hold circuit 128 and an analog data 1-bit delay circuit 129. The output of the peak-hold circuit 127 is applied to the data input terminal of the zero-order sample-and-hold circuit 128, and the output of the zero-order sample-and-hold circuit 128 is supplied to the data input terminal of the analog data 1-bit delay circuit 129. The analog data 1-bit delay circuit 129 samples and holds the input data at a first clock pulse, and outputs sampled and held data from its output terminal Q at the next clock pulse. Subsequently, the output of the 1-bit delay circuit 129 and the output of the sample-and-hold circuit 128 are inputted to a subtracter 130. The subtracter 130 compares the two input data which are different in timing by one clock pulse. The output of the subtracter 130 is inputted to a comparator 131. An index signal SI as shown in FIG. 34 is obtained as the output of the comparator 131.

The peak-hold circuit 127 may be replaced by a low-pass filter, resulting in a similar effect. The clock signal is not restricted to a binary signal outputted from the generating wire 7b. For example, a binary output of a Hall effect sensor or the like which detects the driving timings of the driving coils of a three-phase brushless motor can achieve a similar effect. Alternately, an external clock signal in synchronism with the rotation of the rotor can also be used.

In the eighth to tenth embodiments described above, two types of frequency generating magnetized patterns 21 and 22 are provided on a surface of the frequency generating magnet 2 opposite to the iron substrate 7, as shown in FIG. 28. Both patterns 21 and 22 are centrosymmetric with respect to the center of the rotor 4, and form a closed area surrounding that center. In other words, the patterns enclose the area revolving around the center.

Figure 36:
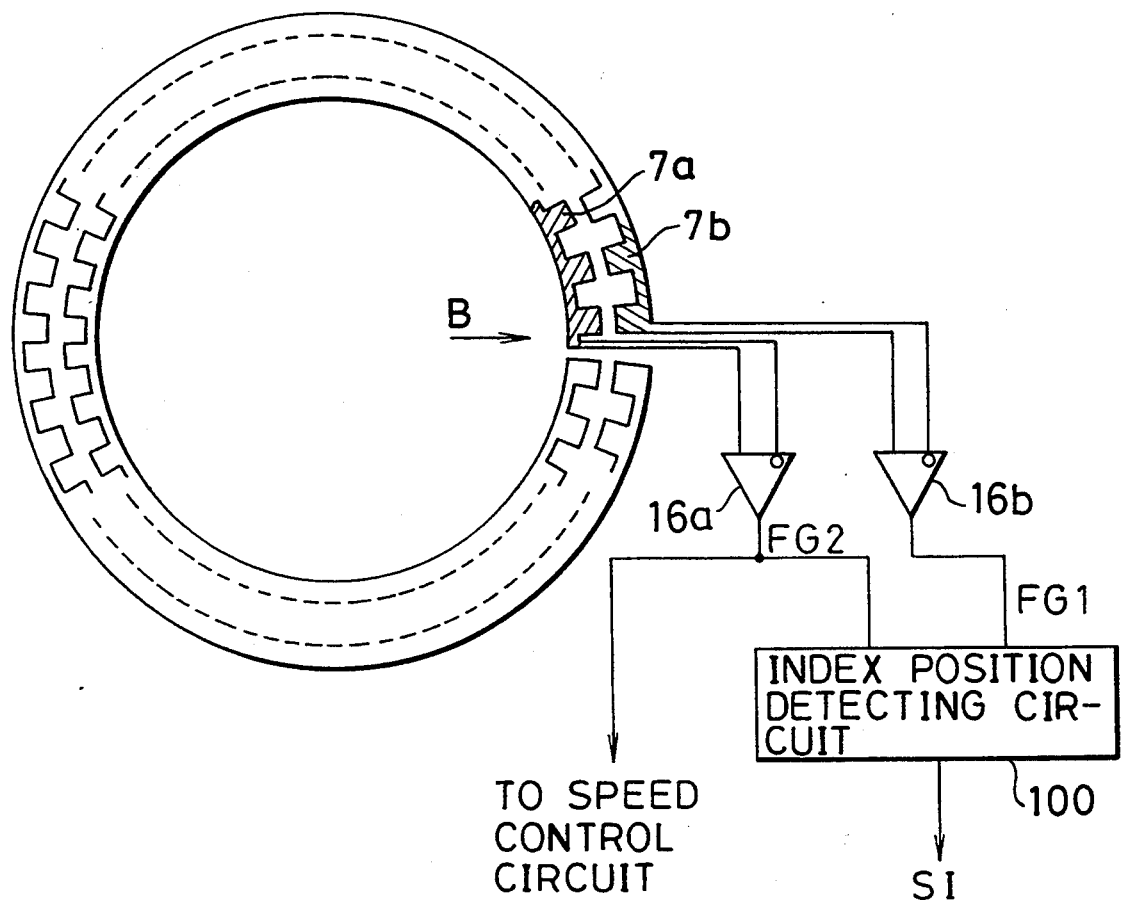
FIG. 36 is a diagram illustrating a variation of the magnetized patterns 21 and 22 of embodiments 8–10.

FIG. 36 illustrates a variation of the magnetized patterns 21 and 22. Each of patterns 7a and 7b of this variation U-turns after it has extended once around the center. Thus, each of the patterns 7a and 7b surrounds only an area opposing to each one of the magnetized patterns 21 and 22. Therefore they are little affected by leakage flux from the other magnetized pattern and the driving magnet, thereby improving the S/N ratio of the frequency generating signals FG1 and FG2.

Figure 37:
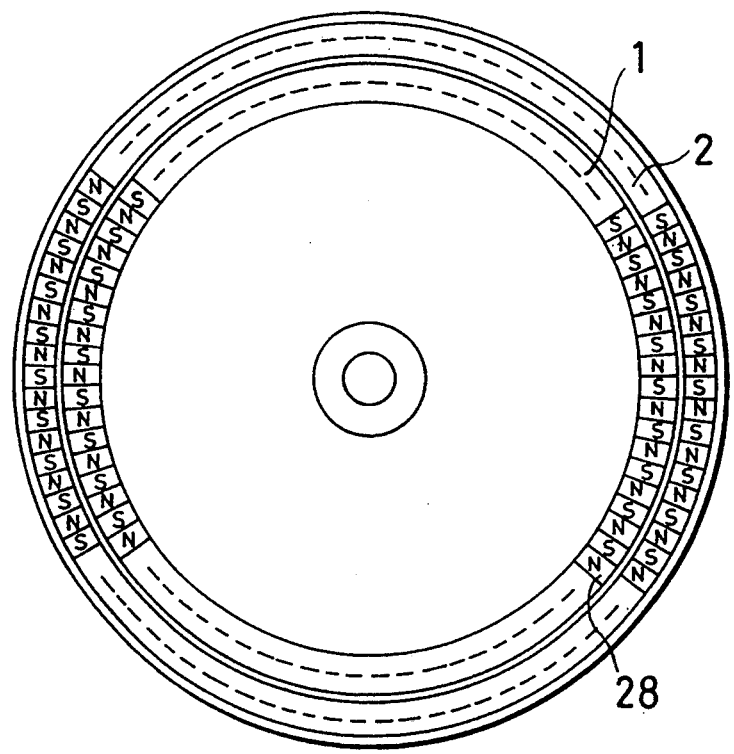
FIGS. 37 and 38 are plan and partially sectional views illustrating magnetized patterns in accordance with another variation of embodiments 8–10.
Figure 38:
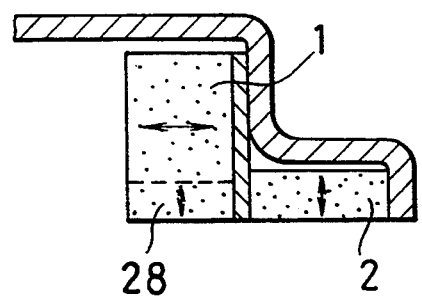

FIGS. 37 and 38 illustrate another variation of the eighth to tenth embodiments. As shown in these figures, a frequency generating pattern 28 for generating one of the frequency generating signals FG1 and FG2 is formed on a surface of the driving magnet 1, the surface being in opposition to the iron substrate 7. Thus, the induced voltage in the generating wire is increased. Both of the magnetized patterns 21 and 22 may be formed on the surface of the driving magnet 1, which surface faces the iron substrate 7. Thus, the frequency generating magnet 2 can be removed, realizing a reduction in the size and cost of a motor.

The eighth to tenth embodiments of the present invention can be applied not only to a circumference-opposing type spindle motor, but also to a plane-opposing type motor. Furthermore, the embodiments can be applied to a motor in general having an index position detecting apparatus.

In the eighth to tenth embodiments described above, the index signal is formed from the two frequency generating signals FG1 and FG2. As a result, the driving timing detecting devices 12a, 12b and 12c, the index magnet 13, and the Hall effect sensor 14, which are required in the conventional apparatus as shown in FIGS. 1 and 2, become unnecessary. This makes it possible to considerably reduce the size of the motor of these embodiments. Moreover, since the index magnet 13 is removed, the problem of leakage flux is eliminated.

Next, an embodiment will be described which obtains exciting timings by employing n-phase generating wires instead of the Hall effect sensors 12a-12c detecting the exciting timings as shown in FIG. 1.

ELEVENTH EMBODIMENT

Figure 39:
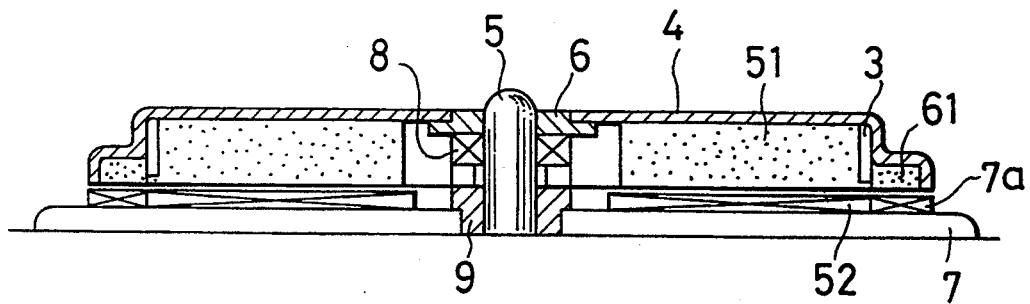
FIG. 39 is a cross-sectional view of a plane-opposing type motor in accordance with an eleventh embodiment.
Figure 40:
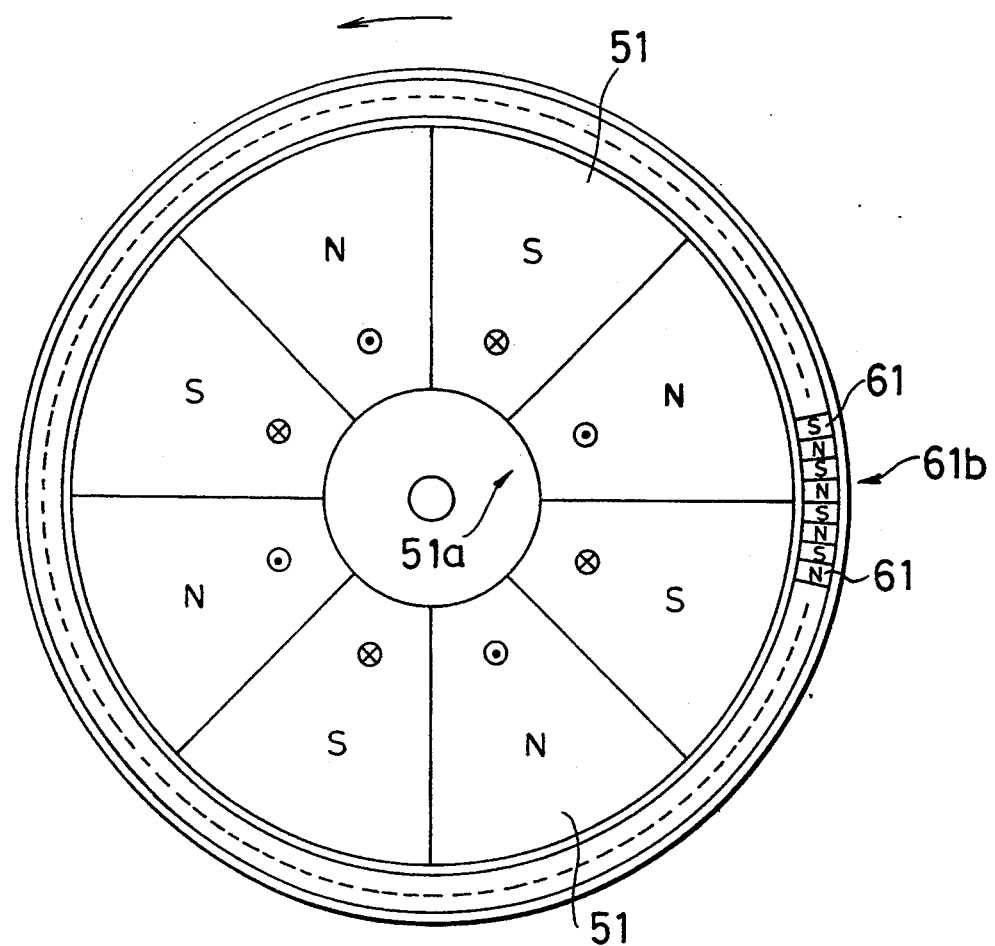
FIG. 40 is a plan view illustrating the magnetized state of a rotor magnet of the motor of FIG. 39.

FIG. 39 is a cross-sectional view of a plane-opposing type motor in accordance with an eleventh embodiment, and FIG. 40 is a plan view illustrating the magnetized state of a rotor magnet. (FIG. 41 is a schematic diagram illustrating patterns of generating wires for detecting the phase timings, which are disposed at a stator side.)

In FIGS. 39 and 40, a driving magnet 51 covers the bottom surface of a rotor 4 as shown in FIG. 40, and is divided into eight sectors which are magnetized to form alternate N and S poles. The magnetized pattern 51a of the driving magnet 51 is radial, and a frequency generating magnet 61 is provided on the outer wall of the driving magnet 51.

Figure 41:
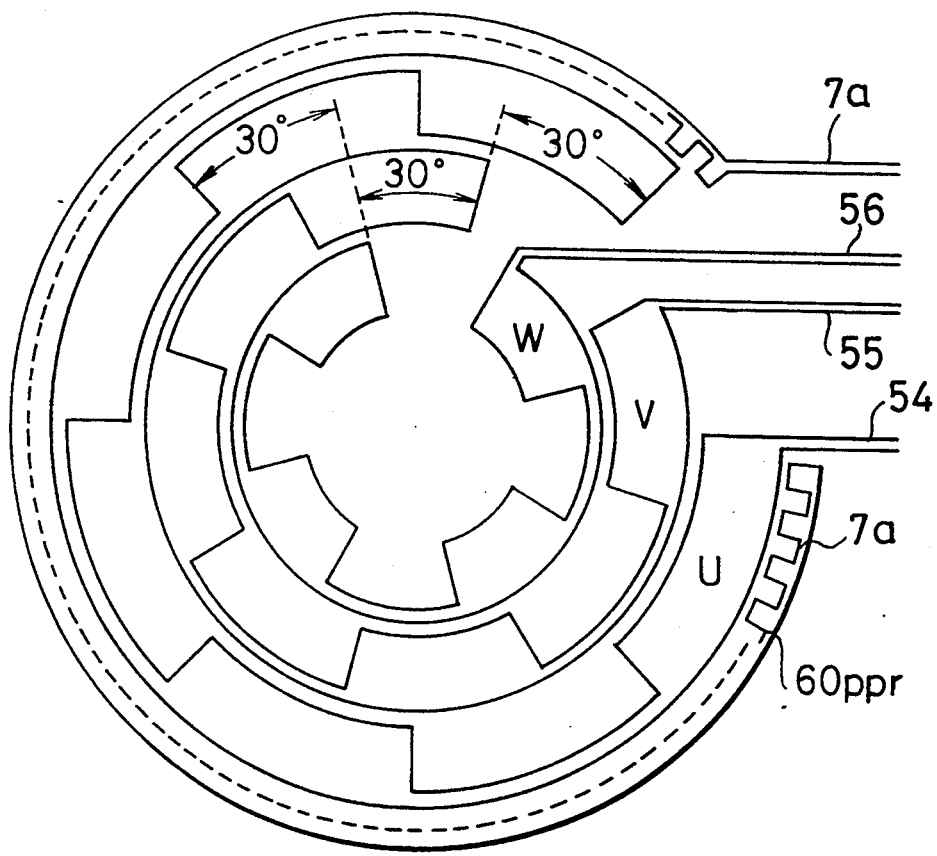
FIG. 41 is a schematic diagram illustrating patterns of generating wires for detecting phase timings, which are disposed at a stator side of the motor of FIG. 39.

FIG. 41 illustrates wire patterns 54, 55 and 56 formed on driving coils 52 placed at the stator side, and a generating wire 7a for detecting a frequency generating signal. The generating wire 7a consists of a repetitive pattern of U-shaped elements formed on the surface of a substrate 7 in such a manner that the generating wire 7a faces the frequency generating magnet 61. The generating wire 7a consists of 120 elements in accordance with the number (=120) of the magnetized poles of the frequency generating magnet 61. Accordingly, the generating wire 7a produces 60 pulses per one revolution of the rotor 4.

Since the motor of the embodiment is a three-phase motor, the coils 52 must include three-phase coils for generating a magnetic field to provide driving force in conjunction with the driving magnet 51. The three-phase coils are formed on the substrate 7 as shown in FIG. 39. The driving timings must be detected in each of the three phases in order to drive the rotor 4 by the three-phase rotary magnetic field. To detect the timings, generating wires 54, 55 and 56 corresponding to the U, V and W phases, respectively, are formed in patterns as shown in FIG. 41. Each of the generating wires 54, 55 and 56 has eight poles in accordance with the eight poles of the driving magnet 51. Respective poles of each generating wire are repeated at the same interval as that of corresponding pattern 51a of the driving magnet 51. Accordingly, each of the generating wires 54, 55 and 56 generates a sine wave of four cycles per one revolution of the rotor 4. The four poles of each of the generating wires 54, 55 and 56 generate sine waves of an identical phase independently, and the sum total of the four sine waves is produced from each one of the generating wires 54, 55 and 56.

Figure 6:
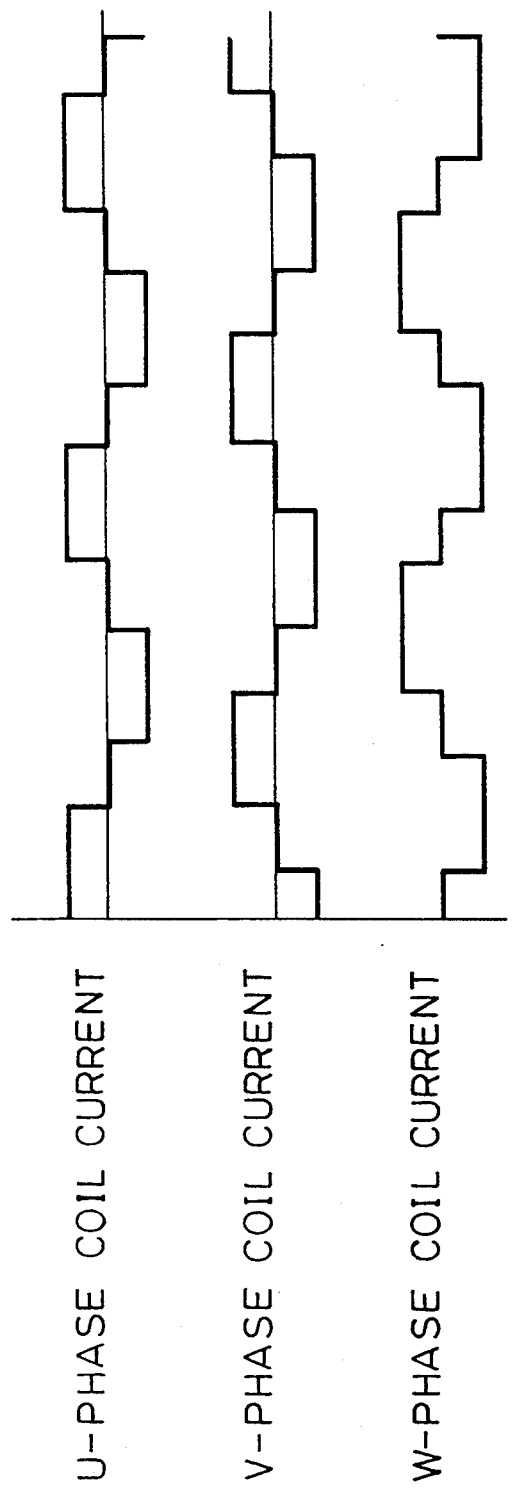
FIG. 6 is a diagram showing the waveforms of currents flowing through driving coils 10U, 10V and 10W.
Figure 7:
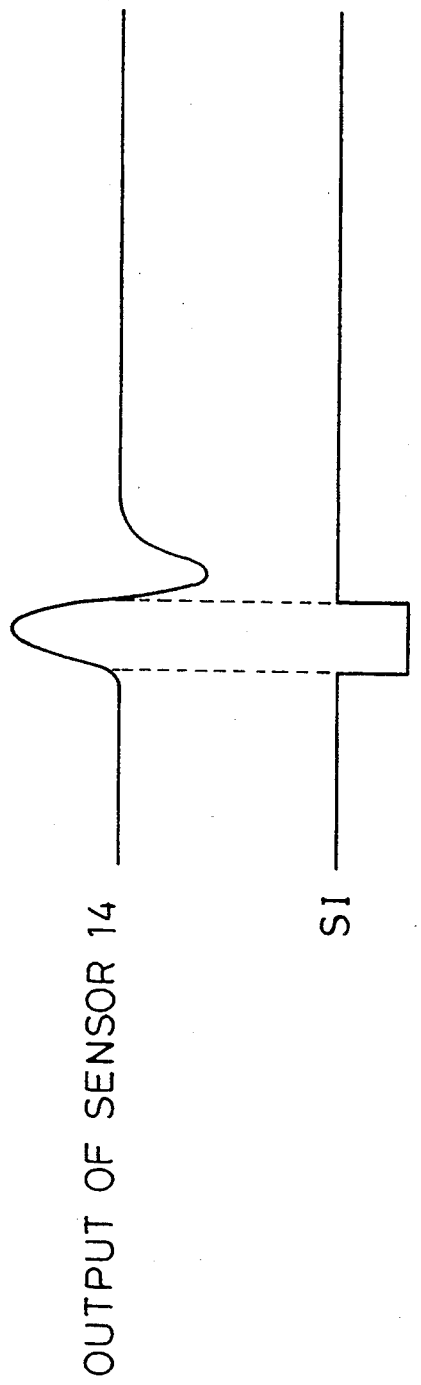
FIG. 7 is a diagram illustrating the output of a Hall effect sensor 14 which detects the index position, and an index signal SI.
Figure 8:
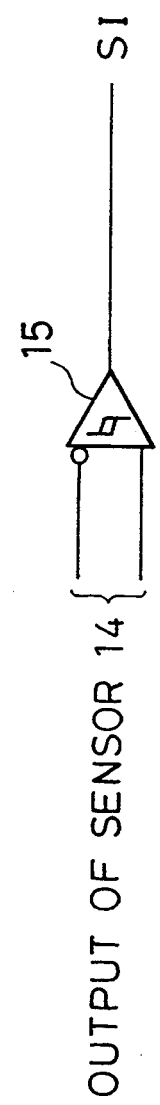
FIG. 8 shows a comparator 15 which converts the waveform at the top of FIG. 7 into the waveform at the bottom of FIG. 7.
Figure 42:
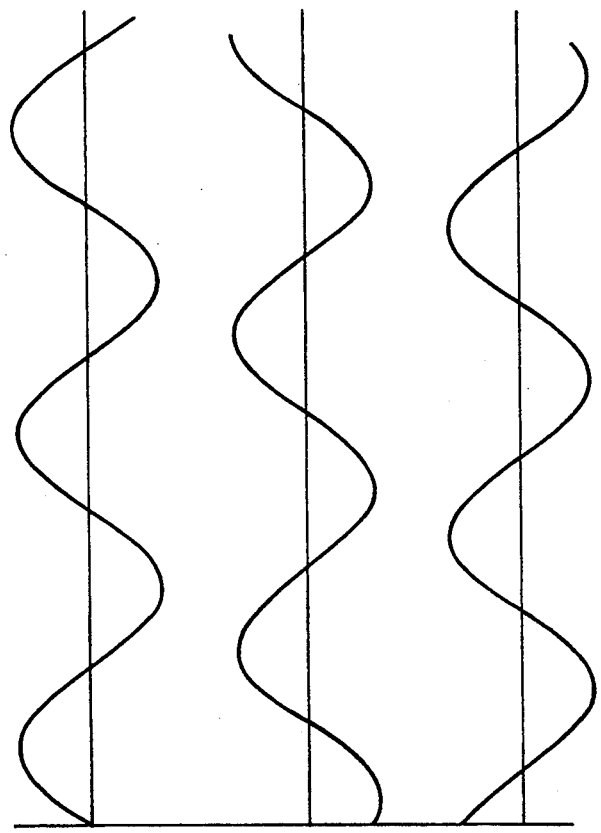
FIG. 42 is a diagram illustrating the waveforms of three sine waves produced from the generating wires 54, 55 and 56, which shift by 120 degrees each.
Figure 43:
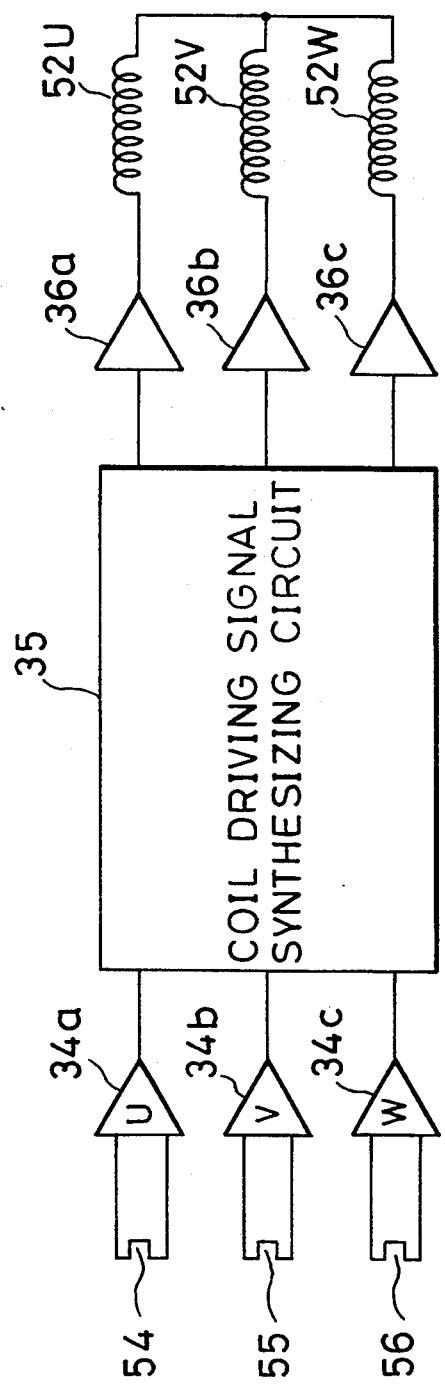
FIG. 43 is a block diagram showing an exciting timing detecting circuit, a coil driving signal synthesizing circuit, and an exciting circuit in accordance with the eleventh embodiment.

Since the generating wires 54, 55 and 56 for the U, V and W phases, respectively, are displaced by 30 degrees to each other, the phases of the three sine waves produced from the generating wires 54, 55 and 56 shift by 120 degrees each as shown in FIG. 42. These sine waves are amplified by amplifiers 34a, 34b and 34c as shown in FIG. 43, and are supplied to a coil driving signal synthesizing circuit 35. The circuit 35 generates coil current control signals for the U, V and W phases as shown in FIG. 6. The control signals are amplified by amplifiers 36a, 36b and 36c which drive coils 52U, 52V and 52W, respectively.

Thus, the generating wires as shown in FIG. 41 can generate exciting timing control signals instead of the Hall effective sensors of the conventional apparatus. The generating wires 54, 55 and 56 are formed by an etching process in one layer. Accordingly, they are very thin, and serves to reduce the size of a disk drive.

The etching positions of the generating wires 54, 55 and 56 will be explained here. The Hall effect sensors employed in the conventional apparatus detect the intensity itself of the magnetic field. The generating wires, on the other hand, detect the increase or decrease in the magnetic flux passing through the generating wires. Thus, the outputs of the generating wires are differential outputs, and hence, the outputs thereof advance 90 degrees with respect to the outputs of the Hall effect sensors. Therefore, the etching positions of the generating wires 54, 55 and 56 must be shifted backward by 90 degrees in an electrical angle (22.5 degrees in a mechanical angle) with regard to the positions of the Hall effect sensors.

Figure 47:
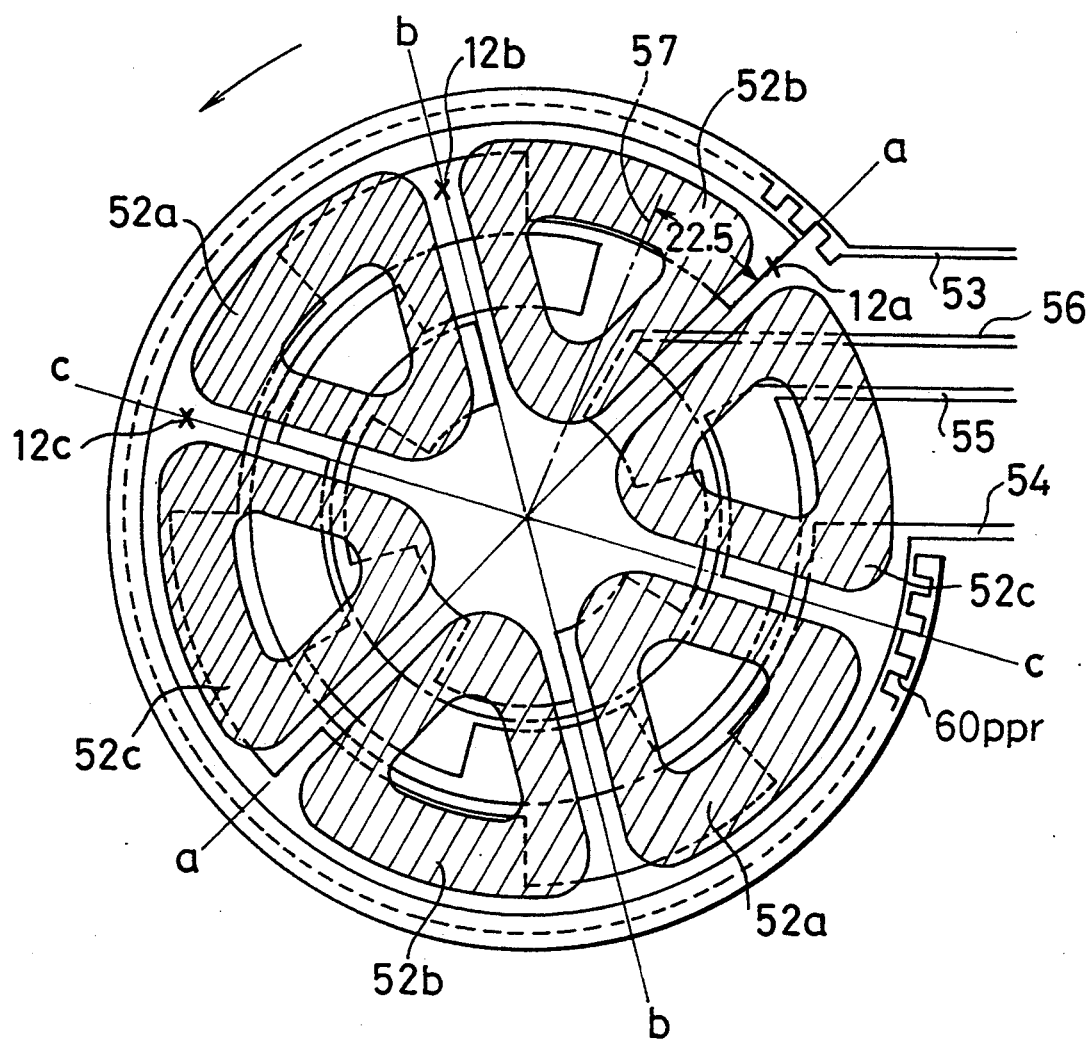
FIG. 47 is a diagram illustrating positional relationships between generating wires 54, 55 and 56 and driving coils 52.

FIG. 47 illustrates the positional relationships between the generating wires 54, 55 and 56 and the driving coils 52. First, a line a—a is drawn constituting a pair of radial lines of the U-phase generating wire 54 and passing through the center of rotation. Next, lines b—b and c—c, superimposed on a pair of radial lines of the W-phase and V-phase generating wires, respectively, are drawn in such a manner that the lines a—a, b—b and c—c divide the circle into six equal sectors. The U-phase coil 52a is located in a pair of sectors formed by the lines b—b and c—c, whose central angle is 60 degrees; the V-phase coil 52b is located in a pair of sectors formed by the lines a—a and b—b, whose central angle is 60 degrees; and the W-phase coil 52c is located in a pair of sectors formed by the lines c—c and a—a, whose central angle is 60 degrees. When the motor drive circuit is turned on, the rotor 4 rotates in the direction indicated by an arrow in FIG. 47.

When the Hall effect sensors are employed instead of the generating wires to detect the timings as in the conventional apparatus, the Hall effect sensors 12a, 12b and 12c are disposed at positions indicated by x marks in FIG. 47. Specifically, the U-phase Hall effect sensor 12a is placed on the line a—a; the V-phase Hall effect sensor 12b, on the line b—b; and the W-phase Hall effect sensor 12c, on the line c—c. As shown in FIG. 47, a line 57 passing through the center of the two adjacent radial lines of U-phase generating wire 54 makes a mechanical angle of 22.5 degrees forward with the line a—a on which the U-phase Hall effect sensor is placed.

The generating wires 54, 55 and 56 do not produce signals until the magnetic flux passes across the generating wires. In other words, the timings of the exciting currents are unknown when the motor is started from a quiescent state because the generating wires do not produce signals at the start. This entails a starting circuit.

Next, the starting method of the motor will be described. In the conventional motor, the rotor is rotated by supplying currents to two phases of three driving coils U, V and W, and the counterelectromotive force induced in the remaining coil is detected to decide the direction of rotation at the start. This method, however, is not preferable, because it produces switching noises. For this reason, the main current today is to employ a technique what is called soft switching which supplies a current to the remaining coil to excite that phase. In this embodiment, an integral circuit for controlling the soft switching can be used to detect the direction of rotation at the start. Alternately, since the driving coils 52 and the generating wires 54, 55 and 56 for detecting the timings are separately provided in the embodiment, the direction of rotation at the start can be detected using the counterelectromotive voltage induced in one of the three generating wires 54, 55 and 56 while suppressing noises by employing the soft switching technique for the driving coils 52.

Figure 44:
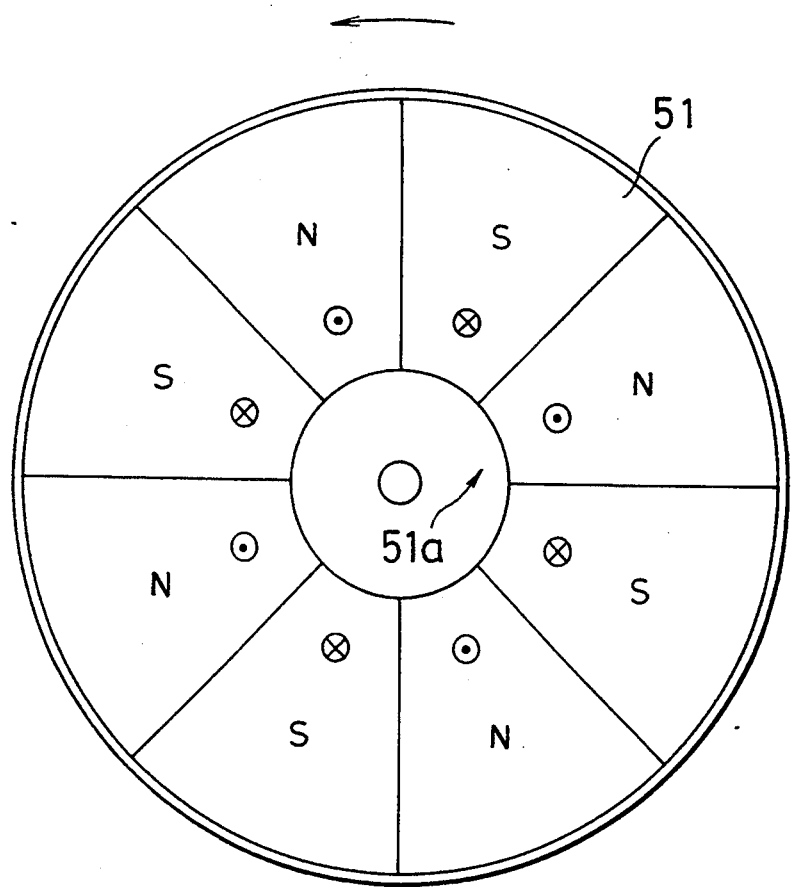
FIG. 44 is a plan view showing a rotor of a motor in accordance with a variation of the eleventh embodiment.
Figure 45:
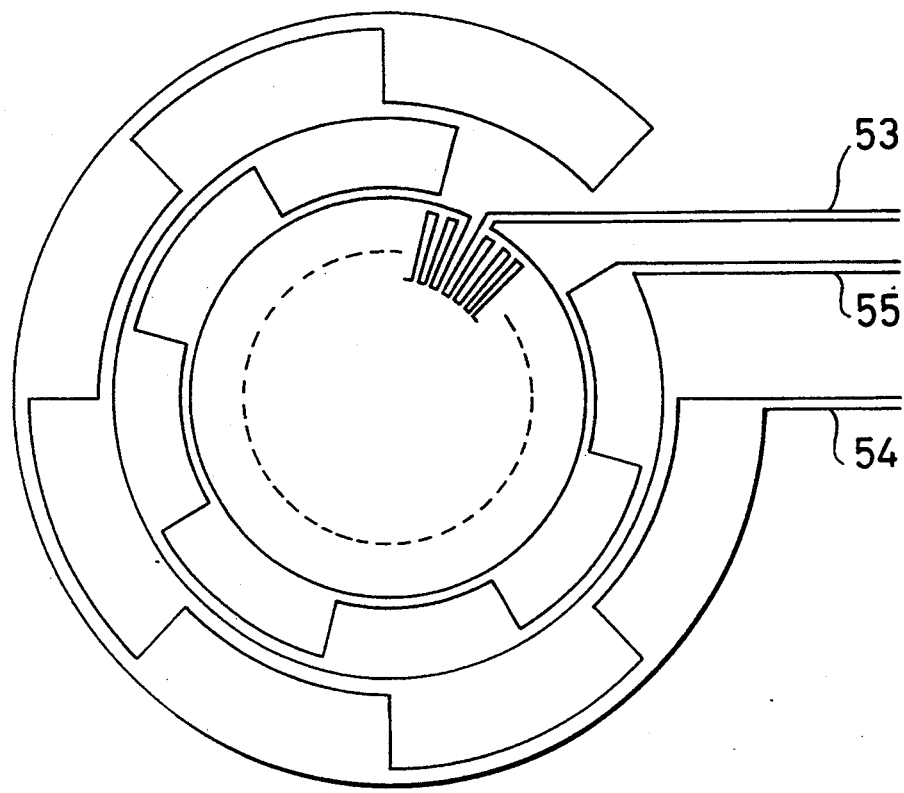
FIG. 45 is a plan view illustrating the patterns of generating wires in accordance with the variation of FIG. 44.
Figure 46:
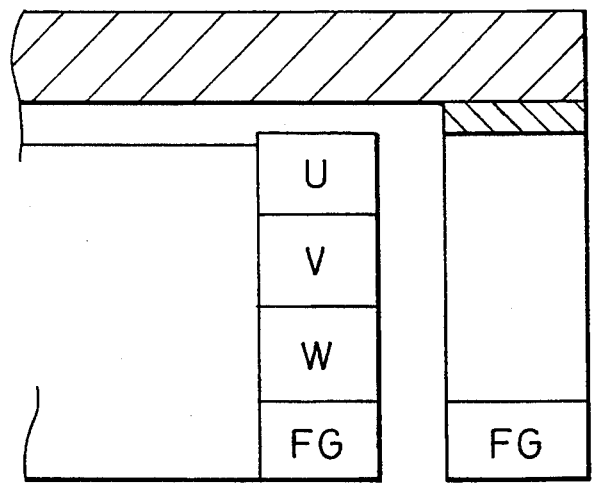
FIG. 46 is a partially sectional view illustrating the positional relationship between a generating wire and a magnet in accordance with another variation of the eleventh embodiment.

Next, a variation of the eleventh embodiment will be described with reference to FIGS. 44 and 45.

This variation obviates the frequency generating magnet 61 and the W-phase generating wire 56 from the eleventh embodiment shown in FIG. 40. The driving magnet 51 includes eight poles of a pattern 51a having eight radial sectors as shown in FIG. 44. A frequency generating signal can be detected by a frequency generating wire 53 as shown in FIG. 45. This is because the magnetic flux from eight poles of driving magnet 51 pass across the generating wire 53, which is provided on an inner diameter at the stator side. In FIG. 45, the W-phase generating wire 56 is removed. The W-phase signal is produced by synthesizing the U-phase and V-phase signals as follow:

$$W = -U - V$$

where U, V and W are vectors.

According to the timing circuits of this variation, the W-phase generating wire 56 and the W-phase amplifier 34c of FIG. 43 become unnecessary. Instead, a vector synthesizing circuit for synthesizing the W-phase signal in accordance with the above equation is connected before the coil driving signal synthesizing circuit 35.

According to this variation, since the frequency generating magnet 61 is removed, the driving magnet can be magnetized to the outermost periphery, thus increasing the torque of the motor. In addition, the number of parts and cost are reduced in comparison with an apparatus where the frequency generating magnet 61 and the driving magnet 51 are made separately.

In the embodiment, the present invention is applied to a plane-opposing type spindle motor including an index position detecting circuit. The present invention, however, is not restricted to that application: it can be applied to a circumference-opposing type motor or a more common motor including an index position detecting circuit. When applied to a circumference-opposing type motor, the generating wires for the phases U, V and W must be stacked in the vertical direction.

The eleventh embodiment and the variations thereof are provided with n-phase generating wires instead of the Hall effect sensors required in the conventional apparatus in an n-phase brushless motor, and uses sine waves from the generating wires as exciting timing signals. This makes it possible to remove the Hall effect sensors, and to reduce the size (particularly, the thickness) and cost. In particular, in a plane-opposing type motor, the three-phase generating wires can be spread on a surface thereof, and hence, the thickness can be considerably reduced.

TWELFTH EMBODIMENT

Figure 48:
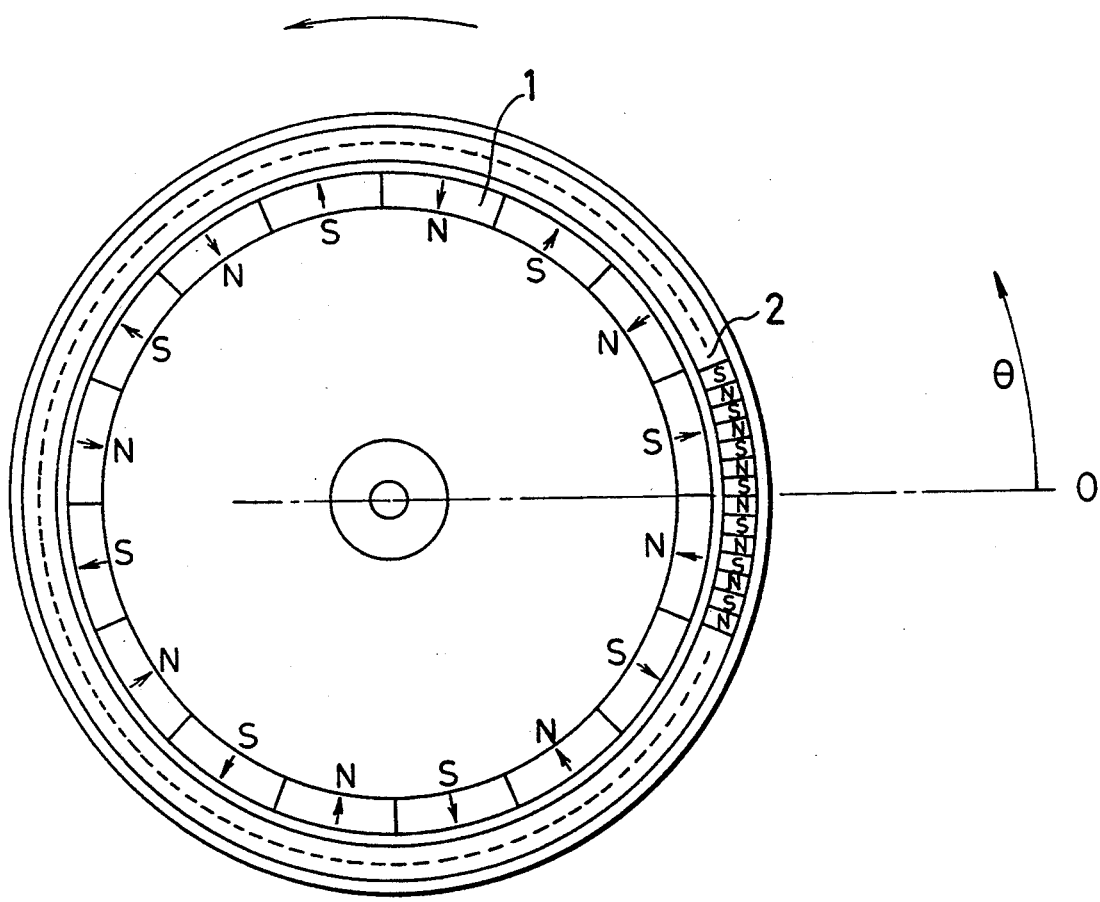
FIG. 48 is a plan view of a rotor and stator portion of a circumference-opposing type motor in accordance with a twelfth embodiment.
Figure 49:
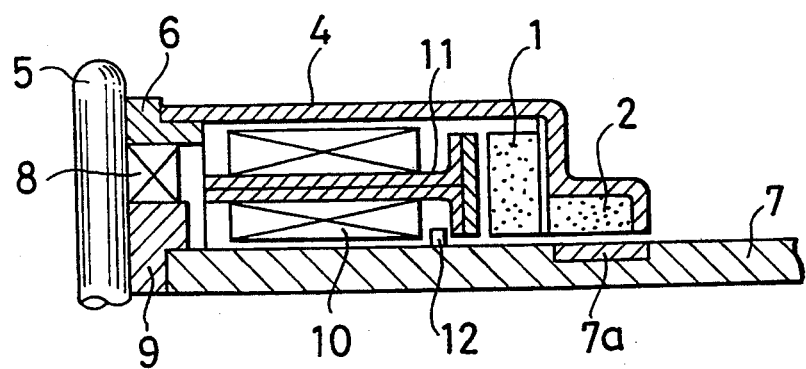
FIG. 49 is a cross-sectional view of the motor shown in FIG. 48.

FIGS. 48 and 49 are a plan view and a cross-sectional view of a rotor and stator portion of a circumference-opposing type motor of a twelfth embodiment.

Externally, there is no major difference between the motor as shown in FIGS. 48 and 49, and the motor as shown in FIGS. 1 and 2, except the shape of the stator 11 is slightly changed in FIGS. 48 and 49. The modification of the stator 11 has nothing to do with the subject matter of the present invention. As seen from FIGS. 48 and 49, the index magnet 13 and the Hall effect sensor 14 in the conventional apparatus as shown in FIGS. 1 and 2 are removed in this embodiment. This makes it possible to considerably reduce the size of the motor of the embodiment, as will be readily seen by comparing the conventional apparatus as shown in FIGS. 1 and 2 with the apparatus of the embodiment as shown in FIGS. 48 and 49. In this embodiment, the magnetized pattern of a frequency generating magnet 2 is subjected to AM (amplitude modulation) of one period per one revolution, and the amplitude modulated magnetic flux originating from the frequency generating magnet 2 is picked up so as to generate an index signal from the AM components.

In FIGS. 48 and 49, changes in the magnetic flux of the frequency generating magnet 2 accompanying the rotation of a rotor 4 are detected by a generating wire 7a. The output of the generating wire 7a is amplified by an amplifier 16a of FIG. 51, and is supplied to an index position detecting circuit 100 of FIG. 51.

Figure 50:
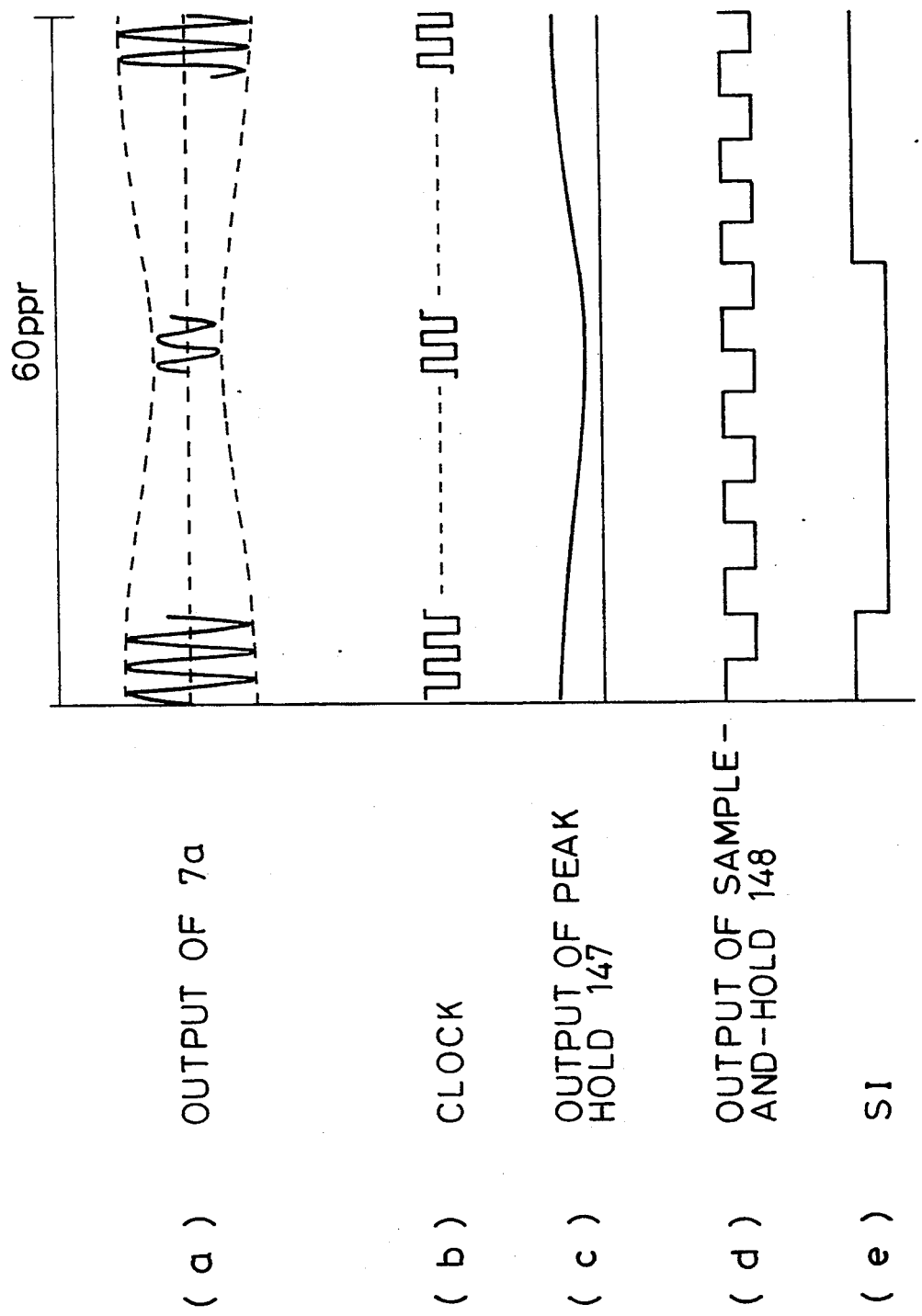
FIG. 50 is a diagram illustrating waveforms at various portions in an index position detecting circuit 100 in accordance with the twelfth embodiment.

The output signal of the generating wire 7a is illustrated at (a) of FIG. 50. This signal consists of 60 pulses per one revolution because the magnetized patterns include 120 magnetization transitions. The 60 pulses are modulated one cycle per one revolution, thereby providing a waveform as illustrated at (a) of FIG. 50.

Figure 51:
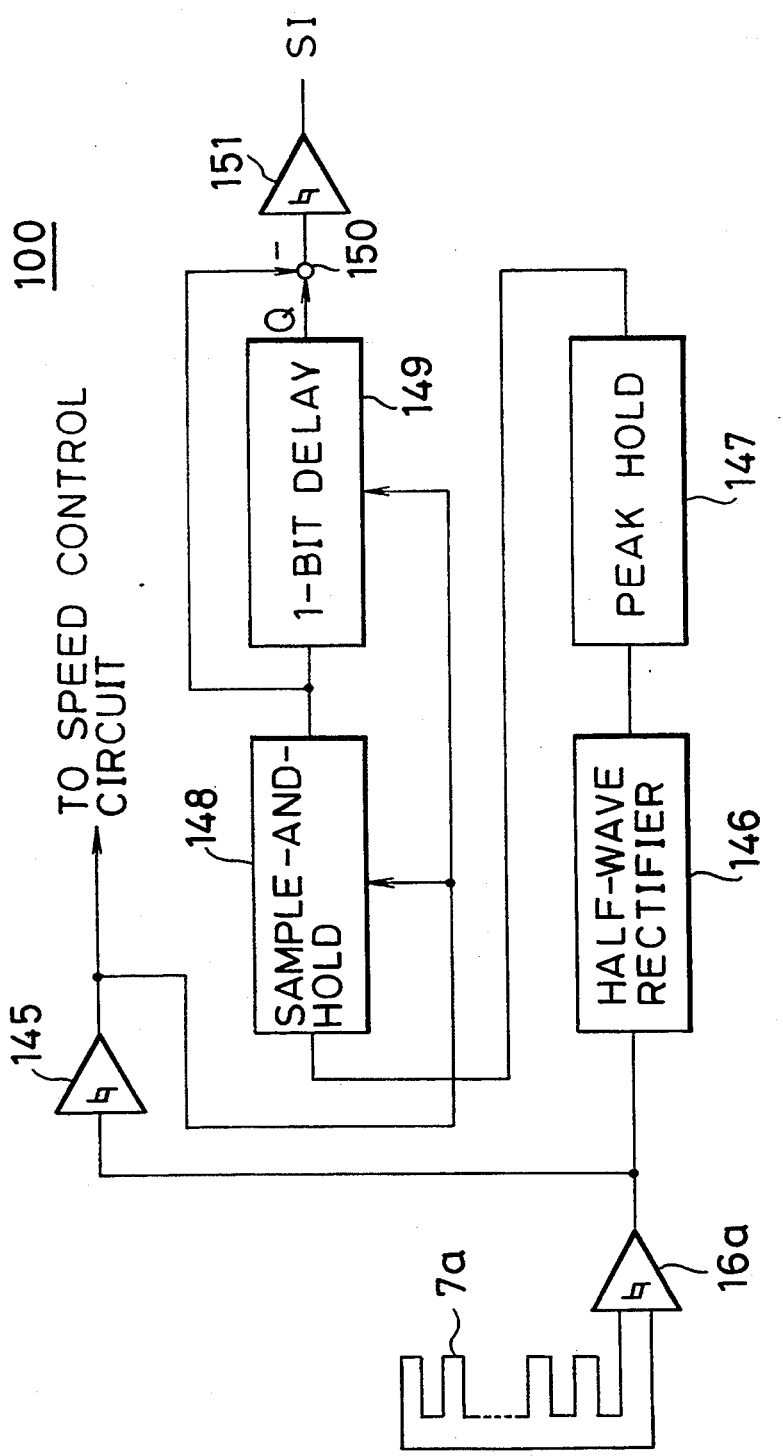
FIG. 51 is a block diagram showing an arrangement of the index position detecting circuit 100 in accordance with the twelfth embodiment.

FIG. 51 is a block diagram showing an arrangement of the index position detecting circuit 100. The AM signal detected by the generating wire 7a functioning as a frequency generating means is inputted to a half-wave rectifier 146 where it is half-wave rectified. The output of the rectifier 146 is inputted to a peak hold circuit 147 which outputs an envelope signal (analog signal) as shown at (c) of FIG. 50. On the other hand, the output of the generating wire 7a is converted into a binary signal by a comparator 145, which outputs a pulse trail as a clock signal as shown at (b) of FIG. 50. The clock signal is inputted to a speed control circuit, not shown, a sample-and-hold circuit 148, and a 1-bit delay circuit 149.

The output of the peak-hold circuit 147 is applied to the data input terminal of the zero-order sample-and-hold circuit 148, and the output of the zero-order sample-and-hold circuit 148 is supplied to the data input terminal of the 1-bit delay circuit 149. The 1-bit delay circuit 149 samples and holds the analog signal from the peak-hold circuit 147 at a first clock pulse sent from the comparator 145, and outputs sampled and held data from its output terminal Q at the next clock pulse. Subsequently, the output of the 1-bit delay circuit 149 and the output of the sample-and-hold circuit 148 are inputted to a subtracter 150. The subtracter 150 compares the two input data, which are different in timing by one clock pulse. The output of the subtracter 150 is inputted to a comparator 151. An index signal SI as shown at (e) of FIG. 50 is obtained as the output of the comparator 151. Thus, the index signal is generated without an index detecting device.

Figure 52:
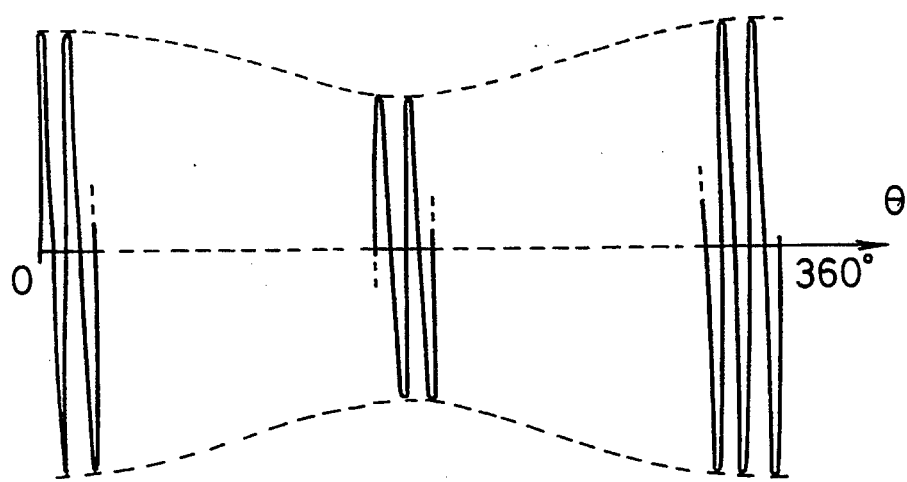
FIG. 52 is a diagram illustrating the intensity distribution of magnetization of a frequency generating magnet 2 in accordance with the twelfth embodiment.

FIG. 52 is a diagram illustrating the intensity distribution of the magnetization of the frequency generating magnet 2 in accordance with this embodiment, which is modulated one cycle per one revolution.

Figure 53:
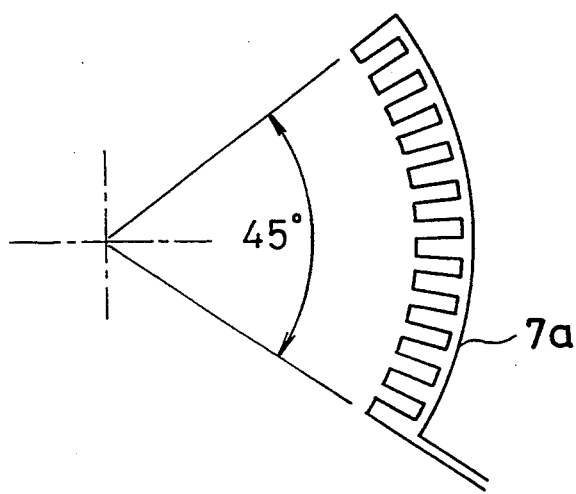
FIG. 53 is a diagram illustrating a pattern of the generating wire 7a in accordance with the twelfth embodiment.

When the frequency generating magnet 2 and the generating wire 7a are combined to form a frequency generating means, and further if the generating wire 7a is provided along the entire circumference, the output of the generating wire 7a will fall to zero. This is because the output of the generating wire 7a is given as the integral along the entire circumference of the frequency magnet 2, and the integral over a one period of a sine wave is zero. Thus, the AM component of the output of the generating wire 7a is canceled out. In view of this, the generating wire 7a is disposed in a limited region (in a sector of 45 degrees as shown in FIG. 53) with respect to the entire circumference of the frequency generating magnet 2. In addition, the angle of the sector (45 degrees in this case) formed by the generating wire 7a is set at 2N times (N=2 in this case) of an angle of magnetization of the driving magnet 1 so as to prevent the driving magnet 1 from influencing the generating wire 7a.

Figure 54:
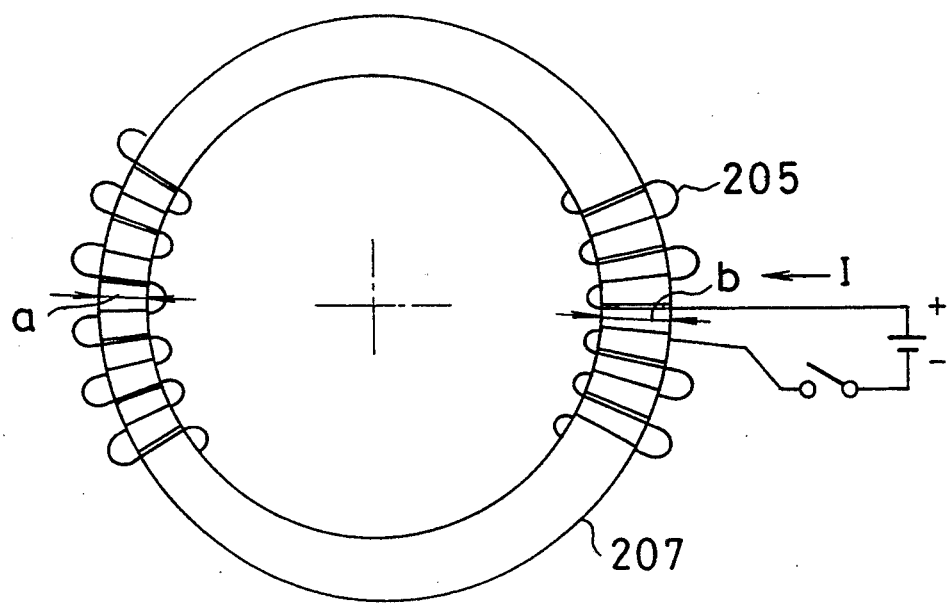
FIG. 54 is a schematic diagram illustrating a method for obtaining the intensity distribution of the magnetized pattern of the frequency generating magnet 2 as shown in FIG. 52.

FIG. 54 illustrates a magnetization method for obtaining the intensity distribution of the magnetization of the frequency generating magnet 2, as shown in FIG. 52. In FIG. 54, the thickness of the magnetizing yoke 207 of the frequency generating magnet 2 gradually changes from thick to thin, and then thin to thick. The diameter b of the yoke is larger than the diameter a in FIG. 54. Since the magnetic flux is constant along the entire circumference of the yoke, the magnetic field increases in the region where the yoke is thin, whereas the magnetic field decreases in the region where the yoke is thick. Thus, the intensity distribution as shown in FIG. 52 can be realized.

Various modifications of the twelfth embodiment may be made without departing from the spirit of the present invention.

Figure 55:
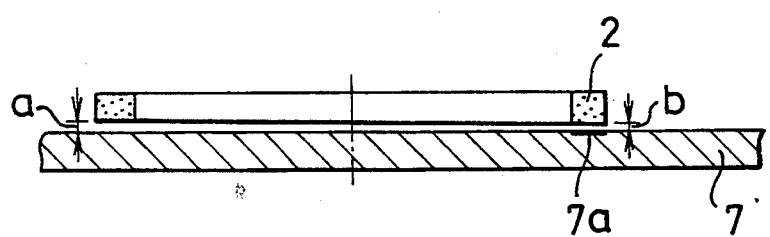
FIG. 55 is a cross-sectional view illustrating a variation of the twelfth embodiment, wherein the thickness of a frequency generating magnet 2 is changed so that the gap between the magnet 2 and the generating wire 7a is changed.

The intensity distribution as shown in FIG. 52 can be achieved by other methods. The method of FIG. 54 controls the intensity of the magnetization distribution itself of the magnet 2. It is enough, however, if the intensity of the magnetic field acting on the generating wire 7a is such as shown in FIG. 52. Thus, another method as shown in FIG. 55 is proposed. In FIG. 55, although the magnetization intensity of the frequency generating magnet 2 is identical along its entire circumference, the thickness of the magnet 2 is changed so that the gap between the frequency generating magnet 2 and the generating wire 7a is changed: a>b in FIG. 55. With such an arrangement, the distribution of the magnetic field acting on the generating wire 7a takes a pattern as shown in FIG. 52.

In FIGS. 48 and 49, if the concentricity of the frequency generating magnet 2 and the generating wire 7a deviates, the output of the generating wire 7a is frequency modulated, and hence, the widths of the pulses obtained by converting the output into a binary signal fluctuate, resulting in a deterioration of the rotary speed of the motor. This is because the output of the generating wire 7a is used for controlling the speed as well as for detecting the index position in the twelfth embodiment as shown in FIG. 51. Here, to eliminate adverse effects on the speed control, which arises from the amplitude modulation, and from the partial lack of generating wire along the circumference, two other patterns of the generating wire 7a are proposed. In these modifications, the generating wire for controlling the speed and that for detecting the index position are separated from each other.

Figure 56:
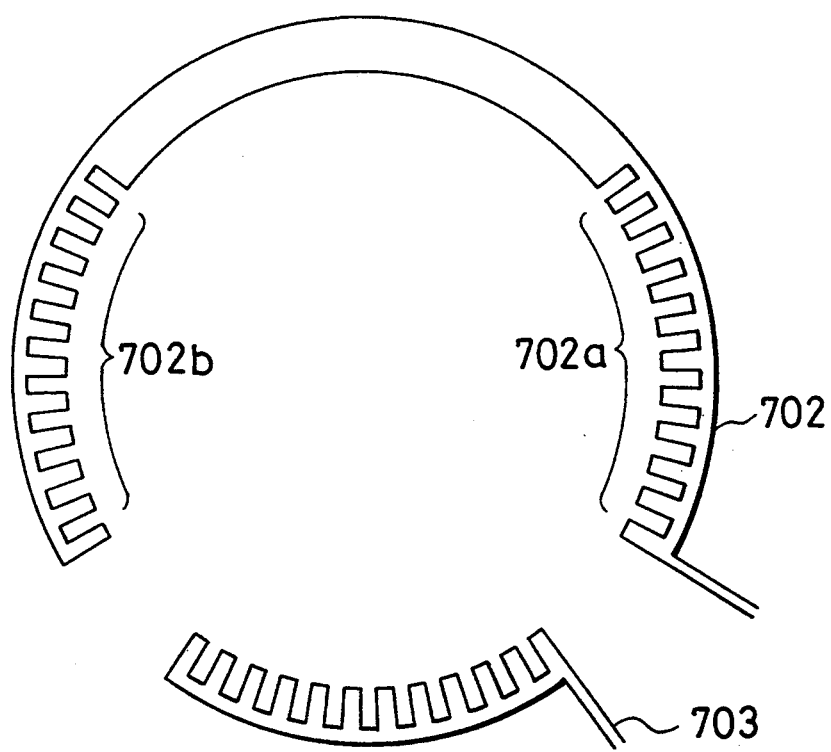
FIG. 56 is a schematic diagram illustrating a pair of generating wires 702a and 702b of a variation of embodiments 12, 13 and 14, which are disposed in a centrosymmetric manner with respect to the axis of rotation of the rotor so that the outputs of the two generating wires 702a and 702b are synthesized to cancel FM components included in the outputs of the generating wires.
Figure 57:
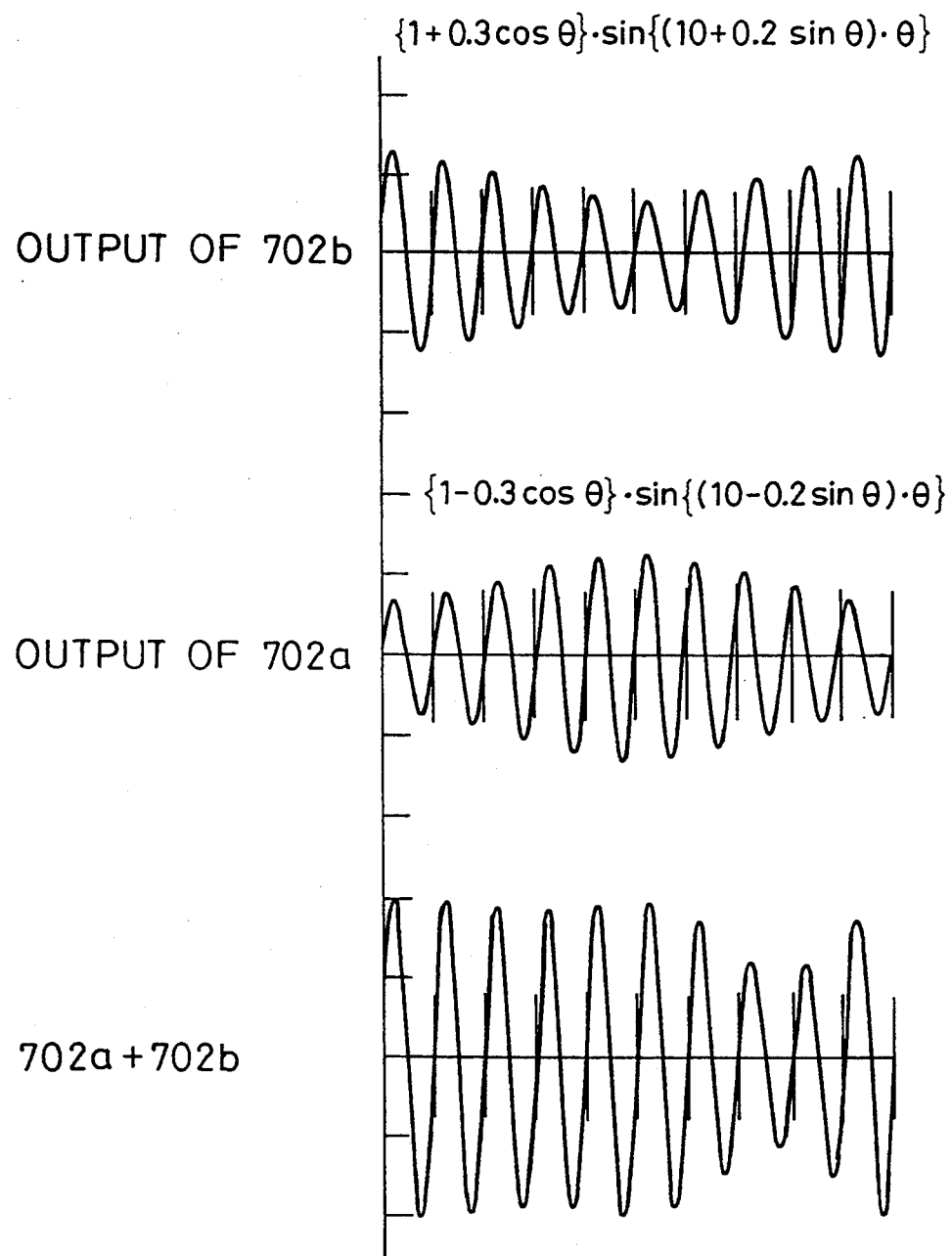
FIG. 57 is a diagram illustrating output waveforms of the generating wires 702a and 702b of FIG. 56, and the synthesized waveform of the two.

First, as shown in FIG. 56, a pair of generating wires 702a and 702b for speed control are disposed in a centrosymmetric manner with respect to the axis of rotation of the rotor, and the outputs of the two generating wires 702a and 702b are synthesized to cancel the FM (frequency modulation) component included in the outputs of the generating wires. Thus, a deterioration of the rotation accuracy is prevented. FIG. 57 illustrates the output waveforms of the generating wires 702a and 702b, and the synthesized waveform of the two. When the two generating wires 702a and 702b are disposed as shown in FIG. 56, they detect the index signal at positions centrosymmetric with respect to the axis of rotation. Consequently, the two outputs of the generating wires 702a and 702b have opposite phases. Thus, an index signal which is free from fluctuation of pulse width is obtained by adding the outputs of the generating wires 702a and 702b.

Figure 58:
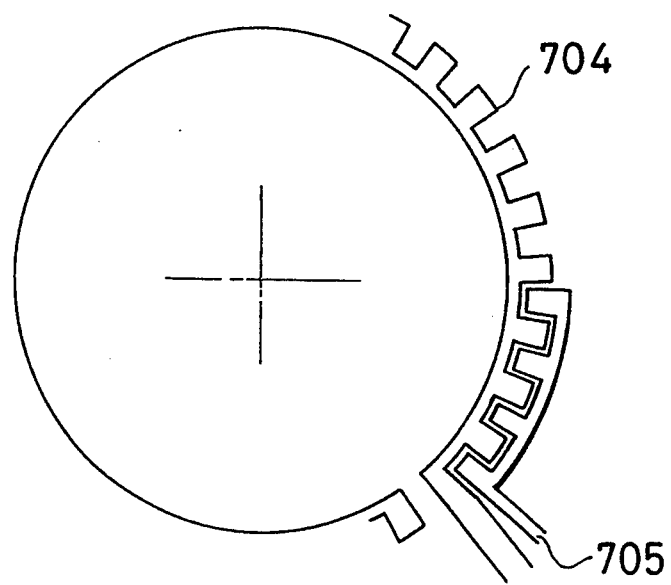

FIG. 58 illustrates another variation of the twelfth embodiment, which prevents a fluctuation of the pulse width arising from the deviation of concentricity of the frequency generating magnet 2 and the generating wire 7a. In this figure, a generating wire 704 for controlling speed is formed along the entire circumference. In addition, a generating wire 705 for detecting the index position is formed in a section thereof. This also makes it possible to eliminate the above-mentioned problem.

It should be decided in view of the space factor in a motor whether or not the generating wire for controlling the speed and that for detecting the index position are made common.

In FIG. 51, the peak-hold circuit 147 may be replaced by a low-pass filter, resulting in a similar effect. The clock signal is not restricted to a binary signal outputted from the generating wire 7a. For example, a binary output of a Hall effect sensor or the like which detects the driving timings of driving coils of a three-phase brushless motor can achieve a similar effect. Alternately, an external clock signal in synchronism with the rotation of a rotor can also be used.

The twelfth embodiment of the present invention can be applied not only to a circumference-opposing type spindle motor, but also to a plane-opposing type motor. Furthermore, the embodiment can be applied to a motor in general having an index position detecting apparatus.

In the twelfth embodiment and the variations thereof described above, since the magnetic field originating from the magnet for generating a speed control signal and acting on the generating wire is amplitude modulated one cycle per one revolution, an index signal occurring once per one revolution can be formed from the amplitude modulated component. This makes it possible to obviate the index magnet 13 and the Hall effect sensor 14, which are required in the conventional apparatus, thereby reducing the size of the motor of the embodiment. In addition, since the index magnet 13 is removed, the problem of leakage magnetic flux is also eliminated.

THIRTEENTH EMBODIMENT

In an index position detecting circuit of a spindle motor in accordance with this embodiment, the magnetized pattern of a frequency generating magnet 2 is formed such that a frequency generating signal associated with the magnetized pattern includes an offset amount with regard to a base line. Since the offset amount changes once per one revolution, an index signal can be created by picking up the offset component and converting it into binary form. Accordingly, the index magnet 13 and the Hall effect sensor 14 in the conventional apparatus as shown in FIGS. 1 and 2 are removed in this embodiment. This makes it possible to considerably reduce the size and thickness in particular of the motor of the embodiment, and to prevent the leakage magnetic flux from the index magnet.

In FIGS. 48 and 49, changes in the magnetic flux of the frequency generating magnet 2 accompanying the rotation of a rotor 4 are detected by a generating wire 7a disposed in opposition to the magnet 2. The output of the generating wire 7a is amplified by an amplifier 16a of FIG. 61, and is supplied to an index position detecting circuit 100 of FIG. 61.

Figure 59:
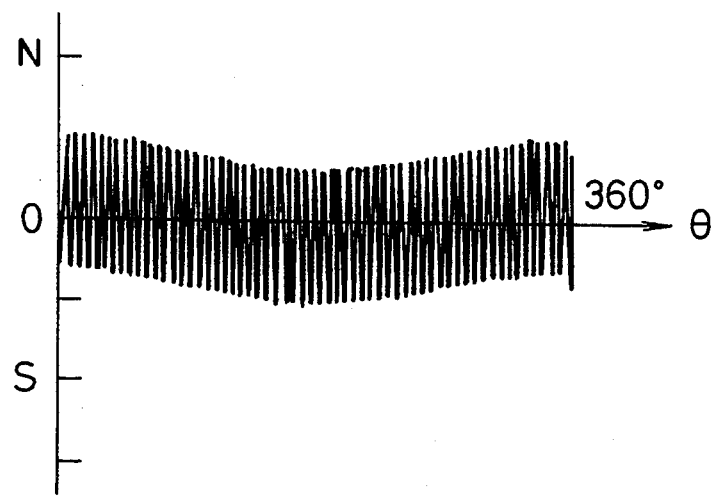
FIG. 59 is a diagram illustrating the intensity distribution of the magnetized pattern of a frequency generating magnet 2 in accordance with a thirteenth embodiment.

FIG. 59 is a diagram illustrating the intensity distribution of a magnetized pattern of the frequency generating magnet 2 in accordance with the embodiment, and FIG. 53 is a plan view illustrating a pattern of the generating wire 7a for detecting changes in the magnetic flux originated from the frequency generating magnet 2 magnetized in the pattern as shown in FIG. 59.

Figure 60:
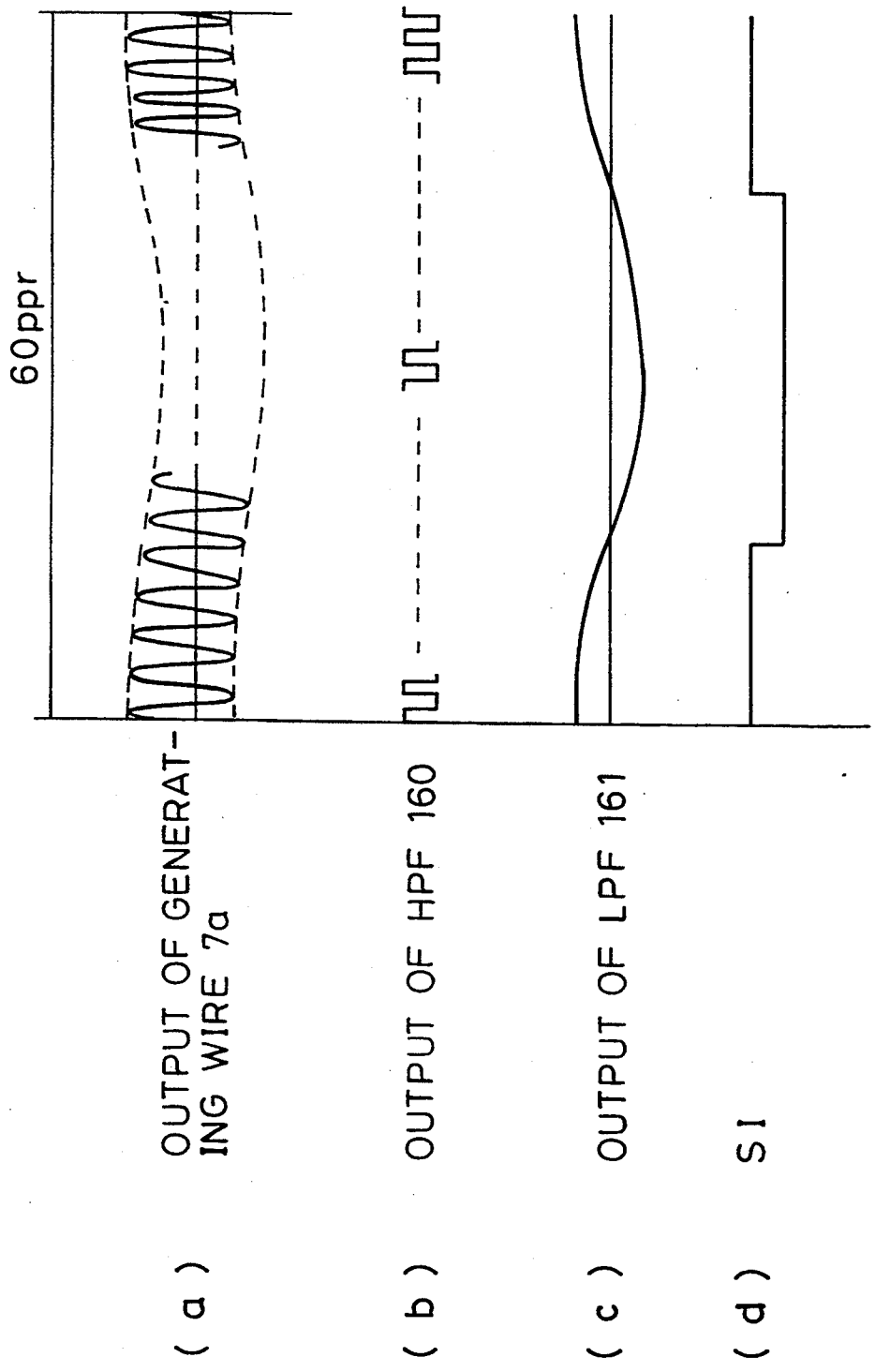
FIG. 60 is a diagram illustrating waveforms at various portions in an index position detecting circuit 100 in accordance with the thirteenth embodiment.

The output signal of the generating wire 7a is illustrated at (a) of FIG. 60. This signal consists of 60 pulses per one revolution because the magnetized patterns includes 120 magnetization transitions. Furthermore, the 60 pulses assume a waveform as shown at (a) of FIG. 60 because the magnet 2 is magnetized so as to have an offset as will be described later. If the 60 pulses produced from the generating wire 7a are approximated by a sine wave, and the offset amount is also approximated by another sine wave, the output of the generating wire 7a as shown at (a) of FIG. 60 can be expressed by $$A \sin(\theta/6 + \delta 1) + B \cos(\theta/360 + \delta 2) \qquad (17)$$

where A and B are fixed values, $\theta$ is an angle of rotation of the motor, and $\delta 1$ and $\delta 2$ are fixed phase values.

Accordingly, the first term of expression (17) represents the frequency generating pulse, and the second term thereof represents the offset amount whose period is one revolution (=360 degrees) of the rotor of the motor.

Figure 61:
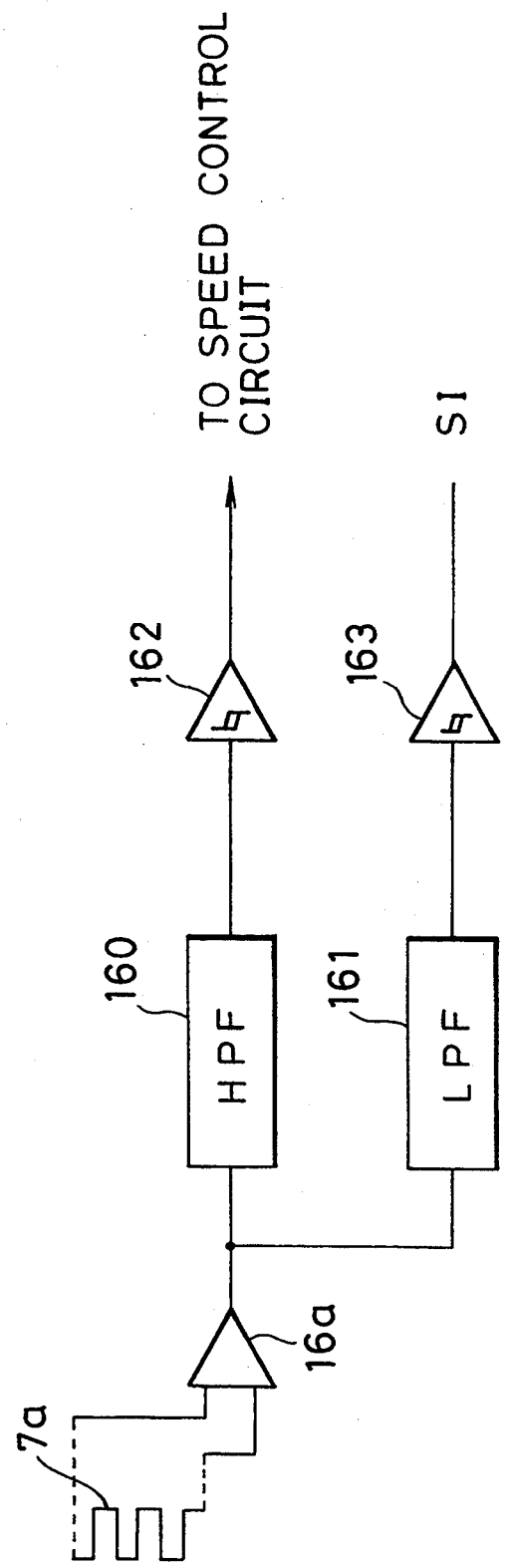
FIG. 61 is a block diagram showing the arrangement of a frequency generating pulse detecting circuit and the index position detecting circuit 100 in accordance with the thirteenth embodiment.

FIG. 61 is a block diagram showing the arrangement of a frequency generating pulse detecting circuit and the index position detecting circuit 100. The output of the generating wire 7a is amplified by an amplifier 16a, and is delivered to an HPF (high-pass filter) 160 and an LPF (low-pass filter) 161. The high frequency component (the first term of expression (17)) produced from the HPF 160 is converted into a binary form by a comparator 162. The waveform of the binary signal, that is, the frequency generating signal for controlling speed outputted from the comparator 162, is illustrated at (b) of FIG. 60. This signal is sent to a speed control circuit (not shown) as a frequency generating pulse train. On the other hand, the LPF 161 produces a low frequency component (the second term of expression (17)) as shown at (c) in FIG. 60. The low frequency component is converted into a binary form by a comparator 163. The binary signal becomes the index signal SI as shown at (d) in FIG. 60.

When the frequency generating magnet 2 and the generating wire 7a are combined to form a frequency generating means, and further if the generating wire 7a is provided along the entire circumference, the output of the generating wire 7a will fall to zero. This is because the output of the generating wire 7a is given as the integral along the entire circumference of the frequency magnet 2, and the integral over a one period of a sine wave is zero. Thus, the offset component of the output of the generating wire 7a is canceled out. In view of this, the generating wire 7a is disposed in a limited region (in a sector of 45 degrees as shown in FIG. 53) with respect to the entire circumference of the frequency generating magnet 2. In addition, the angle of the sector (45 degrees in this case) formed by the generating wire 7a is set at 2N times of an angle of magnetization of the driving magnet 1 so as to prevent the driving magnet 1 from influencing the generating wire 7a.

Figure 62:
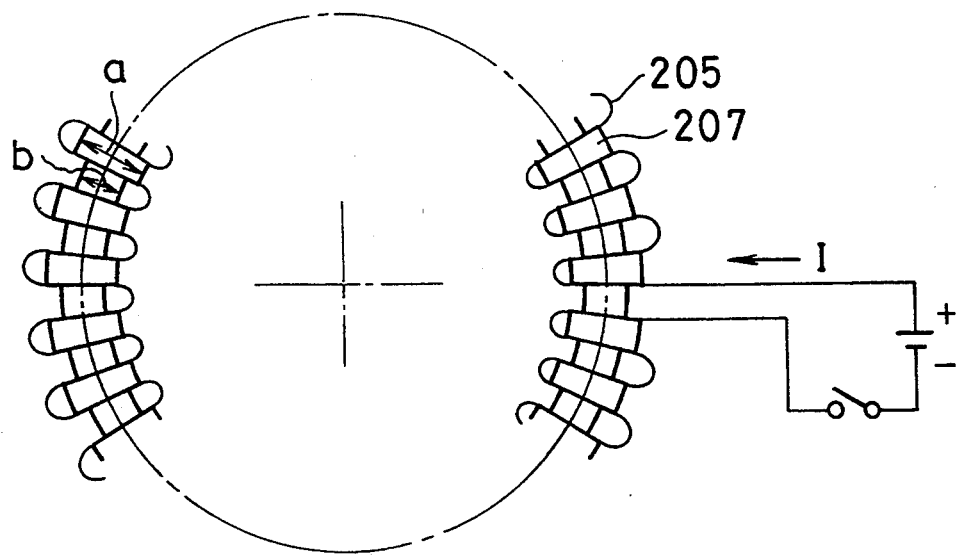
FIG. 62 is a diagram illustrating a method for obtaining the intensity distribution of the magnetization of a frequency generating magnet 2 in accordance with the thirteenth embodiment.
Figure 63:
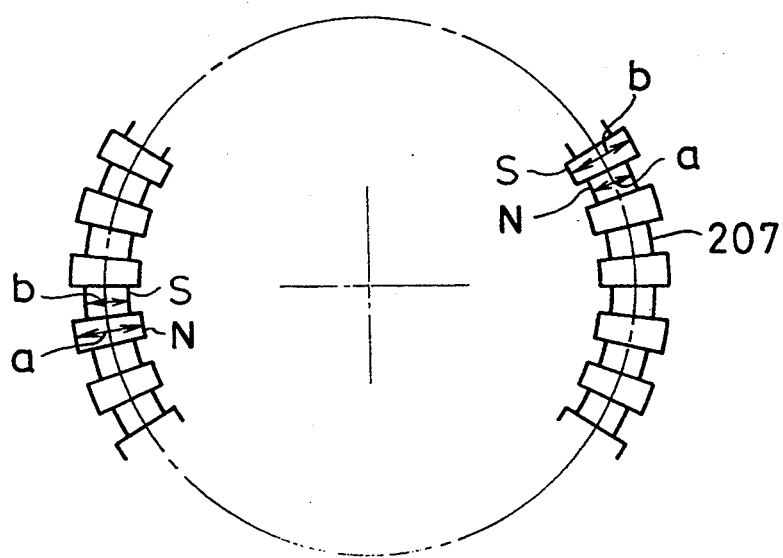
FIG. 63 is a schematic diagram illustrating the construction of the magnetizing yoke 207 of FIG. 62.
Figure 64:
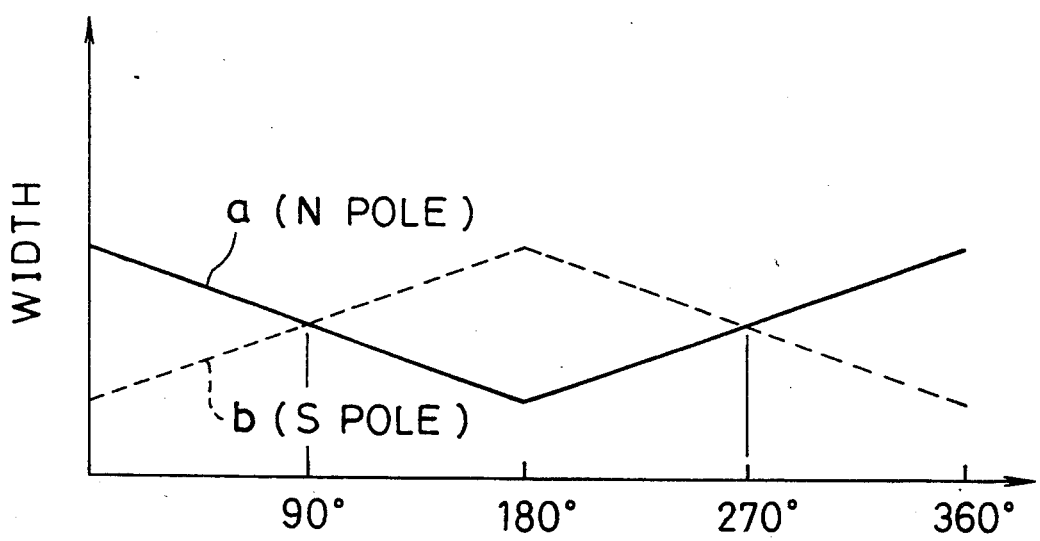
FIG. 64 is a diagram illustrating changes in diameters a and b of the magnetizing yoke 207 depending on positions along its circumference.

FIG. 62 illustrates a magnetizing method for obtaining the intensity distribution of the magnetized pattern of the frequency generating magnet 2, as shown in FIG. 59. A coil 205 is wound on a magnetizing yoke 207 at an identical pitch. A magnetic field as shown in FIG. 59 is formed when a current I flows through the coil 205. The magnet 2 is magnetized by this magnetic field. FIG. 63 illustrates the construction of the magnetizing yoke 207 of FIG. 62. As shown in FIG. 63, the yoke 207 includes many alternate thick and thin segments. Let us assume that the diameters of segments for the N poles are a, and the diameters of segments for the S poles are b. The diameters a and b change depending on the positions along the circumference as shown in FIG. 64. As shown in FIG. 64, the diameters a and b are made equal at 90 and 270 degrees, and the diameters b are made smaller than the diameters a at 0 or 360 degrees so that the N poles are magnetized stronger than the S poles there.

Various modifications of the thirteenth embodiment may be made without departing from the spirit of the present invention.

In FIGS. 48 and 49, if the concentricity of the frequency generating magnet 2 and the generating wire 7a deviates, the output of the generating wire 7a is frequency modulated, and hence, the widths of the pulses obtained by converting the output into a binary signal fluctuate, resulting in a deterioration of the rotary speed of the motor. This is because the output of the generating wire 7a is used for controlling the speed as well as for detecting the index position in the twelfth embodiment as shown in FIG. 61. To eliminate adverse effects on the speed control, which arise from the magnetization including offset, and from the partial lack of generating wire along the circumference, two other patterns of the generating wire 7a are proposed. In these modifications, the generating wire for controlling the speed and that for detecting the index position are separated from each other.

Figure 65:
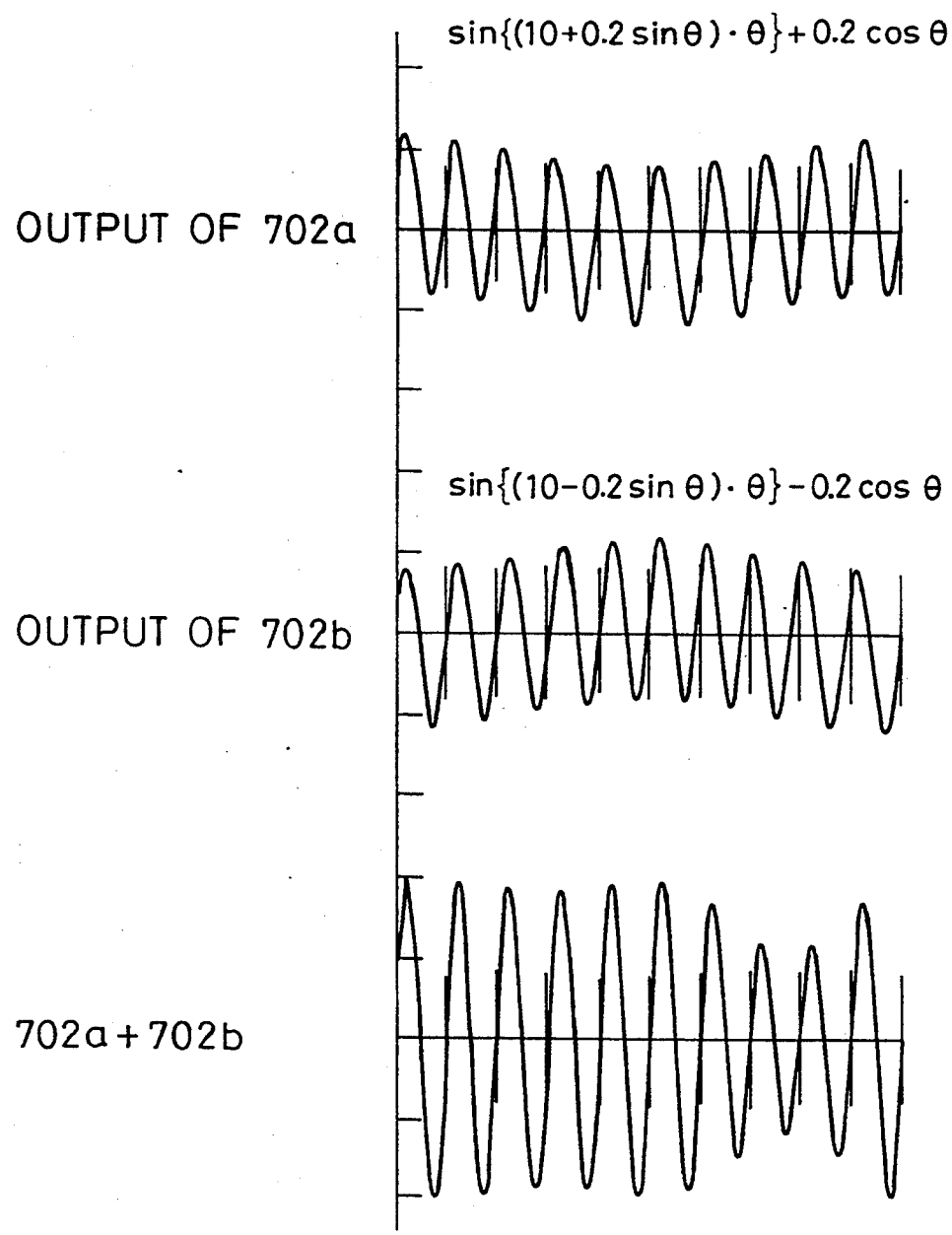
FIG. 65 is a diagram illustrating output waveforms of generating wires 702a and 702b, and the synthesized waveform of the two in accordance with a variation of the thirteenth embodiment, wherein FM components included in the two are canceled.

First, as shown in FIG. 56, a pair of generating wires 702a and 702b for speed control are disposed in a centrosymmetric manner with respect to the axis of rotation of the rotor, and the outputs of the two generating wires 702a and 702b are synthesized to cancel the FM (frequency modulation) component included in the outputs of the generating wires. Thus, a deterioration of the rotation accuracy is prevented. FIG. 65 illustrates the output waveforms of the generating wires 702a and 702b, and the synthesized waveform of the two. When the two generating wires 702a and 702b are disposed as shown in FIG. 56, they detect the index signal at positions centrosymmetric with respect to the axis of rotation. Consequently, the two outputs of the generating wires 702a and 702b have opposite phases. Thus, a index signal which is free from fluctuation of pulse width is obtained by adding the outputs of the generating wires 702a and 702b.

FIG. 58 illustrates another variation of the thirteenth embodiment, which prevents a fluctuation of the pulse width arising from a deviation of concentricity of the frequency generating magnet 2 and the generating wire 7a. In this figure, a generating wire 704 for controlling speed is formed along the entire circumference. In addition, a generating wire 705 for detecting the index position is formed in a section thereof. This also makes it possible to eliminate the above-mentioned problem.

It should be decided in view of the space factor in a motor whether or not the generating wire for controlling speed and that for detecting the index position are made common.

The thirteenth embodiment of the present invention can be applied not only to a circumference-opposing type spindle motor, but also to a plane-opposing type motor. Furthermore, the embodiment can be applied to a motor in general having an index position detecting apparatus.

In the thirteenth embodiment and the variations thereof described above, since the magnetic field originating from the magnet for generating a speed control signal and acting on the generating wire is offset modulated one cycle per one revolution, an index signal occurring once per one revolution can be formed from the offset modulated component. This makes it possible to obviate the index magnet 13 and the Hall effect sensor 14, which are required in the conventional apparatus, thereby reducing the size of the motor of the embodiment. In addition, since the index magnet 13 is removed, the problem of leakage magnetic flux is also eliminated.

FOURTEENTH EMBODIMENT

In this embodiment, the magnetized pattern of a frequency generating magnet 2 is frequency modulated one cycle per one revolution so that an index signal is generated from the frequency generated component picked up from the frequency modulated magnetic field from the magnet 2.

Figure 66:
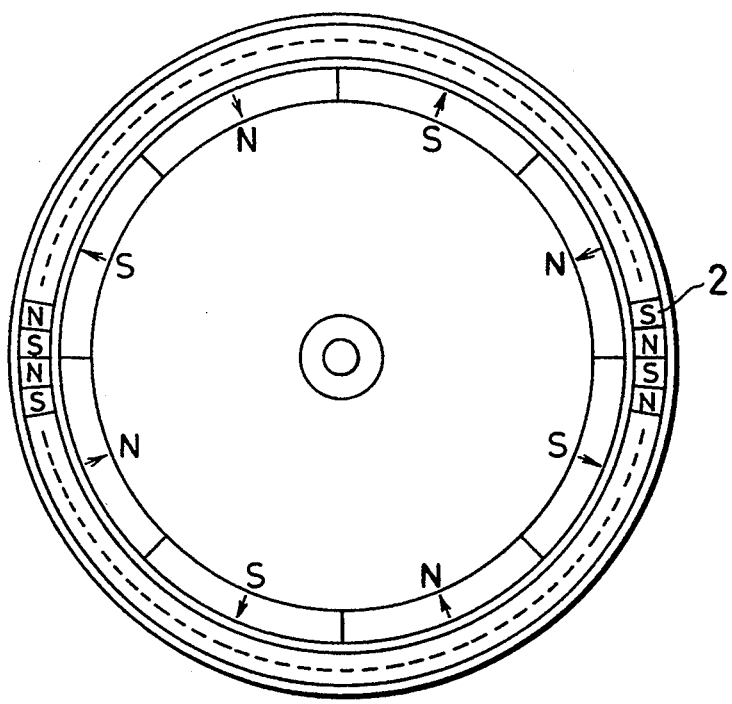
FIG. 66 is a plan view illustrating magnetized patterns of a driving magnet 1 and frequency generating magnet 2 at the rotor side in accordance with a fourteenth embodiment of the present invention.
Figure 67:
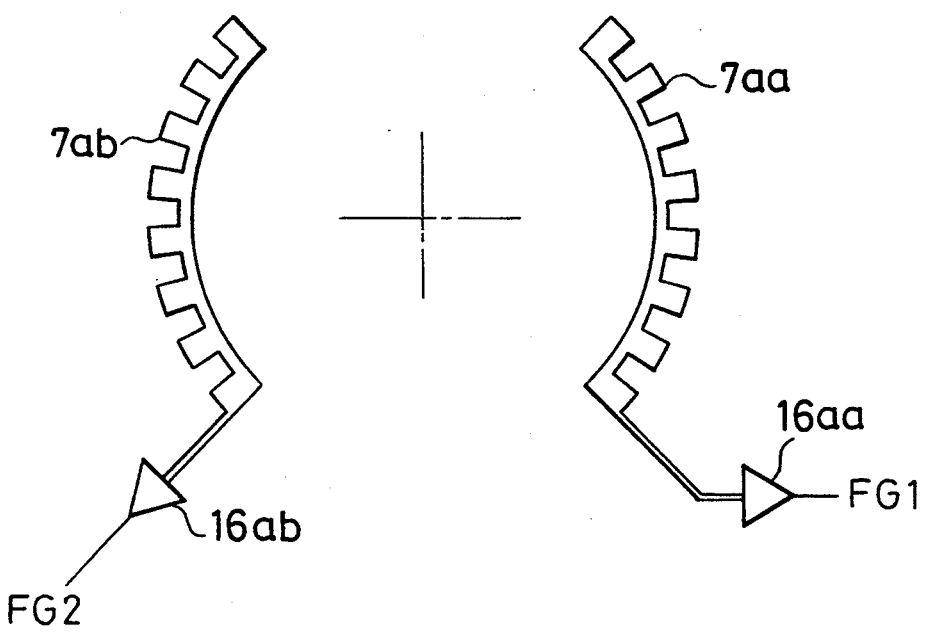
FIG. 67 is a plan view illustrating the pattern of a generating wire 7a of the fourteenth embodiment.

Referring to FIGS. 66 and 67, the magnetized pattern of the frequency generating magnet 2 characteristic to this embodiment will be described. FIG. 66 illustrates the magnetized patterns of a driving magnet 1 and the frequency generating magnet 2 at the rotor side. The magnetized pattern of the driving magnet 1 comprises magnetic transitions at a fixed interval. The magnetized pattern of the frequency generating magnet 2, however, comprises magnetic transitions formed at gradually varying intervals. At the right-hand side of FIG. 66, the intervals of the magnetic transitions are rather long, while they become shorter as they progress toward the left side. In other words, the intervals of transitions of the frequency generating magnet 2 change as gradual increase—maximum—gradual decrease—minimum—increase. Thus, the magnetization pitch changes one cycle per one revolution.

FIG. 67 is a plan view illustrating the pattern of a generating wire 7a of the fourteenth embodiment. The generating wire 7a consists of two generating wires 7aa and 7ab, which are disposed at centrosymmetric positions with regard to the axis of rotation, as shown in FIG. 67. The pitches of of the generating wires 7aa and 7ab are identical, and the outputs thereof are amplified by amplifiers 16aa and 16ab, respectively. Thus, the amplifier 16aa outputs a signal FG1 and the amplifier 16ab outputs a signal FG2. With such an arrangement, the signals FG1 and FG2 have FM (frequency modulation) components having phase differences of 180 degrees to each other as shown at (a) and (b) in FIG. 68. In other words, the phases of the waves shift in opposite directions as shown at (a) and (b) in FIG. 68. Here, when the central angle of sectors formed by the generating wires 7aa and 7ab is increased by increasing the number of U-shaped elements of the generating wires with their pitch maintaining at a fixed value, the outputs of the generating wires increase, and the FM components thereof decreases. In contrast, when the central angle is decreased, the outputs decrease and the FM components increase.

Figure 69:
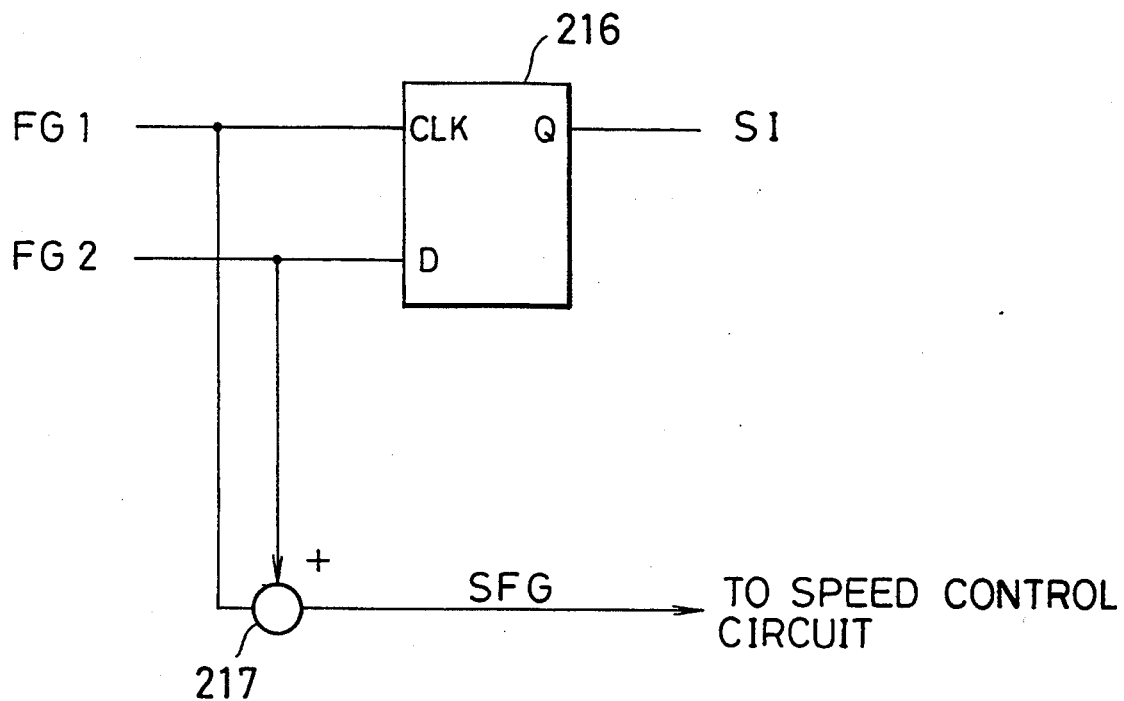
FIG. 69 is a block diagram showing the arrangement of an index position detecting circuit 100 in accordance with the fourteenth embodiment.

FIG. 69 is a block diagram of an index position detecting circuit of the fourteenth embodiment. The clock pulses FG1 to a D latch (D flip-flop) 216 are obtained by converting the output of the differential amplifier 16aa into a binary signal by a comparator. Likewise, the data FG2 to the D latch 216 is obtained by converting the output of the differential amplifier 16ab into a binary form. The two binary signals FG1 and FG2 are inputted to an adder 217. The adder 217 outputs a signal SFG as shown at (c) in FIG. 68. The signal SFG has no FM components included in the signals FG1 and FG2 because the FM components are canceled out by the addition. Thus, a signal which is not influenced by the FM components is obtained, and hence, a high precision speed control circuit can be achieved by using this signal as the speed control signal.

In FIG. 69, the binary signal FG2 is inputted to the data terminal of the D-latch 216. The pulse numbers of the signals FG1 and FG2 per one revolution of the rotor are identical in accordance with the number of poles of magnetized patterns of the frequency generating magnet 2. Although their pulse numbers are equal, the phase difference between the two signals FG1 and FG2 changes at a rate of one period per one revolution.

Figure 70:
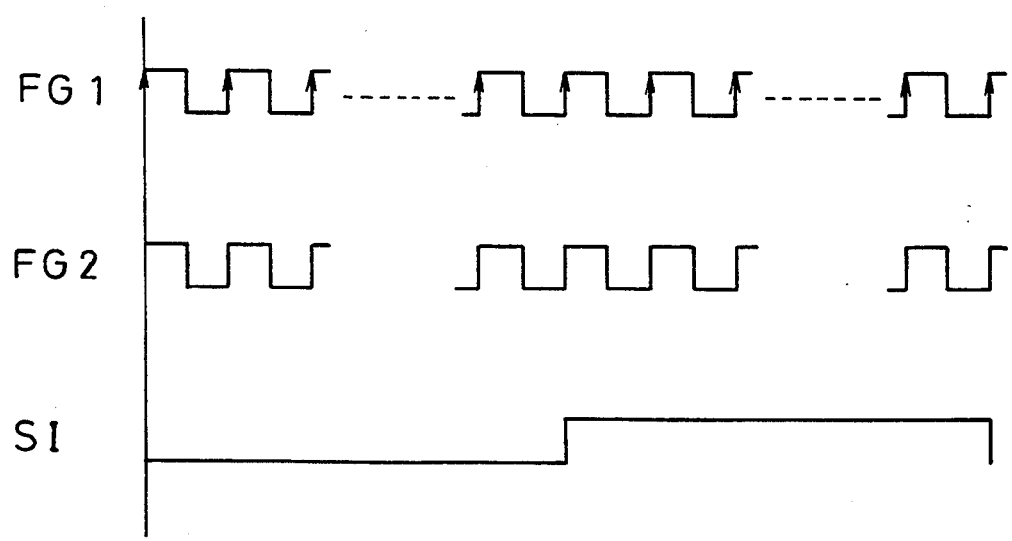
FIG. 70 is a diagram illustrating the waveforms of various portions in an index position detecting circuit 100 in accordance with the fourteenth embodiment.

In view of this, the D-latch 216 latches the FG2 signal at a leading edge of the FG1 signal. More specifically, in the timing chart of FIG. 70, when the FG2 signal lags with respect to the FG1 signal as the rotor rotates, the D-latch 216 is set, and while the FG2 signal advances with respect to the FG1 signal, the D-latch is reset. This transition occurs once in one revolution without fail. Thus, the D-latch 216 produces an index signal consisting of one pulse per revolution. Therefore, the index signal can be generated without using a position detecting device.

Figure 71:
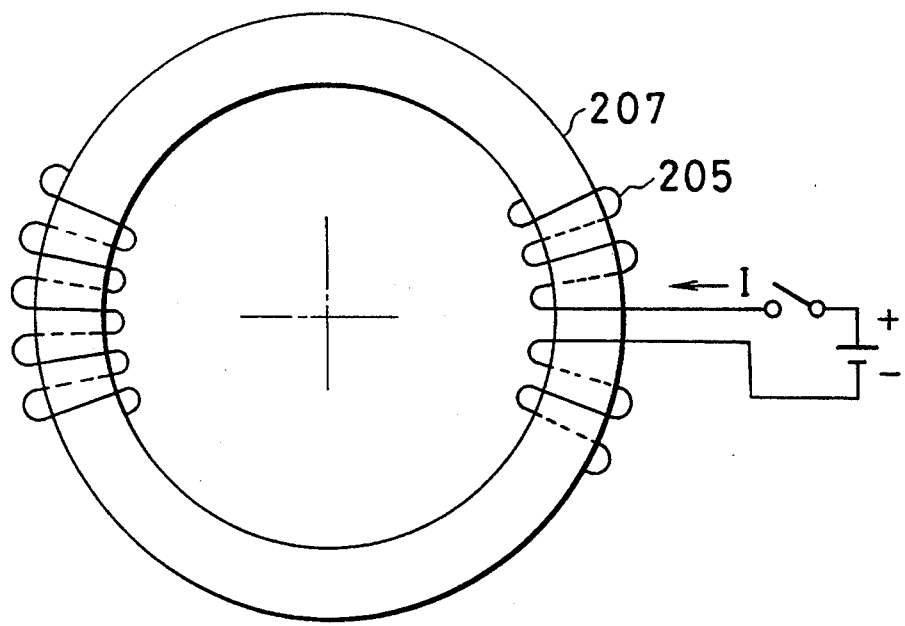
FIG. 71 is a diagram illustrating a method for obtaining the intensity distribution of the magnetization of a frequency generating magnet 2 in accordance with the fourteenth embodiment.
Figure 72:
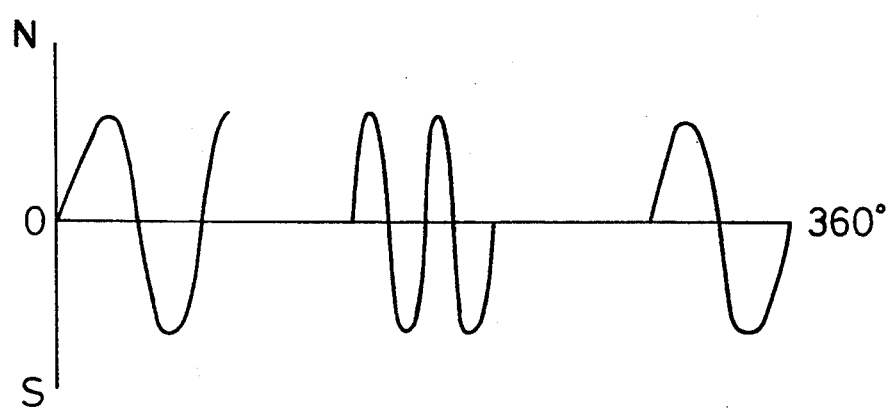
FIG. 72 is a graph illustrating the intensity distribution of the magnetized pattern of a frequency generating magnet 2 in accordance with the fourteenth embodiment.

FIGS. 71 and 72 illustrate a method for magnet i zing the frequency generating magnet 2. In FIG. 71, a magnetizing yoke 207 has a fixed thickness along the entire circumference. A coil 205, on the other hand, has pitches changing from large to small, and again to large, forming the largest pitch portion and the smallest pitch portion at centrosymmetric positions. As a result, the intensity distribution of magnetization shown in FIG. 72 is obtained.

Various modifications of the fourteenth embodiment may be made without departing from the spirit of the present invention.

In FIGS. 66 and 49, if the concentricity of the frequency generating magnet 2 and the generating wire 7a deviates, the output of the generating wire 7a is frequency modulated, and hence, the widths of the pulses obtained by converting the output into a binary signal fluctuate, resulting in a deterioration of the rotary speed of the motor. This is because the outputs of the generating wires 7aa and 7ab are used for controlling the speed as well as for detecting the index position in the fourteenth embodiment as shown in FIGS. 67 and 69. Here, to eliminate adverse effects on the speed control, which arises from the frequency modulation, two other patterns of the generating wires 7aa and 7ab are proposed. In these modifications, the generating wire for controlling the speed and that for detecting the index position are separated from each other.

First, as shown in FIG. 56, a pair of generating wires 702a and 702b for speed control are disposed in a centrosymmetric manner with respect to the axis of rotation of the rotor, and the outputs of the two generating wires 702a and 702b are synthesized to cancel the FM (frequency modulation) component included in the outputs of the generating' wires. Thus, a deterioration of the rotation accuracy is prevented. FIG. 57 illustrates the output waveforms of the generating wires 702a and 702b, and the synthesized waveform of the two, which is used as the speed control signal. In this variation, the adder 217 is unnecessary because the speed control signal is obtained without the adder 217.

FIG. 58 illustrates another variation of the fourteenth embodiment, which prevents a fluctuation of the pulse width arising from a deviation of concentricity of the frequency generating magnet 2 and the generating wires 7aa and 7ab. In this figure, a generating wire 704 for controlling the speed is formed along the entire circumference. In addition, a generating wire 705 for detecting the index position is formed in a section thereof. The FG1 signal outputted from the generating wire 704 is not frequency modulated because the FG1 signal is obtained as an integral along the entire circumference. The FG2 signal, on the other hand, is frequency modulated. Although the phase difference of the signals FG1 and FG2 is half that of the fourteenth embodiment, an index signal can be detected from the phase difference. In this modification, the adder 217 is unnecessary, and so simplifies the circuit construction.

In the fourteenth embodiment and the variations thereof described above, since the magnetic field originating from the magnet for generating a speed control signal and acting on the generating wire is frequency modulated one cycle per one revolution, an index signal occurring once per one revolution can be formed from the amplitude modulated component. This makes it possible to obviate the index magnet 13 and the Hall effect sensor 14, which are required in the conventional apparatus, thereby reducing the size of the motor of the embodiment. In addition, since the index magnet 13 is removed, the problem of leakage magnetic flux is also eliminated.

The rising or falling edge of the clock signal FG1 to the D latch 216 is separated apart as much as possible from the rising or falling edge of the data input FG2 to the D latch 23. This will prevent mislatch of the D latch 216 caused by a fluctuation of the timings of the clock signal and the input data, because by so doing, the adverse effects of fluctuations in the magnetized positions and intensity of frequency generating magnetized pattern 2, and of offset voltages of the differential amplifiers 16aa and 16ab, can be eliminated. Thus, the index signal can be generated with a simple circuit.

FIFTEENTH EMBODIMENT

Figure 73:
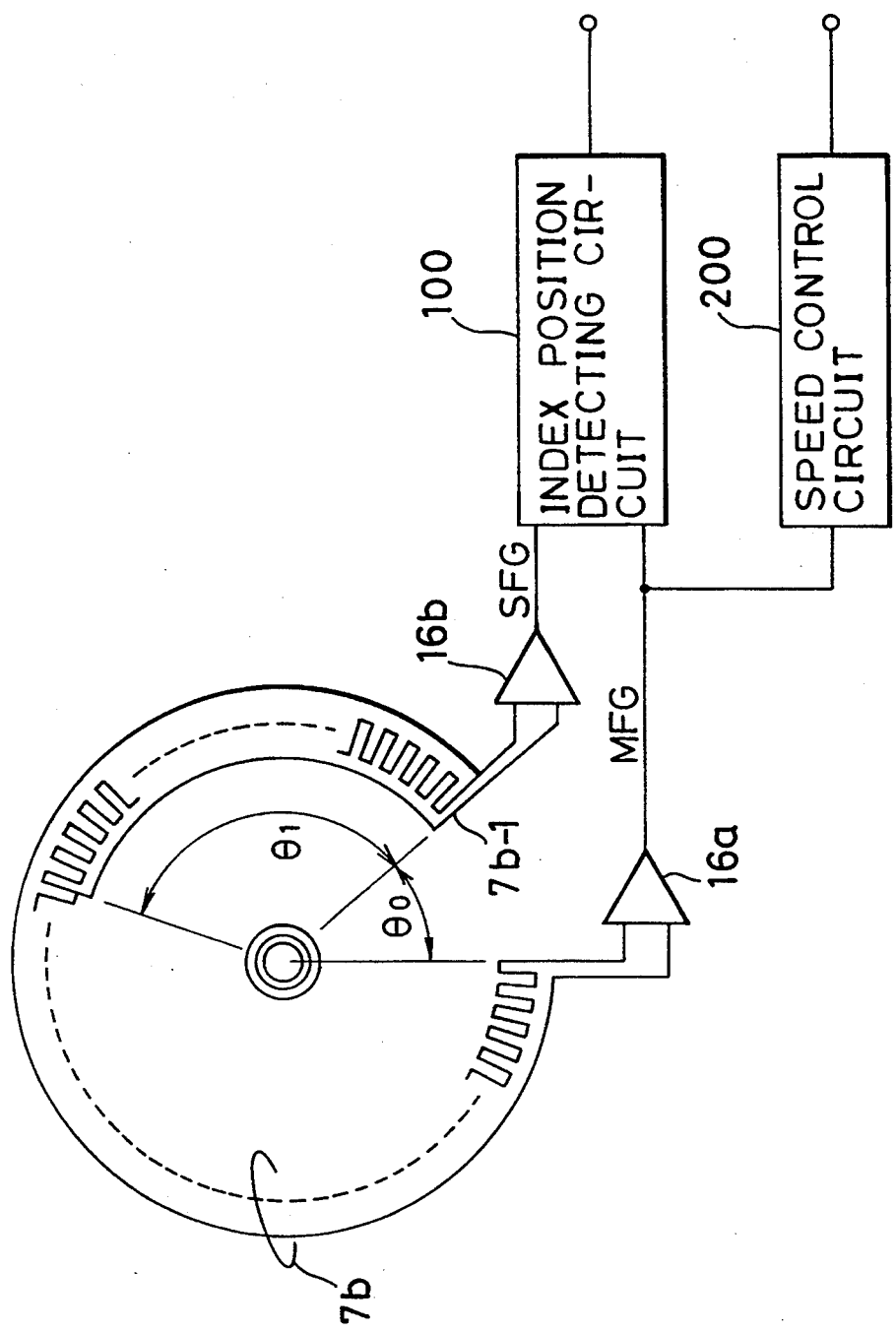
FIG. 73 is a diagram illustrating the pattern of a generating wire 7b in accordance with a fifteenth embodiment.

FIG. 73 illustrates the pattern of a generating wire 7b in accordance with a fifteenth embodiment. The generating wire 7b is made of copper or the like etched on an iron substrate. The pattern of the generating wire 7b is not formed along the entire circumference, but lacks a part corresponding to an angle θ0 as shown in FIG. 73. This is for connecting driving coils and Hall effect sensors to terminals of an integral circuit for controlling the driving of the motor, and has nothing to do with the present invention.

Figure 3:
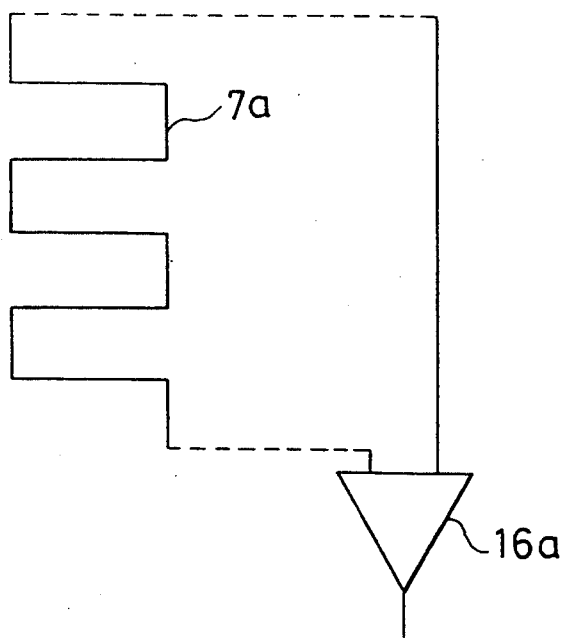
FIG. 3 is a schematic diagram illustrating a generating wire 7a consisting of 120 U-shaped elements corresponding to the number of poles of a frequency generating magnet 2.
Figure 4:
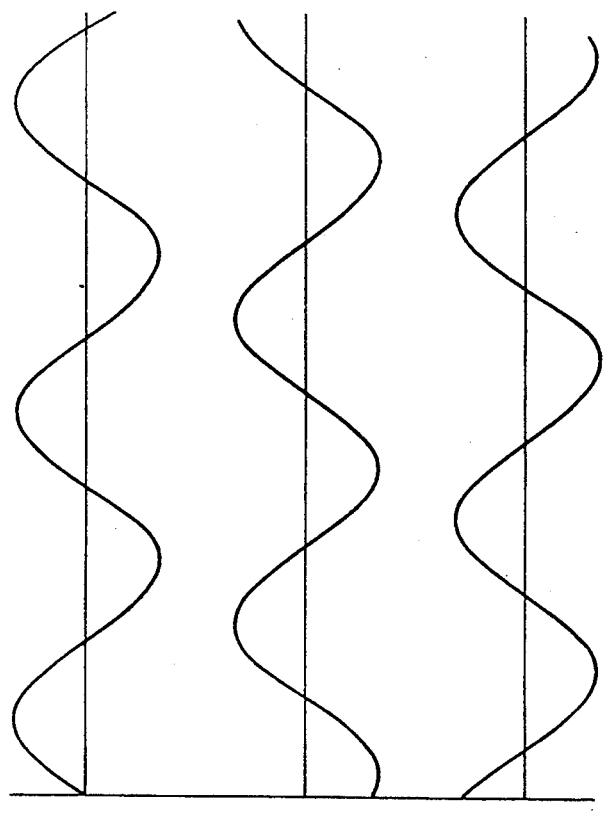
FIG. 4 is a diagram illustrating waveforms outputted from Hall effect sensors 12a, 12b and 12c which detect exciting timings of respective phases when a rotor yoke 4 is driven.
Figure 5:
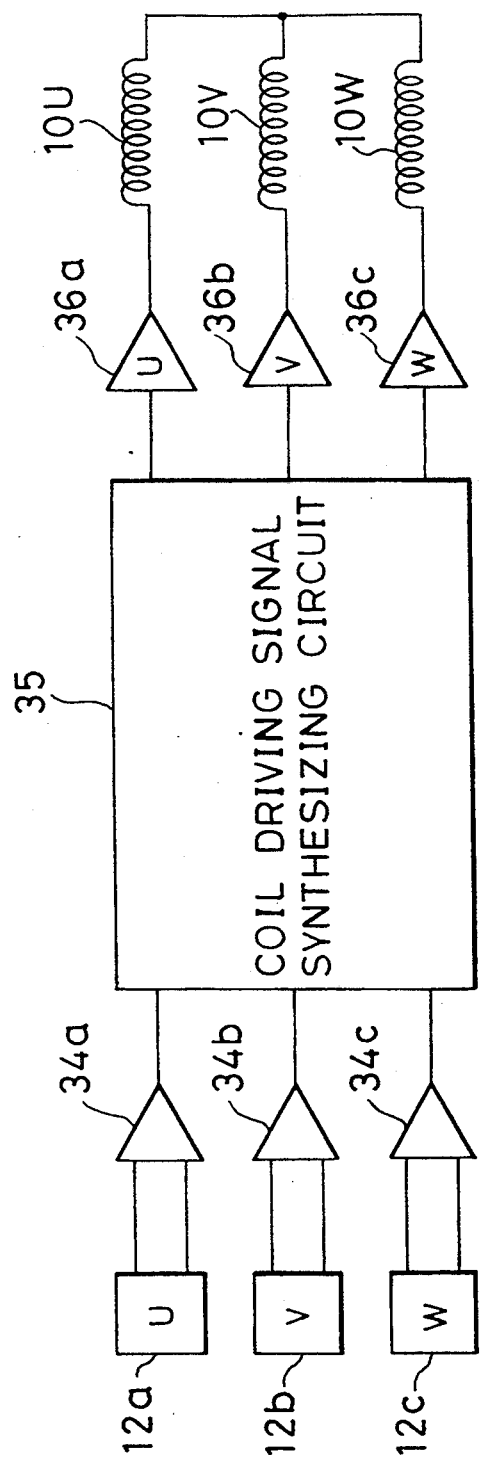
FIG. 5 is a block diagram showing an exciting timing detecting circuit and an exciting circuit for the conventional motor of FIGS. 1 and 2.

The output from the entire generating wire 7b is inputted to an amplifier 16a as a first rotation speed signal. In addition, an output from a segment wire 7b-1 of the generating wire 7b is inputted to an amplifier 16b as a second rotation speed signal. Here, the segment wire 7b-1 is a part of the generating wire 7b, and is formed over an angle θ1 as shown in FIG. 73. This arrangement differs from that of the conventional apparatus wherein the output from the entire generating wire 7a is inputted as a rotation speed signal to the amplifier 16 as shown in FIG. 3. Returning to FIG. 73, the output of the amplifier 16a, a main frequency generating signal MFG, is inputted to an index position detecting circuit 100 and a speed control circuit 200. On the other hand, the output of the amplifier 16b, a sub-frequency generating signal SFG, is inputted to the index position detecting circuit 100.

Figure 74:
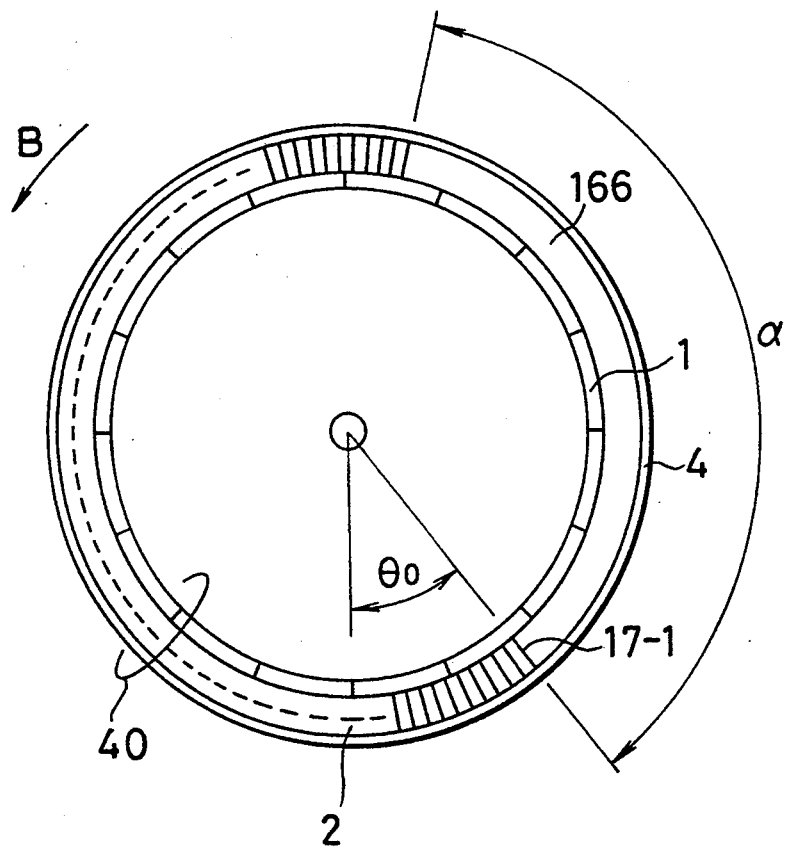
FIG. 74 is a plan view illustrating the magnetized pattern of a frequency generating magnet 2 in a rotor unit 40 in accordance with the fifteenth embodiment.

FIG. 74 is a plan view illustrating the magnetized pattern of a frequency generating magnet 2 in a rotor unit 40 in accordance with the fifteenth embodiment.

The motor of the embodiment differs from the conventional motor as shown in FIGS. 1 and 2 in that it obviates the index magnet 13 and the Hall effect sensor 14. As a result, the motor of the embodiment is shrunk in size considerably. Moreover, the frequency generating magnet 2 of the embodiment includes a non-magnetized portion 166 over an angle α as shown in FIG. 74, though the magnetized pattern of the frequency generating magnet 2 of the conventional motor is formed along the entire circumference at the same pitch as that of the generating wire 7b as shown in FIG. 1. The angle α of the non-magnetized portion 166 is related to the angle θ1 of the segment wire 7b-1 contributing the generation of the sub-FG signal SFG by the following expression:

$$\alpha > \theta 1 \qquad (18)$$

In other words, when the rotation speed signal consists of P/2 pulses per one revolution, the number M of poles of the frequency generating magnet 2 is $$M < P \qquad (19)$$

The number N1 of U-shaped elements contributing to the main FG signal MFG is $$N1 \leq P \qquad (20)$$

The number N2 of U-shaped elements contributing to the sub-FG signal SFG is given by the following expression because it is less than the number (P-M) of elements of the non-magnetized portion 1.

$$N2 \leq (P-M) \qquad (21)$$

With this arrangement, although the number of poles of the frequency generating magnet 2 opposite the generating wire 7b contributing to the generation of the main FG signal MFG changes as the rotor rotates, it never falls to zero, and hence, the main FG signal MFG is continually outputted from the generating wire 7b. In this case, the main FG signal MFG is amplitude modulated one cycle per one revolution as illustrated at (a) in FIG. 75, and is employed as a speed detection signal of the rotor. The number of poles of the frequency generating magnet 2 opposite to the generating wire 7b-1 contributing to generation of the sub-FG signal SFG, however, falls to zero once per one revolution, and hence, the sub-FG signal SFG falls to zero once per one revolution as illustrated at (c) in FIG. 75. Accordingly, an index signal can be obtained by detecting the zero of the sub-FG signal SFG. In this case, it is important that the angle θ1 of the generating wire 7b-1 contributing to the generation of the sub-FG signal SFG is slightly less than the angle α of the nonmagnetized portion 166 so that the time period during which the generating wire 7b-1 does not generate corresponds to one pulse interval of the main FG signal MFG.

Figure 75:
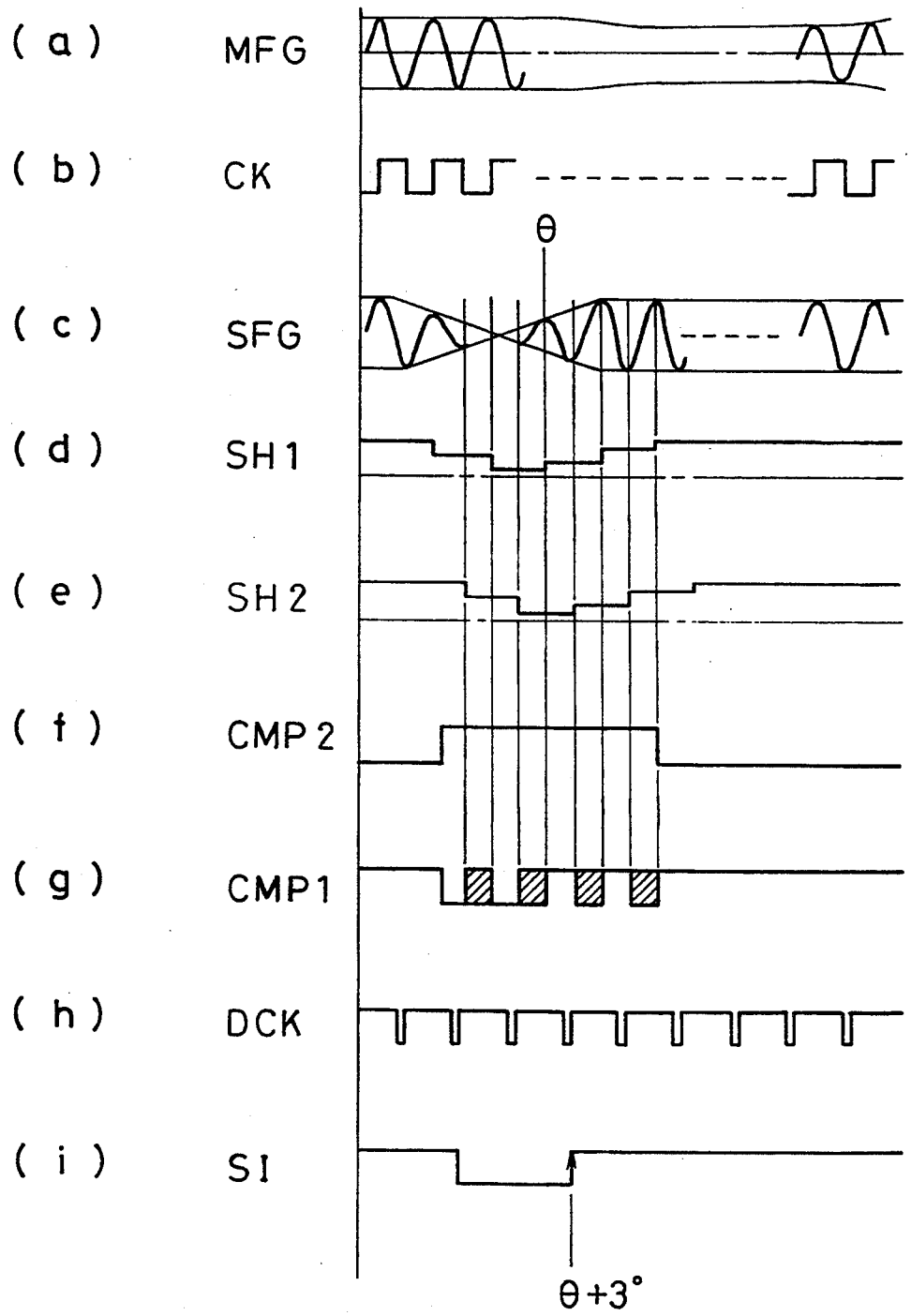
FIG. 75 is a timing chart illustrating the waveforms of major signals of an index position detecting circuit 100 in accordance with the fifteenth embodiment.

Thus, the index signal SI is generated as follows on the basis of the sub-FG signal SFG, which is amplitude modulated one cycle per one revolution of the rotor unit 40: first, a clock signal CK as shown at (b) in FIG. 75 is formed by differentiating the main FG signal MFG; second, the minimum value of the amplitude modulation component of the sub-FG signal SFG is detected; and finally, the index signal is generated by the rising edge or falling edge of the clock signal immediately after the minimum value.

Next, the operation of the fifteenth embodiment will be is explained.

In FIGS. 73 and 74, changes in the magnetic flux originated from the frequency generating magnet 2, which accompany the rotation of the rotor unit 40, are detected by the wires 7b and 7b-1. The outputs of the wires 7b and 7b-1 are amplified by amplifiers 16a and 16b, and are sent to an index position detecting circuit 100 as the main FG signal MFG and sub-FG signal SFG, respectively.

FIG. 75 is a timing chart illustrating the waveforms of major signals of the index position detecting circuit 100 in accordance with the fifteenth embodiment. The main FG signal MFG as shown at (a) of FIG. 75 is outputted from the amplifier 16a. As will be seen from FIGS. 73 and 74, the degree of the amplitude modulation of the main FG signal MFG is very small, so that the amplitude of each wave thereof is sufficiently large. Thus, the main FG signal MFG is appropriate for the rotation speed signal as well as the index signal. The AM (amplitude modulation) component of the main FG signal MFG takes its maximum amplitude while the portion lacking the frequency generating wire 7b corresponding to the angle θ0 faces the nonmagnetized portion 166, whereas it takes its minimum amplitude while the frequency generating wire 7b faces the nonmagnetized portion 166. If the pattern of the frequency generating wire 7b contributing the main FG signal MFG is formed along the entire circumference without discontinuity (that is, θ0=0 in FIG. 73), the AM component is lost.

The main FG signal MFG is differentiated by a differentiating circuit 171 in FIG. 76, and subsequently, is converted into a binary form by a comparator 172. The output of the comparator 172 is the clock signal as shown at (b) of FIG. 75, and is used as the clock signal for sample-and-hold circuits. In addition, the main FG signal MFG is converted into a binary form by a comparator 173, and is inputted to a speed control circuit 200.

The speed control circuit 200 generates a speed control signal by comparing a reference clock signal (1 MHz in FIG. 76) and the clock signal obtained from the main FG signal MFG, and controls the currents to be supplied to driving coils of the motor. Thus, the motor rotates at a fixed speed. The speed control circuit 200 generates a revolution number lock signal while the revolution number of the motor enters within a predetermined range ($\pm 10\%$ in FIG. 76) of the set revolution number. The method of using the lock signal is explained later.

The sub-FG signal SFG outputted from the amplifier 16b is shown at (c) of FIG. 75. As stated before, the sub-FG signal SFG falls to substantially zero once per one revolution of the rotor unit 40. This is the key point of the embodiment.

Generally, the amplitude of the sub-FG signal changes depending on the fluctuation of the magnetization intensity of the frequency generating magnet 2, the change of a gap between the magnet 2 and the frequency generating wire 7b due to variations in assembling accuracy, variation the magnetic flux depending on temperature, etc. It also changes depending on the preset number of revolution. A method for generating an index signal by detecting the level of the AM component of the frequency generating signal or the like as in the present embodiment requires a detection method which is not influenced by the level change. Thus, the above-described method needs to provide for detecting the timing at which the amplitude of the sub-FG signal SFG falls to substantially zero.

Next, a method for detecting the minimum value of the sub-FG signal SFG will be described. The sub-FG signal SFG is inputted to a sample-and-hold circuit 174 of FIG. 76, and is sampled and held at the rising edge of the clock signal CK as shown at (b) of FIG. 75. In this case, a pulse generator 175 produces a pulse as shown in FIG. 76 in response to the rising edge of the clock signal, and supplies the pulse to the sample-and-hold circuit 174 as a sample-and-hold signal. The sample-and-hold circuit 174 performs sampling when the sample-and-hold signal is low, and holding when it is high. The output signal SH1 of the sample-and-hold circuit 174 is illustrated at (d) of FIG. 75.

The signal SH1 is inputted to a second sample-and-hold circuit 176, and is sampled and held by the falling edge of the clock signal. A pulse generator 177 is used to produce a sample-and-hold signal applied to the sample-and-hold circuit 176. The output signal SH2 of the second sample-and-hold circuit is shown at (e) of FIG. 75.

The two signals SH1 and SH2 are compared by a comparator 178. The comparator 178 stops its operation while the sample-and-hold circuits 174 and 176 are sampling, and while the voltage of the AM component of the sub-FG signal SFG exceeds a predetermined voltage smaller than the maximum voltage of the signal SFG. The purpose of this is to prevent faulty operation of the comparator 178. In particular, this prevents faulty operation due to extra AM components caused by undulation of the surface of the frequency generating magnet 2 when the sub-FG signal has a large amplitude.

Figure 76:
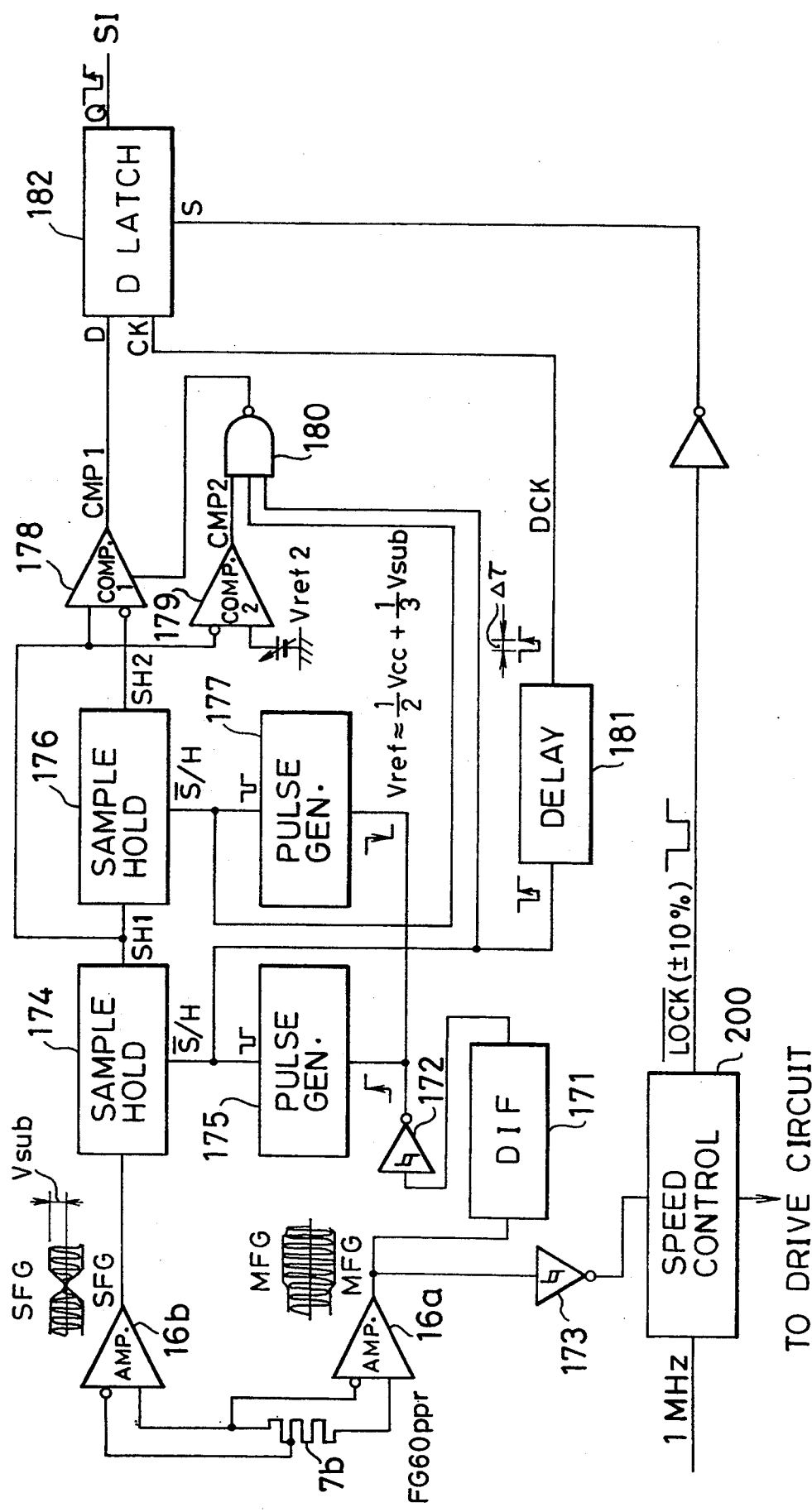
FIG. 76 is a block diagram showing the arrangement of an index position detecting circuit 100 in accordance with the fifteenth embodiment.

In FIG. 76, the operation of the comparator 178 is inhibited by the output of an NAND gate 180. The NAND gate 180 NANDs the output COMP2 of a comparator 179, and the outputs of the pulse generators 175 and 177. Here, the comparator 179 compares the signal SH1 with a reference voltage Vref equal to half the supply voltage plus one third voltage of the AM component of the sub-FG signal SFG, that is, Vref=Vcc/2+Vsub/3. The output CMP1 of the comparator 178 is shown at (g) of FIG. 75. Shadowed portions indicate that the output of the comparator 178 is unstable because the levels of the signals SH1 and SH2 are identical.

The output CMP1 of the comparator 178 is inputted to the data terminal of a D latch 182. The output of the pulse generator 175 is delayed by a delay circuit 181, and is inputted to a clock terminal of the D latch 182. Furthermore, to prevent faulty operation of the D latch 182 when the motor starts or stops, the D latch 182 is enabled to operate only when the number of revolution is within a predetermined range around a reference number of revolutions, which is detected from the revolution number lock signal outputted from the speed control circuit 200. In FIG. 76, the lock signal is outputted when the number of revolutions is within 10% of the reference number of revolutions. The output SI of the D latch 182 is illustrated at (i) in FIG. 75. The rising edge of the output SI indicates the timing of the index position. Since the index signal SI is in synchronism with the output DCK of the delay circuit 181 shown at (h) in FIG. 75, it is not influenced by timing changes due to offset voltages of comparators or the like.

Assuming that the rotor unit 40 is rotating in the direction indicated by the arrow B as shown in FIG. 74, the index signal SI rises immediately after the boundary line 17-1 of the magnetized pattern reaches the generating wire 7b-1.

In this embodiment, the hold timing of the sample-and-hold circuit 174 is specified as the rising edge of the clock signal; the hold timing of the sample-and-hold circuit 176, as the falling edge of the clock signal; and the latch timing of the D latch 182, an instant from the rising edge to the falling edge of the clock signal. These timings, however, may be opposite: the hold timing of the sample-and-hold circuit 174 may be specified as the falling edge of the clock signal; the hold timing of the sample-and-hold circuit 176 may be specified as the rising edge of the clock; and the latch timing of the D latch 182 may be specified an instant from the falling edge to rising edge of the clock.

Various modifications of the fifteenth embodiment may be made without departing from the spirit of the present invention.

First, the nonmagnetized portion 166 provided at a section over an angle $\alpha$ on the circumference of the frequency generating magnet 2 will cause local imbalance of the attracting force between the frequency generating magnet 2 and the iron substrate 7. This may not only reduce the rotation accuracy of the motor, but also degrade the bearings.

Figure 77:
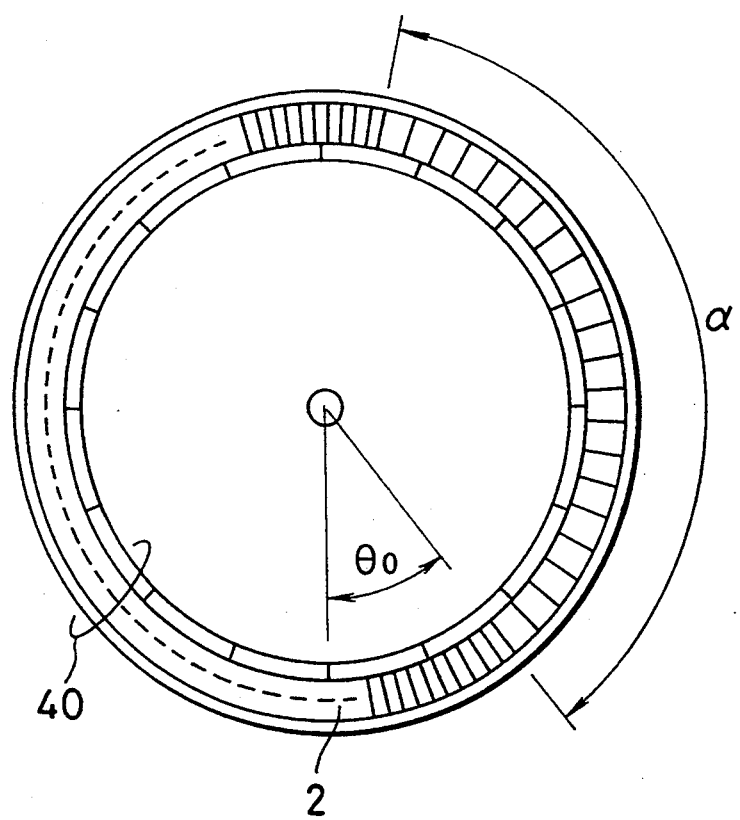
FIG. 77 is a schematic plan view showing a construction for eliminating an imbalance of the attracting force in accordance with a variation of the fifteenth embodiment.

FIG. 77 shows a construction for eliminating the imbalance of the attracting force. As illustrated in this figure, the pitch of the magnetized pattern of the section over the angle $\alpha$ is made twice that of the generating wire 7b. With such an arrangement, since this section does not contribute to the output of the generating wires 7b and 7b-1, the imbalance of the attracting force can be eliminated without degrading the performance of this embodiment. Furthermore, this makes it possible to prevent a reduction in the rotation accuracy and deterioration of the bearings.

Another variation will be described.

In FIG. 76, the sample-and-hold circuits may each be replaced with a half-wave rectifier and a low-pass filter, or with an AD converter and a D latch.

In the fifteenth embodiment and its variations, since the magnetic flux originating from the frequency generating magnet 2 and acting on the generating wires 7b and 7b-1 is amplitude modulated one cycle per one revolution, an index signal consisting of one pulse per one revolution can be generated from the AM component. Thus, the index magnet 13 and the Hall effect sensor 14 required in the conventional apparatus become unnecessary. Moreover, the size of the motor is considerably reduced. Furthermore, the problem of leakage flux is eliminated because the index magnet 13 is removed.

An adverse effect on the index signal, resulting from variations of the sub-FG signals among different motors, the temperature dependence of magnetic flux of the magnet 2, the setting difference in the number of revolutions, or the like, is eliminated in the present embodiment. This is because the index signal is generated by detecting the instant at which the sub-FG signal SFG becomes substantially zero, and by detecting immediately after that the timing of the rising or falling edge of the signal formed from the main FG signal MFG. In addition, since the index signal is generated in synchronism with the clock signal, the index signal is not affected by offsets of the comparators or the like, which makes it possible to realize a high reliability index position detecting circuit.

SIXTEENTH EMBODIMENT

Figure 78:
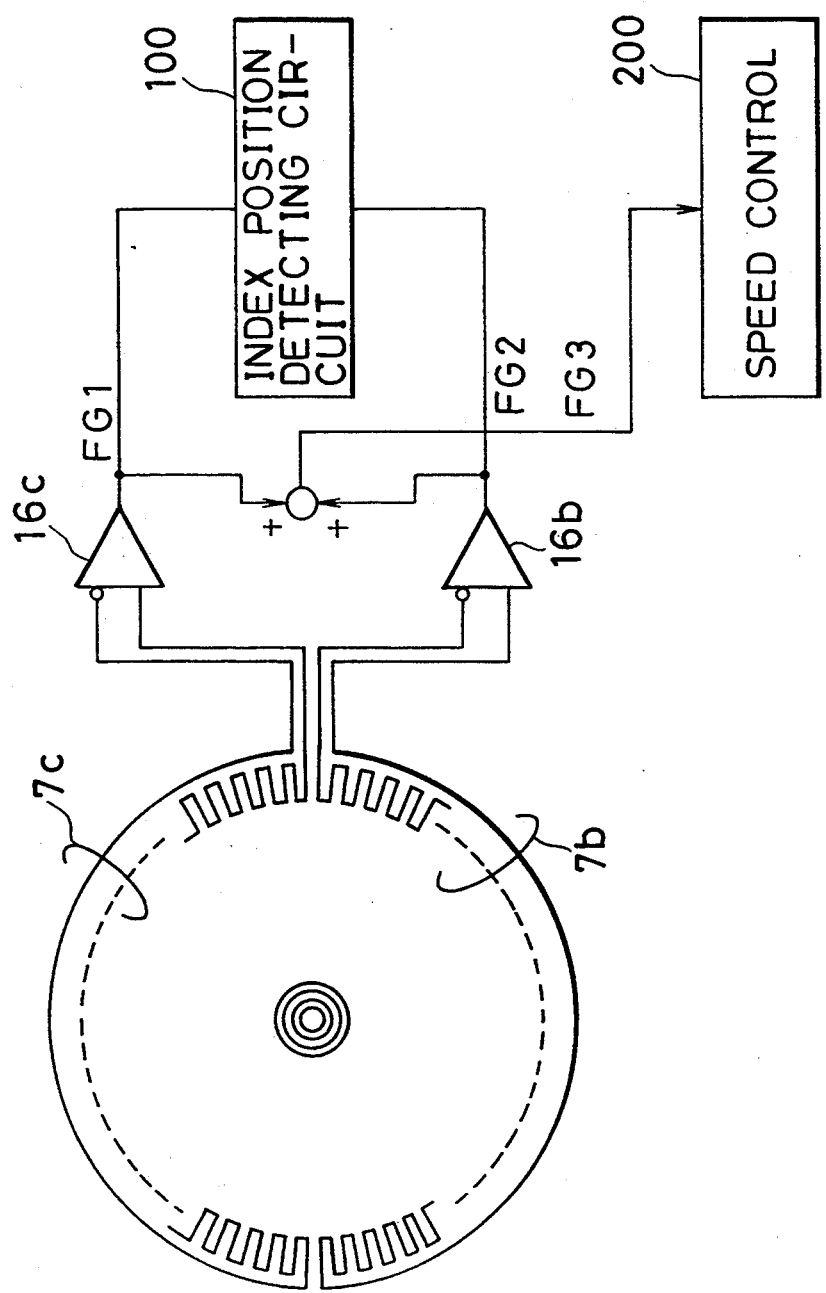
FIG. 78 is a schematic diagram illustrating the patterns of generating wires 7b and 7c in accordance with a sixteenth embodiment.

FIG. 78 illustrates the patterns of generating wires 7b and 7c in accordance with a sixteenth embodiment. The generating wires 7b and 7c are made of copper or the like etched on an iron substrate over about 180 degrees, respectively. The outputs of the generating wires 7b and 7c are amplified by amplifiers 16b and 16c, and are inputted to an index position detecting circuit 100, respectively.

This embodiment differs from the conventional apparatus including the generating wire 7a as shown in FIGS. 1 and 2 in that it has two generating wires 7b and 7c formed over about 180 degrees. In addition, although the conventional apparatus has only one amplifier 16a for amplifying the output of the generating wire 7a, the embodiment has two amplifiers 16b and 16c whose outputs are added, and the result of addition is inputted to a speed control circuit 200.

Figure 79:
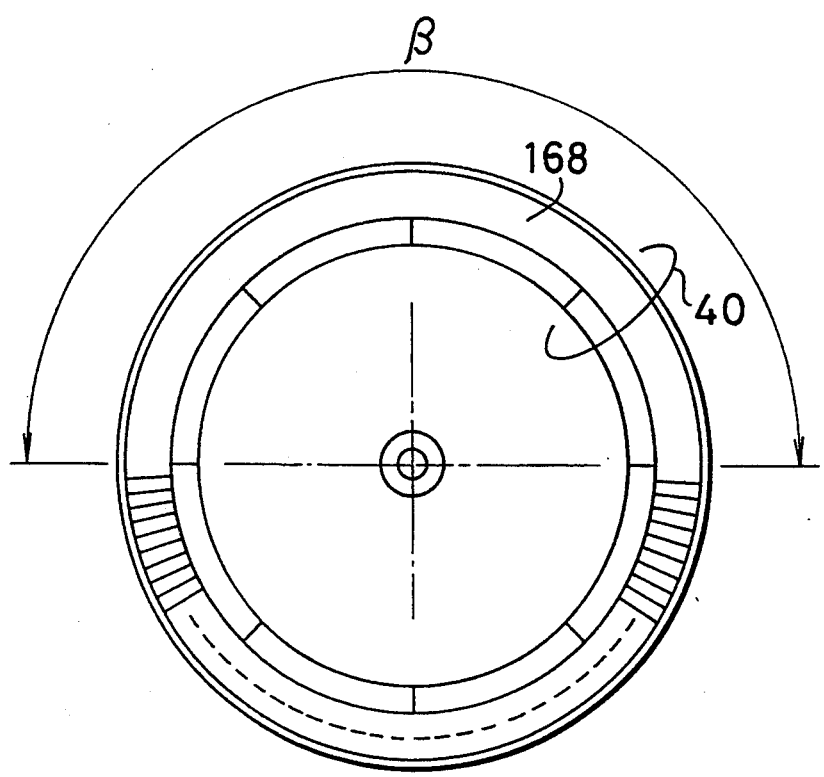
FIG. 79 is a plan view illustrating the magnetized pattern of a frequency generating magnet 2 in a rotor unit 40 in accordance with the sixteenth embodiment.

FIG. 79 is a plan view illustrating the magnetized pattern of a frequency generating magnet 2 in a rotor unit 40 in accordance with the sixteenth embodiment.

The motor of the embodiment differs from the conventional motor as shown in FIGS. 1 and 2 in that it obviates the index magnet 13 and the Hall effect sensor 14. As a result, the motor of the embodiment is shrunk in size considerably. Moreover, the frequency generating magnet 2 of the embodiment includes a non-magnetized portion 168 over an angle $\beta$ as shown in FIG. 79, though the magnetized pattern of the frequency generating magnet 2 of the conventional motor is formed along the entire circumference at the same pitch as that of the generating wire 7a as shown in FIG. 1. The angle $\beta$ of the non-magnetized portion 168 is approximately 180 degrees, which is about the same as the central angles of the patterns of the generating wires 7b and 7c. In other words, when the rotation speed signal consists of P/2 pulses per one revolution, the number M of poles of the frequency generating magnet 2 is $$M < P \tag{21}$$

The number N1 of U-shaped elements of the generating wire 7b contributing to the FG1 signal is $$N1 \leq P \tag{22}$$

The number N2 of U-shaped elements of the generating wire 7c contributing to the FG1 signal is given by the following expression:

$$N2 \leq (P - N1) \tag{23}$$

The FG1 signal and FG2 signal are amplitude modulated one cycle per one revolution of the rotor unit 40, and the phases of the AM components thereof differ by approximately 180 degrees with respect to each other. The index signal is generated by comparing the amplitudes of the two AM components.

Next, the operation of the sixteenth embodiment will be explained.

Figure 80:
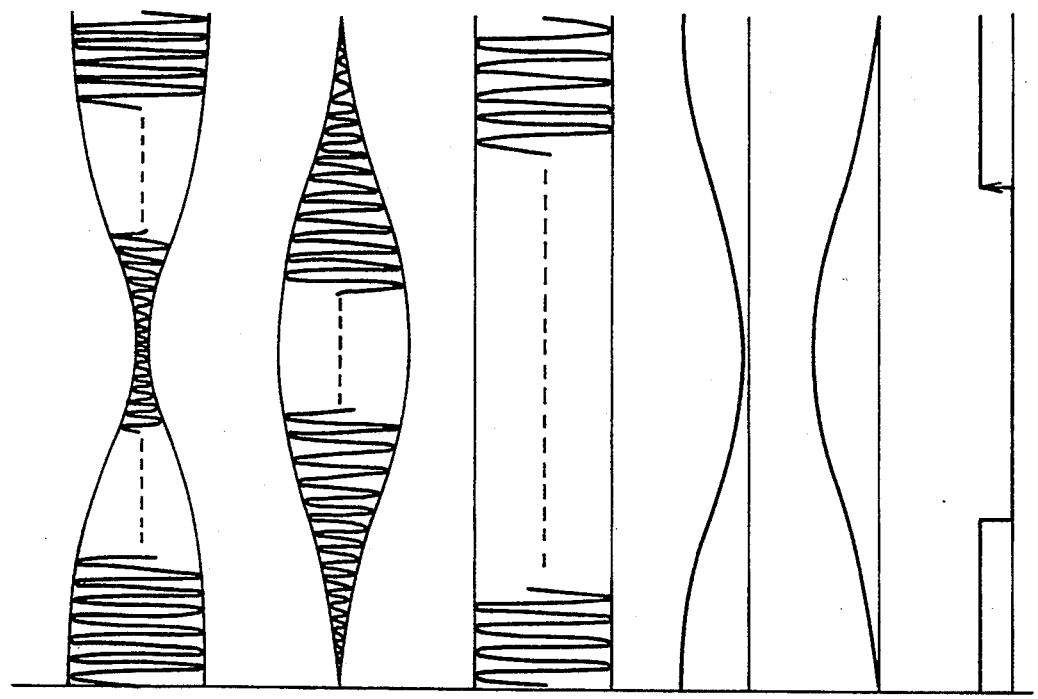
FIG. 80 is a timing chart illustrating the waveforms of major signals of the index position detecting circuit 100 in accordance with the sixteenth embodiment.
Figure 81:
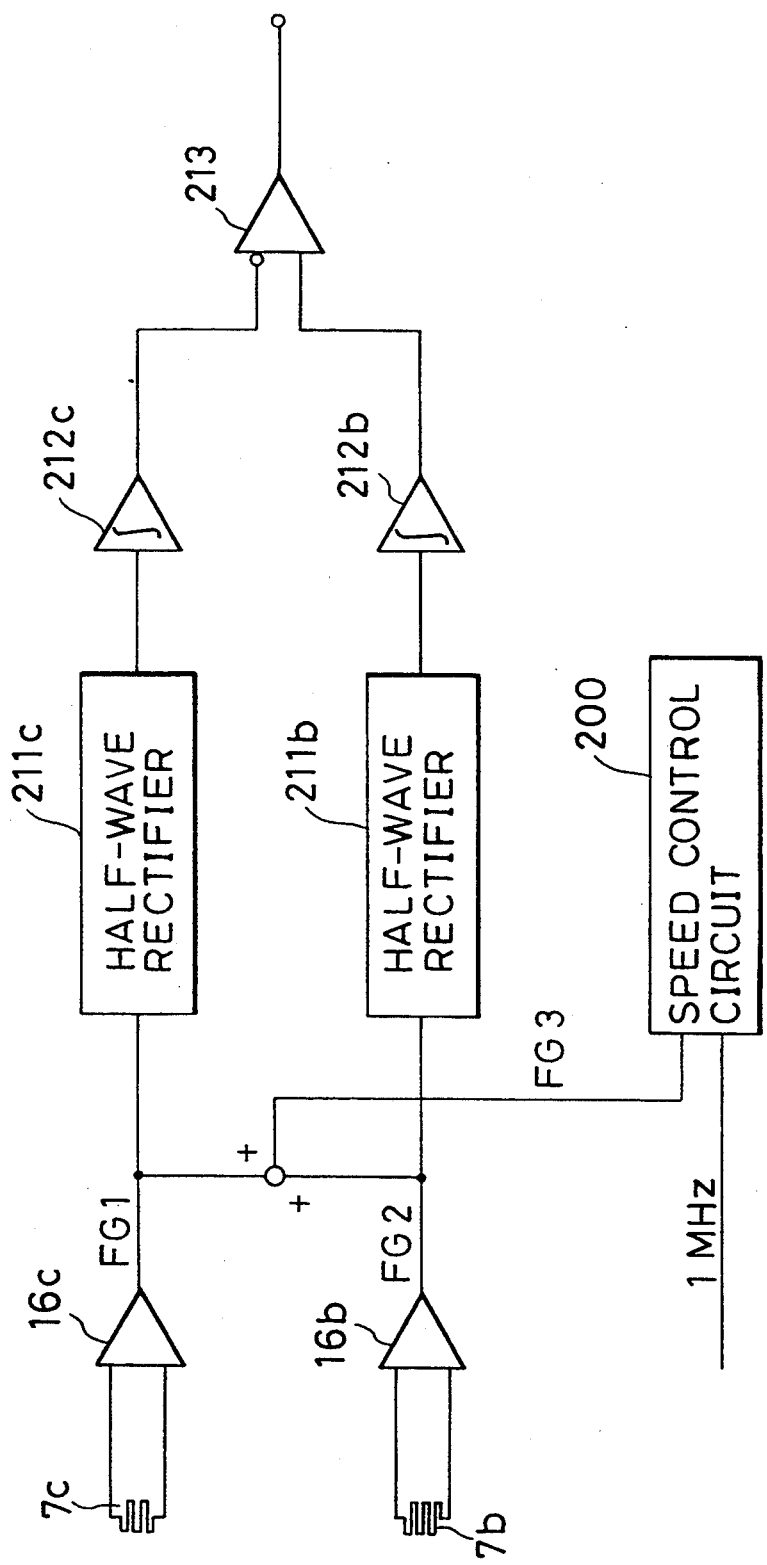
FIG. 81 is a block diagram of an index position detecting circuit 100 in accordance with the sixteenth embodiment.

In FIGS. 78 and 79, changes in the magnetic flux originating from the frequency generating magnet 2, which accompany the rotation of the rotor unit 40, are detected by the generating wires 7b and 7c. The outputs of the wires 7b and 7c are amplified by amplifiers 16b and 16c, and are sent to an index position detecting circuit 100 as the FG1 signal and the FG2 signal, respectively. FIG. 80 is a timing chart illustrating the waveforms of major signals of the index position detecting circuit 100 in accordance with the sixteenth embodiment, and FIG. 81 is a block diagram of the index position detecting circuit 100.

The FG1 signal and FG2 signal as shown at (a) and (b) of FIG. 80 are outputted from the amplifiers 16c and 16b, respectively. As seen from FIGS. 78–80, the signals FG1 and FG2 undergo amplitude modulation, and their phases shift about 180 degrees with respect to each other. Since the AM components of the signals FG1 and FG2 are canceled by addition as shown at (c) in FIG. 80, a signal FG3 obtained by the addition is appropriate for a speed signal, and is inputted to the speed control circuit 200 as shown in FIG. 81. In addition, the signal FG3 is used as the clock signal for detecting the index signal after the signal FG3 is differentiated, and then converted into a binary form by the speed control circuit 200.

The signals FG1 and FG2 are inputted to half-wave rectifiers 211c and 211b, and subsequently, to integral circuits 212c and 212b, respectively. The outputs of the integral circuits 212c and 212b, which are illustrated at (d) and (e) of FIG. 80, are compared by a comparator 213. The comparator 213 outputs an index signal as shown at (f) of FIG. 80.

The speed control circuit 200 generates a speed control signal by comparing a reference clock signal (1 MHz in FIG. 81), and the clock signal obtained from the FG3 signal, and controls the currents to be supplied to driving coils of the motor. Thus, the motor rotates at a fixed speed.

Various modifications of the sixteenth embodiment may be made without departing from the spirit of the present invention.

First, the nonmagnetized portion 168 provided at a section over an angle β on the circumference of the frequency generating magnet 2 will cause local imbalance of the attracting force between the frequency generating magnet 2 and the iron substrate. This may not only reduce the rotational accuracy of the motor, but may also degrade bearings.

Figure 82:
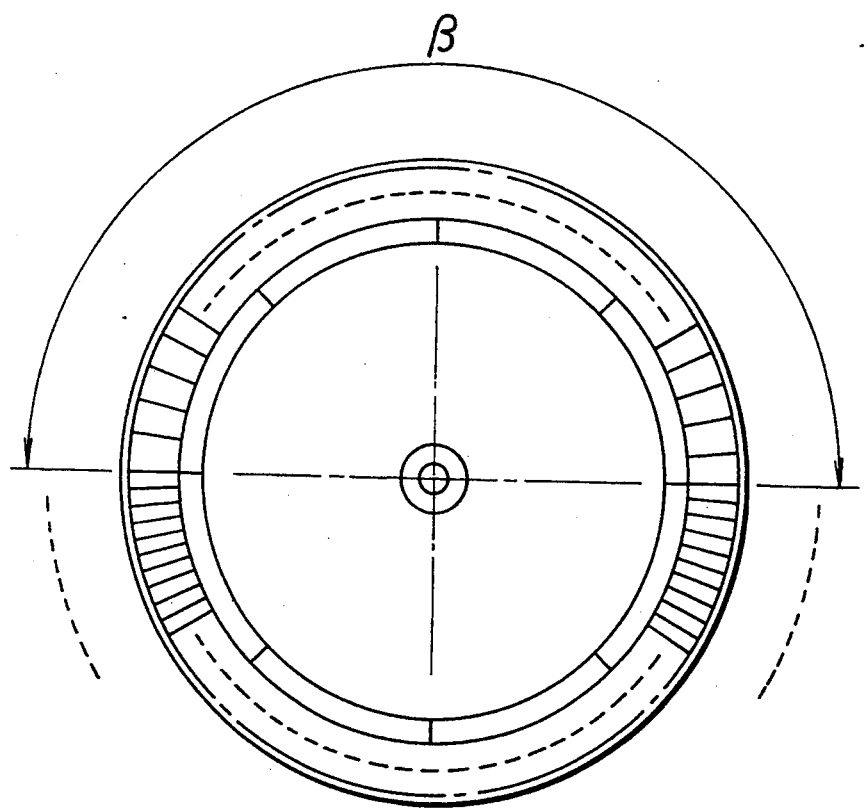
FIG. 82 is a schematic plan view illustrating the magnetized pattern of a frequency generating magnet for eliminating an imbalance of the attracting force in accordance with a variation of the sixteenth embodiment.

FIG. 82 shows a construction for eliminating the imbalance of the attracting force. As illustrated in this figure, the pitch of the magnetized pattern of the section over the angle β is made twice that of the generating wires 7b and 7c. With such an arrangement, since this section does not contribute to the output of the generating wires 7b and 7c, the imbalance of the attracting force can be eliminated without degrading the characteristics of this embodiment. Furthermore, this makes it possible to prevent a reduction in the rotational accuracy and degradation of the bearings.

Another variation will be described.

Figure 83:
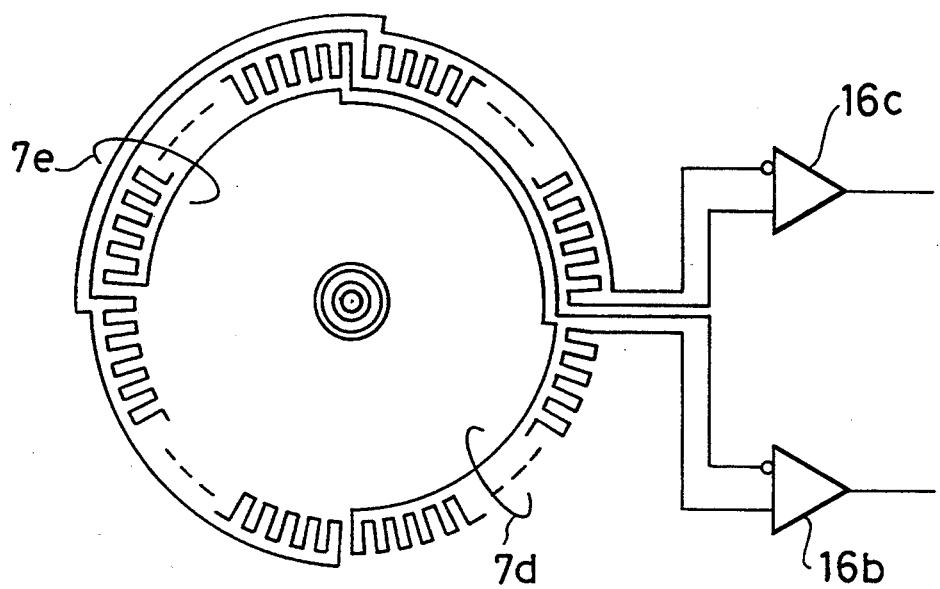
FIG. 83 is a schematic diagram illustrating a generating wire in accordance with another variation of the sixteenth embodiment, wherein the circumference is divided into four equal sections so that four generating wires are formed in respective sections at an identical pitch.
Figure 84:
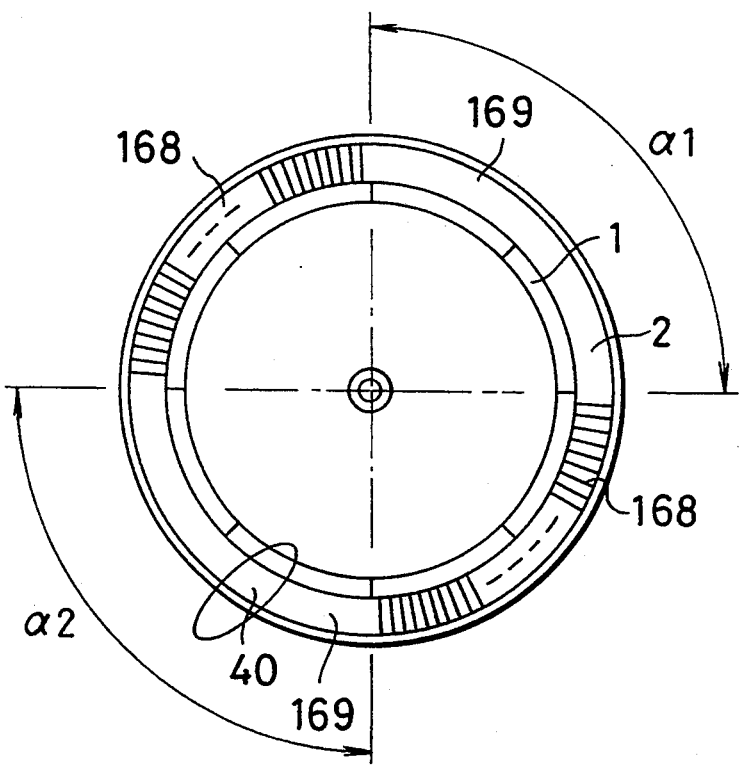
FIG. 84 is a schematic diagram illustrating the magnetized pattern of a frequency generating magnet corresponding to the pattern of a generating wire as shown in FIG. 83.

As shown in FIG. 83, the circumference is divided into four equal sections so that four generating wires are formed in respective sections at an identical pitch. The generating wires that are opposite each other are serially connected to form generating wires 7d and 7e. Likewise, the magnetized patterns of the index magnet 2 are formed by dividing its circumference into four sections, and by magnetizing two opposing sections 168 of the four sections at a pitch identical to that of the generating wires 7d and 7e. With this arrangement, although two nonmagnetized sections 169 remain nonmagnetized, imbalance of the attracting force does not occur. Furthermore, deterioration of the bearing can be obviated.

In FIG. 81, each of the half-wave rectifiers 211b and 211c and the integral circuits 212b and 212c may be replaced with a sample-and-hold circuit.

SEVENTEENTH EMBODIMENT

Figure 85:
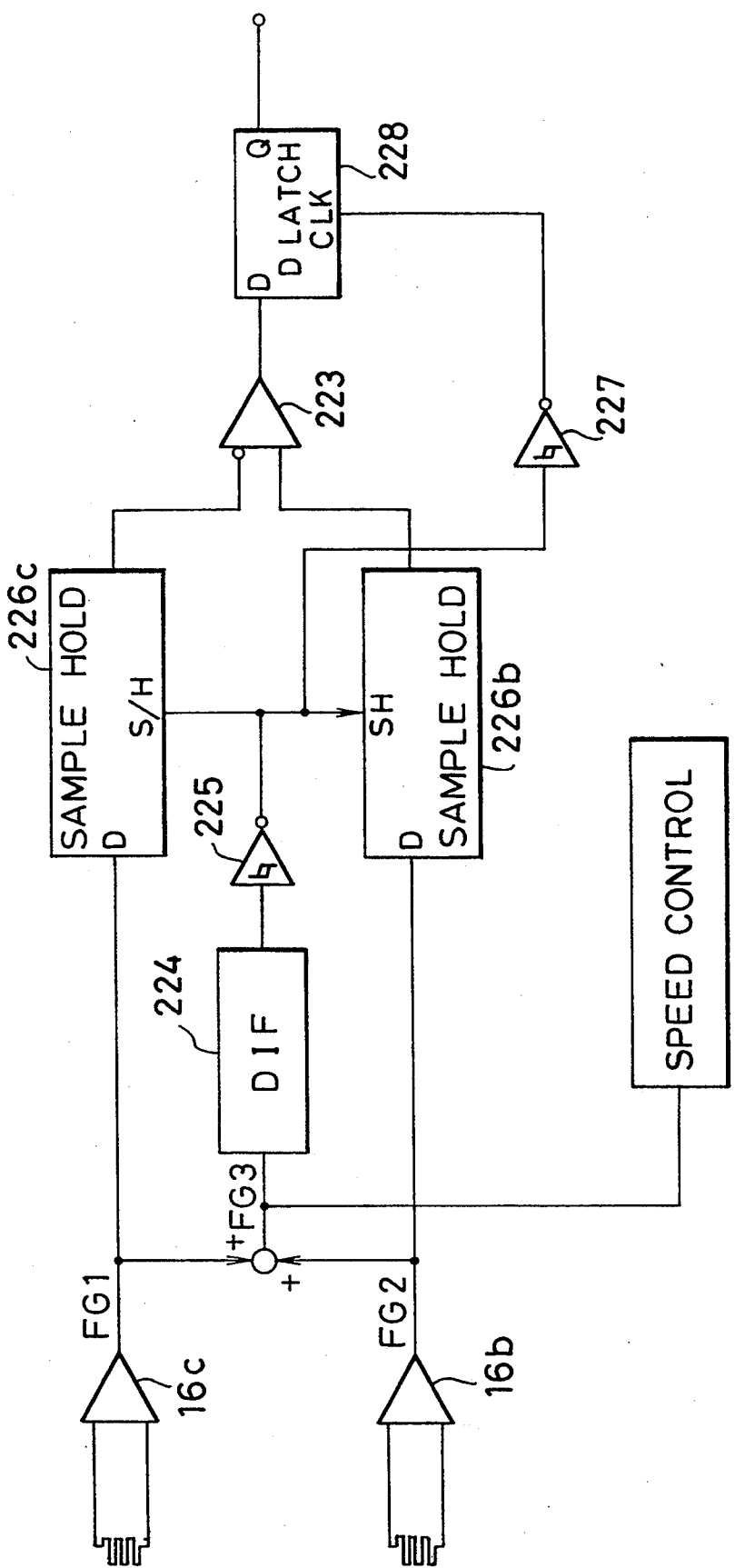
FIG. 85 is a block diagram showing an index position detecting circuit of the seventeenth embodiment of the present invention.

FIG. 85 is a block diagram showing an index position detecting circuit of a seventeenth embodiment of the present invention. The index position detecting circuit employs a sample-and-hold circuit. Frequency generating signals FG2 and FG1 are applied to data input terminals of sample-and-hold circuits 226b and 226c, respectively. A signal FG3 obtained by adding the signals FG1 and FG2 is differentiated by a differentiating circuit 224, and then, inputted to a comparator 225. The output of the comparator 225 is inputted to the sample-and-hold circuits 226b and 226c as a clock signal for the sample-and-hold.

The outputs of the sample-and-hold circuits 226c and 226b have waveforms similar to those illustrated at (d) and (e) of FIG. 80. The values of the outputs of the sample-and-hold circuits 226c and 226b are compared by a comparator 223. The output of the comparator 223 is inputted to the data input terminal of a D latch circuit 228. A clock for of the D latch 228 is supplied from an inverter 227, which generates a clock signal lagging in phase about 180 degrees behind the clock signal for the sample-and-hold circuits.

With such an arrangement, the D latch 228 produces an index signal SI as illustrated at (f) in FIG. 80 from its output terminal Q.

In the sixteenth and seventeenth embodiments and the variations thereof, the AM components of the two frequency generating signals are modulated one cycle per one revolution, with their phase difference being about 180 degrees. By comparing the amplitudes of the AM components of the two signals, an index signal consisting of one pulse per one revolution of the rotor can be obtained.

As a result, the index magnet 13 and the Hall effect sensor 14 which are required in the conventional apparatus become unnecessary. Thus, the size of the motor has shrunk considerably. In addition, the problem of magnetic flux leakage is eliminated because of the removal of the index magnet.

Although specific embodiments of an index position detecting apparatus for an electric rotary machine constructed in accordance with the present invention have been disclosed, it is not intended that the invention be restricted to either the specific configurations or the uses disclosed herein. Modifications may be made in a manner obvious to those skilled in the art. Accordingly, it is intended that the invention be limited only by the scope of the appended claims.

What is claimed is:

1. An electric rotary machine, comprising:
  a stator;
  rotary magnetic field generating means included in said stator for generating a rotary magnetic field;
  a rotor which is mounted for rotary motion with respect to said stator;
  a driving magnet included in said rotor, said driving magnet having multiple magnetized poles that generate rotary torque in conjunction with said rotary magnetic field generating means;
  a first magnetic body included in said rotor so as to generate magnetic flux changes in proportion to the speed of said rotor;
  first pulse generating means for generating a first pulse train, which consists of P1 pulses per one revolution of said rotor, P1 being a natural number, on the basis of magnetic flux changes caused by said driving magnet when said rotor rotates;
  second pulse generating means for generating a second pulse train, which consists of P2 pulses per one revolution of said rotor, P2 being a natural number, on the basis of said magnetic flux changes caused by said first magnetic body, P1 and P2 having a greatest common divisor which is set at a natural number m; and
  index position detecting means for detecting an index position of said rotor in accordance with a phase difference between said first and second pulse trains,
  wherein said first pulse generating means includes driving magnet rotation detecting means for detecting rotation of said driving magnet by either detecting the magnetic flux changes caused by said driving magnet when said rotor rotates, or by detecting counterelectromotive voltage induced in said rotary magnetic field generating means by said driving magnet,
  wherein said second pulse generating means includes speed detecting means for detecting magnetic flux changes of said first magnetic body,
  wherein m=1, and P2>P1, and
  wherein $P2 = P1 \times (n+0.5) \pm 1$, where n is an integer.

2. An electric rotary machine, comprising:
  a stator;
  rotary magnetic field generating means included in said stator for generating a rotary magnetic field;

a rotor which is mounted for rotary motion with respect to said stator;

a driving magnet included in said rotor, said driving magnet having multiple magnetized poles that generate rotary torque in conjunction with said rotary magnetic field generating means;

a first magnetic body included in said rotor so as to generate magnetic flux changes in proportion to the speed of said rotor;

first pulse generating means for generating a first pulse train, which consists of P1 pulses per one revolution of said rotor, P1 being a natural number, on the basis of magnetic flux changes caused by said driving magnet when said rotor rotates;

second pulse generating means for generating a second pulse train, which consists of P2 pulses per one revolution of said rotor, P2 being a natural number, on the basis of said magnetic flux changes caused by said first magnetic body, P1 and P2 having a greatest common divisor which is set at a natural number m; and index position detecting means for detecting an index position of said rotor in accordance with a phase difference between said first and second pulse trains, wherein said first pulse generating means includes driving magnet rotation detecting means for detecting rotation of said driving magnet by either detecting the magnetic flux changes caused by said driving magnet when said rotor rotates, or by detecting counterelectromotive voltage induced in said rotary magnetic field generating means by said driving magnet, wherein said second pulse generating means includes speed detecting means for detecting magnetic flux changes of said first magnetic body, and wherein said index position detecting means includes a first circuit and a second circuit, said first circuit detecting a relationship of phases of said first and said second pulse trains, said second circuit generating an index signal indicating said index position when the relationship of phases of said first and second pulse trains is inverted twice.

3. An electric rotary machine as claimed in claim 2, wherein said index position detecting means comprises a D latch which accepts said first pulse train as a clock signal input and said second pulse train as a data input.

4. An electric rotary machine as claimed in claim 2, wherein said index position detecting means comprises a D latch which accepts said first pulse train as a clock signal input and said second pulse train as a data input, a 1-bit shift register accepting an output of said D latch as a data input, and a logic gate performing a logical AND operation or a logical OR operation between the output of said D latch and an output of said 1-bit shift register, and outputting the result of the logical operation as the index signal.

5. An electric rotary machine as claimed in claim 3, wherein the phase of said first pulse train inputted to said D latch as the clock signal is separated by at least 360/2P1 degrees with regard to a rising or falling edge of the data input to said D latch, where the data input has a period that is assumed to be 360 degrees.

6. An electric rotary machine as, comprising:
a stator;
rotary magnetic field generating means included in said stator for generating a rotary magnetic field;

a rotor which is mounted for rotary motion with respect to said stator;

a driving magnet included in said rotor, said driving magnet having multiple magnetized poles that generate rotary torque in conjunction with said rotary magnetic field generating means;

a first magnetic body included in said rotor so as to generate magnetic flux changes in proportion to the speed of said rotor;

first pulse generating means for generating a first pulse train, which consists of P1 pulses per one revolution of said rotor, P1 being a natural number, on the basis of magnetic flux changes caused by said driving magnet when said rotor rotates;

second pulse generating means for generating a second pulse train, which consists of P2 pulses per one revolution of said rotor, P2 being a natural number, on the basis of said magnetic flux changes caused by said first magnetic body, P1 and P2 having a greatest common divisor which is set at a natural number m; and index position detecting means for detecting an index position of said rotor in accordance with a phase difference between said first and second pulse trains, wherein said first pulse generating means includes driving magnet rotation detecting means for detecting rotation of said driving magnet by either detecting the magnetic flux changes caused by said driving magnet when said rotor rotates, or by detecting counterelectromotive voltage induced in said rotary magnetic field generating means by said driving magnet, wherein said second pulse generating means includes speed detecting means for detecting magnetic flux changes of said first magnetic body, wherein said first pulse generating means further includes a first comparator converting an output of said driving magnet rotation detecting means into a binary form, wherein said second pulse generating means further includes a second comparator converting an output of said speed detecting means into a binary form, wherein said index position detecting means includes a D latch accepting the output of said first comparator as a clock signal input and the output of said second comparator as a data input, and wherein said greatest common divisor m=1 and P1<P2.

7. An electric rotary machine as claimed in claim 6, further comprising a 1-bit shift register accepting the clock signal input to said D latch as a clock signal input, and a logic gate performing a logical AND operation or a logical OR operation between the output of said D latch and an output of said 1-bit shift register, and outputting the result of the logical operation as the index signal.

8. An electric rotary machine as claimed in claim 6, wherein said driving magnetic rotation detecting means is one of a plurality of detecting means for detecting timings for driving coils of respective phases constituting said rotary magnetic field generating means, and the signal inputted to said second comparator is a signal for detecting the speed of said driving magnet.

9. An electric rotary machine as claimed in claim 6, wherein the phase of said first pulse train inputted to said D latch as the clock signal is separated by at least 360/2P1 degrees with regard to a rising or falling edge of the data input to said D latch, where the data input has a period which is assumed to be 360 degrees.

10. An electric rotary machine comprising:
   a stator;
   rotary magnetic field generating means included in said stator for generating a rotary magnetic field;
   a rotor which is mounted for rotary motion with respect to said stator;
   a driving magnet included in said rotor, said driving magnet having multiple magnetized poles that generate rotary torque in conjunction with said rotary magnetic field generating means;
   a first magnetic body included in said rotor so as to generate magnetic flux changes in proportion to the speed of said rotor;
   first pulse generating means for generating a first pulse train, which consists of P1 pulses per one revolution of said rotor, P1 being a natural number, on the basis of magnetic flux changes caused by said driving magnet when said rotor rotates;
   second pulse generating means for generating a second pulse train, which consists of P2 pulses per one revolution of said rotor, P2 being a natural number, on the basis of said magnetic flux changes caused by said first magnetic body, P1 and P2 having a greatest common divisor which is set at a natural number m;
   index position detecting means for detecting an index position of said rotor in accordance with a phase difference between said first and second pulse trains; and
   an automatic adjusting circuit before said index position detecting means, said automatic adjusting circuit automatically adjusting the phase difference between said first and second pulse trains at a value greater than a predetermined value,
   wherein said first pulse generating means includes driving magnet rotation detecting means for detecting rotation of said driving magnet by either detecting the magnetic flux changes caused by said driving magnet when said rotor rotates, or by detecting counterelectromotive voltage induced in said rotary magnetic field generating means by said driving magnet, and
   wherein said second pulse generating means includes speed detecting means for detecting magnetic flux changes of said first magnetic body.

11. An electric rotary machine as claimed in claim 10, wherein said automatic adjusting circuit comprises a first phase difference detecting circuit detecting a minimum value of phase differences from edges of pulses of said second pulse train to edges of pulses of said first pulse train during one revolution, a second phase difference detecting circuit detecting a minimum value of phase differences from edges of pulses of said first pulse train to edges of pulses of said second pulse train during one revolution, and a feedback circuit adding to or subtracting from a threshold level of a comparator, which outputs said first or second pulse train, the difference between outputs of said first and second phase difference detecting circuits.

12. An electric rotary machine as claimed in claim 11, wherein said first phase difference detecting means comprises a first triangular-wave oscillating circuit which is set by edges of pulses of said second pulse train, a first sample-and-hold circuit which samples and holds an output of the first triangular-wave oscillating circuit and which is reset by edges of pulses of said first pulse train, a first minimum value detecting means for detecting a minimum value of values sequentially held in said first sample-and-hold circuit during one revolution of said rotor, said first minimum value detecting means including second and third sample-and-hold circuits, a counter, and a comparator, and wherein said second phase difference detecting means comprises a second triangular-wave oscillating circuit which is set by edges of pulses of said first pulse train, a fourth sample-and-hold circuit which samples and holds an output of the second triangular-wave oscillating circuit and which is reset by edges of pulses of said second pulse train, a second minimum value detecting means for detecting a minimum value of values sequentially held in said fourth sample-and-hold circuit during one revolution of said rotor, said minimum value detecting means including fifth and sixth sample-and-hold circuits, a counter, and a comparator.

13. An electric rotary machine as claimed in claim 11, wherein said first phase difference detecting means comprises a first counter circuit which is set by edges of pulses of said second pulse train, a first latch circuit latching an output of said first counter circuit by edges of pulses of said first pulse train, a first minimum value detecting means for detecting a minimum value of values sequentially latched in said first latch circuit during one revolution of said rotor, said minimum value detecting means including second and third latch circuits and a first multiplexer, and wherein said second phase difference detecting means comprises a second counter circuit which is set by edges of pulses of said first pulse train, a fourth latch circuit latching an output of said second counter circuit by edges of pulses of said second pulse train, a second minimum value detecting means for detecting a minimum value of values sequentially latched in said fourth latch circuit during one revolution of said rotor, said second minimum value detecting means including fifth and sixth latch circuits and a second multiplexer.

14. An electric rotary machine, comprising:
   a stator;
   rotary magnetic field generating means included in said stator for generating a rotary magnetic field;
   a rotor which is mounted for rotary motion with respect to said stator;
   a driving magnet included in said rotor, said driving magnet having multiple magnetized poles that generate rotary torque in conjunction with said rotary magnetic field generating means;
   a first magnetic body included in said rotor so as to generate magnetic flux changes in proportion to the speed of said rotor;
   a second magnetic body included in said rotor so as to generate magnetic flux changes in proportion to the speed of said rotor;
   first pulse generating means for generating a first pulse train, which consists of P1 pulses per one revolution of said rotor, P1 being a natural number, on the basis of magnetic flux changes caused by said first magnetic body when said rotor rotates;
   second pulse generating means for generating a second pulse train, which consists of P2 pulses per one revolution of said rotor, P2 being a natural number, on the basis of said magnetic flux changes caused by said second magnetic body when said rotor rotates, P1 and P2 having a greatest common divisor which is set at a natural number m; and index position detecting means for detecting an index position of said rotor in accordance with a phase difference between said first and second pulse trains, wherein m=1, and P2>P1, and wherein P2=P1×(n+0.5)±1, where n is an integer.

15. An electric rotary machine, comprising:

a stator;

rotary magnetic field generating means included in said stator for generating a rotary magnetic field;

a rotor which is mounted for rotary movement with respect to said stator;

a driving magnet included in said rotor, said driving magnet having multiple magnetized poles that generate rotary torque in conjunction with said rotary magnetic field generating means;

a first magnetic body included in said rotor so as to generate magnetic flux changes in proportion to the speed of said rotor;

a second magnetic body included in said rotor so as to generate magnetic flux changes in proportion to the speed of said rotor;

first pulse generating means for generating a first pulse train, which consists of P1 pulses per one revolution of said rotor, P1 being a natural number, on the basis of magnetic flux changes caused by said driving magnet when said rotor rotates;

second pulse generating means for generating a second pulse train, which consists of P2 pulses per one revolution of said rotor, P2 being a natural number, on the basis of said magnetic flux changes caused by said second magnetic body when said rotor rotates, P1 and P2 having a greatest common divisor which is set at a natural number m; and index position detecting means for detecting an index position of said rotor in accordance with a phase difference between said first and second pulse trains, wherein said index position detecting means includes a first circuit and a second circuit, said first circuit detecting a relationship of phases of said first and said second pulse trains, said second circuit generating an index signal indicating said index position when the relationship of phases of said first and second pulse trains is inverted twice.

16. An electric rotary machine as claimed in claim 15, wherein said index position detecting means comprises a D latch which accepts said first pulse train as a clock signal input and said second pulse train as a data input.

17. An electric rotary machine as claimed in claim 15, wherein said index position detecting means comprises a D latch which accepts said first pulse train as a clock signal input and said second pulse train as a data input, a 1-bit shift register accepting an output of said D latch as a data input, and a logic gate performing a logical AND operation or a logical OR operation between the output of said D latch and an output of said 1-bit shift register, and outputting the result of the logical operation as the index signal.

18. An electric rotary machine as claimed in claim 16, wherein the phase of said first pulse train inputted to said D latch as the clock signal is separated by at least 360/2P1 degrees with regard to a rising or falling edge of the data input to said D latch, where the data input has a period that is assumed to be 360 degrees.

19. An electric rotary machine, comprising:

a stator;

rotary magnetic field generating means included in said stator for generating a rotary magnetic field;

a rotor which is mounted for rotary movement with respect to said stator;

a driving magnet included in said rotor, said driving magnet having multiple magnetized poles that generate rotary torque in conjunction with said rotary magnetic field generating means;

a first magnetic body included in said rotor so as to generate magnetic flux changes in proportion to the speed of said rotor;

a second magnetic body included in said rotor so as to generate magnetic flux changes in proportion to the speed of said rotor;

first pulse generating means for generating a first pulse train, which consists of P1 pulses per one revolution of said rotor, P1 being a natural number, on the basis of magnetic flux changes caused by said driving magnet when said rotor rotates;

second pulse generating means for generating a second pulse train, which consists of P2 pulses per one revolution of said rotor, P2 being a natural number, on the basis of said magnetic flux changes caused by said second magnetic body when said rotor rotates, P1 and P2 having a greatest common divisor which is set at a natural number m; and index position detecting means for detecting an index position of said rotor in accordance with a phase difference between said first and second pulse trains, wherein said index position detecting means includes an adder adding said first and second pulse trains, and an AM component pickup circuit picking up an AM component of an amplitude modulated signal outputted from said adder, said AM modulated signal being caused by phase differences between changes of magnetic flux of said first and second magnetic bodies.

20. An electric rotary machine as claimed in claim 19, wherein said AM component pickup circuit comprises:

a half-wave rectifying circuit for performing half-wave rectification of the output of said adder;

a peak hold circuit detecting a peak of the output from said half-wave rectifying circuit;

a sample-and-hold circuit accepting said first or second frequency generating signal as a clock signal input, and accepting the output of said peak hold circuit as a data input;

a 1-bit data delay circuit accepting said first or second frequency generating signal as a clock signal input, and accepting the output of said peak hold circuit as a data input;

a subtracter circuit accepting the output of said 1-bit data delaying circuit and the output of said sample-and-hold circuit as inputs; and means for converting the output of said subtracter circuit into a binary form.

21. An electric rotary machine as claimed in claim 20, wherein said peak hold circuit comprises a low-pass filter.

22. An electric rotary machine, comprising:

a stator;

rotary magnetic field generating means included in said stator for generating a rotary magnetic field;

a rotor which is mounted for rotary movement with respect to said stator;

a driving magnet included in said rotor, said driving magnet having multiple magnetized poles that generate rotary torque in conjunction with said rotary magnetic field generating means;

a first magnetic body included in said rotor so as to generate magnetic flux changes in proportion to the speed of said rotor;

a second magnetic body included in said rotor so as to generate magnetic flux changes in proportion to the speed of said rotor;

first pulse generating means for generating a first pulse train, which consists of P1 pulses per one revolution of said rotor, P1 being a natural number, on the basis of magnetic flux changes caused by said driving magnet when said rotor rotates;

second pulse generating means for generating a second pulse train, which consists of P2 pulses per one revolution of said rotor, P2 being a natural number, on the basis of said magnetic flux changes caused by said first magnetic body when said rotor rotates, P1 and P2 having a greatest common divisor which is set at a natural number m; and index position detecting means for detecting an index position of said rotor in accordance with a phase difference between said first and second pulse trains, wherein said first and second magnetic bodies are flat ring-like magnets disposed on an outer wall of said rotor, each of said first and second magnetic bodies including a magnetized pattern of alternate N and S poles formed along the circumference of said rotor, and wherein said first pulse generating means includes a first pattern repeated at an interval identical to that of said first magnetic body, and said second pulse generating means includes a second pattern repeated at an interval identical to that of said second magnetic body.

23. An electric rotary machine as claimed in claim 22, wherein each of said first and second patterns comprises a sequence of connected U-shaped elements disposed along a path which is adjacent the periphery of said rotor for nearly the entire circumference of said rotor, and a wire element adjacent the sequence of U-shaped elements and forming a closed circuit with the sequence of U-shaped elements.

24. An electric rotary machine, comprising:
a stator;
rotary magnetic field generating means disposed on said stator for generating a rotary magnetic field, said rotary magnetic field generating means having a round shape and generating said rotary magnetic field by a plurality of exciting currents supplied to respective phases;
a rotor which is mounted for rotary movement with respect to said stator;
a driving magnet included in said rotor, said driving magnet having multiple magnetized poles that generate rotary torque in conjunction with said rotary magnetic field; and
detecting means for detecting magnetic flux changes caused by said driving magnet when said rotor rotates, said detecting means including wire elements etched on said stator, said wire elements outputting signals whose phases are separated by 360/n degrees from each other, where the output signals of said wire elements have a period which is assumed to be 360 degrees, and the number of phases of said rotary magnetic field generating means is assumed to be n.

25. An electric rotary machine as claimed in claim 24, wherein said wire elements are U-shaped and are disposed so that they lag 90 degrees behind transitions of said driving magnet.

26. An electric rotary machine including a rotor and a stator, comprising:
a first electromagnetic coupling means disposed on said rotor;
a second electromagnetic coupling means disposed on said stator, and making an electromagnetic coupling with said first electromagnetic coupling means;
means for providing a change to an output signal of at least one of said first and second electromagnetic coupling means when said rotor rotates, said change being one cycle per one revolution of said rotor, and being caused by changes of magnetic flux between said first and second electromagnetic coupling means; and
index position detecting means for generating an index signal of said rotor on the basis of said output signal,
wherein the change to said output signal is a change in an amplitude component of said output signal,
wherein said first electromagnetic coupling means includes a frequency generating magnet which is disposed on said rotor, and which has multiple magnetized poles,
wherein said magnetized poles of said frequency generating magnet have an intensity which is amplitude modulated, and
wherein said second electromagnetic coupling means includes a generating wire disposed opposite said frequency generating magnet.

27. An electric rotary machine including a rotor and a stator, comprising:
a first electromagnetic coupling means disposed on said rotor;
a second electromagnetic coupling means disposed on said stator, and making an electromagnetic coupling with said first electromagnetic coupling means;
means for providing a change to an output signal of at least one of said first and second electromagnetic coupling means when said rotor rotates, said change being one cycle per one revolution of said rotor, and being caused by changes of magnetic flux between said first and second electromagnetic coupling means; and
index position detecting means for generating an index signal of said rotor on the basis of said output signal,
wherein the change to said output signal is a change in an amplitude component of said output signal,
wherein said first electromagnetic coupling means includes a frequency generating magnet which is disposed on said rotor, and which has multiple magnetized poles,
wherein said second electromagnetic coupling means includes a generating wire disposed opposite said frequency generating magnet,
wherein said generating wire is disposed in a first plane, and
wherein said frequency generating magnet has a surface which faces said generating wire and which is disposed in a second plane that slopes with respect to the first plane.

28. An electric rotary machine including a rotor and a stator, comprising:
   a first electromagnetic coupling means disposed on said rotor, said first electromagnetic coupling means including a frequency generating magnet which is disposed on said rotor and which has multiple magnetized poles;
   a second electromagnetic coupling means disposed on said stator, and making an electromagnetic coupling with said first electromagnetic coupling means, said second electromagnetic coupling means including a generating wire disposed opposite said frequency generating magnet;
   means for providing a change in an amplitude component of an output signal of at least one of said first and second electromagnetic coupling means when said rotor rotates, said change being one cycle per one revolution of said rotor, and being caused by changes of magnetic flux between said first and second electromagnetic coupling means; and
   index position detecting means for generating an index signal of said rotor on the basis of said output signal, said index position detecting means including
      a half-wave rectifying circuit for performing half-wave rectification of the output of said generating wire,
      a peak hold circuit detecting a peak of the output of said half-wave rectifying circuit,
      a sample-and-hold circuit accepting the output of said peak hold circuit as a data input,
      a 1-bit data delay circuit accepting the output of said sample-and-hold circuit as a data input,
      a subtracter circuit accepting the output of said 1-bit data delaying circuit and the output of said sample-and-hold circuit, and
      means for converting the output of said subtracter circuit into a binary form.

29. An electric rotary machine including a rotor and a stator, comprising:
   a first electromagnetic coupling means disposed on said rotor;
   a second electromagnetic coupling means disposed on said stator, and making an electromagnetic coupling with said first electromagnetic coupling means;
   means for providing a change to an output signal of at least one of said first and second electromagnetic coupling means when said rotor rotates, said change being one cycle per one revolution of said rotor, and being caused by changes of magnetic flux between said first and second electromagnetic coupling means; and
   index position detecting means for generating an index signal of said rotor on the basis of said output signal,
   wherein the change to said output signal is a change in an amplitude component of said output signal,
   wherein said first electromagnetic coupling means includes a frequency generating magnet which is disposed on said rotor, and which has multiple magnetized poles,
   wherein said second electromagnetic coupling means includes generating wires disposed opposite said frequency generating magnet, and
   wherein said generating wires include a first generating wire disposed on at least two portions of a circular region opposite said frequency generating magnet, said portions being centrosymmetric with respect to the center of said frequency generating magnet, and a second generating wire disposed on a portion of the circular region opposite said frequency generating magnet.

30. An electric rotary machine including a rotor and a stator, comprising:
   a first electromagnetic coupling means disposed on said rotor;
   a second electromagnetic coupling means disposed on said stator, and making an electromagnetic coupling with said first electromagnetic coupling means;
   means for providing a change to an output signal of at least one of said first and second electromagnetic coupling means when said rotor rotates, said change being one cycle per one revolution of said rotor, and being caused by changes of magnetic flux between said first and second electromagnetic coupling means; and
   index position detecting means for generating an index signal of said rotor on the basis of said output signal,
   wherein the change to said output signal is a change in an amplitude component of said output signal,
   wherein said first electromagnetic coupling means includes a frequency generating magnet which is disposed on said rotor, and which has multiple magnetized poles,
   wherein said second electromagnetic coupling means includes generating wires disposed opposite said frequency generating magnet,
   wherein said generating wires include a first generating wire disposed almost entirely around a circular region opposite said frequency generating magnet, and a second generating wire disposed on a portion of the circular region opposite said frequency generating magnet.

31. An electric rotary machine including a rotor and a stator, comprising:
   a first electromagnetic coupling means disposed on said rotor;
   a second electromagnetic coupling means disposed on said stator, and making an electromagnetic coupling with said first electromagnetic coupling means;
   means for providing a change to an output signal of at least one of said first and second electromagnetic coupling means when said rotor rotates, said change being one cycle per one revolution of said rotor, and being caused by changes of magnetic flux between said first and second electromagnetic coupling means; and
   index position detecting means for generating an index signal of said rotor on the basis of said output signal,
   wherein the change to said output signal is a change in an offset component of said output signal.

32. An electric rotary machine as claimed in claim 31, wherein said first electromagnetic coupling means includes a frequency generating magnet which is disposed on said rotor, and has multiple magnetized poles, and wherein said second electromagnetic coupling means includes a generating wire disposed opposite said frequency generating magnet.

33. An electric rotary machine as claimed in claim 32, wherein said offset component is acquired through a low-pass filter.

34. An electric rotary machine as claimed in claim 32, wherein said frequency generating magnet has uniform magnetization intensity throughout the entire length of a magnetized pattern thereof, the magnetized pattern including an offset intensity change one cycle per one revolution of said rotor, and wherein said generating wire is disposed on a portion of a circular region opposite the magnetized pattern of said frequency generating magnet.

35. An electric rotary machine as claimed in claim 32, wherein said generating wire is a first generating wire which is disposed on at least two portions of a circular region opposite said frequency generating magnet, said portions being centrosymmetric with respect to the center of said frequency generating magnet, and wherein said second electromagnetic coupling means further includes a second generating wire disposed on a portion of the circular region opposite said frequency generating magnet.

36. An electric rotary machine as claimed in claim 32, wherein said generating wire is a first generating wire which is disposed almost entirely around a circular region opposite said frequency generating magnet, and wherein said second electromagnetic coupling means further includes a second generating wire disposed on a portion of the circular region opposite said frequency generating magnet.

37. An electric rotary machine including a rotor and a stator, comprising:
- a first electromagnetic coupling means disposed on said rotor;
- a second electromagnetic coupling means disposed on said stator, and making an electromagnetic coupling with said first electromagnetic coupling means;
- means for providing a change to an output signal of at least one of said first and second electromagnetic coupling means when said rotor rotates, said change being one cycle per one revolution of said rotor, and being caused by changes of magnetic flux between said first and second electromagnetic coupling means; and
- index position detecting means for generating an index signal of said rotor on the basis of said output signal,
- wherein the change to said output signal is a change in a frequency component of said output signal.

38. An electric rotary machine as claimed in claim 37, wherein said first electromagnetic coupling means includes a frequency generating magnet which is disposed on said rotor, and has multiple magnetized poles, and wherein said second electromagnetic coupling means includes a generating wire disposed opposite said frequency generating magnet.

39. An electric rotary machine as claimed in claim 38, wherein said frequency generating magnet includes a circular magnetized pattern having a transition pitch which gradually increases and then gradually decreases along the magnetized pattern, wherein said generating wire is a first generating wire, and wherein said second electromagnetic coupling means further includes a second generating wire opposite said frequency generating magnet, said first and second generating wires including elements provided at an identical pitch, said first and second generating wires being centrosymmetric with respect to the center of said frequency generating magnet.

40. An electric rotary machine as claimed in claim 38, wherein said index position detecting means comprises a phase comparating circuit comparating the phase of a first pulse train outputted from said first generating wire and the phase of a second pulse train outputted from said second generating wire, and a converting circuit for converting the output of said phase comparing circuit into a binary form.

41. An electric rotary machine as claimed in claim 40, wherein said phase comparing circuit accepts said first pulse train as a clock signal input and said second pulse train as a data input.

42. An electric rotary machine as claimed in claim 38, wherein said frequency generating magnet has a magnetized pattern with a pitch which is modulated one cycle per one revolution of said rotor, and wherein said second electromagnetic coupling means comprises at least two generating wires which include elements formed at an identical pitch and which are disposed on at least two portions of a circular region opposite said frequency generating magnet, said portions being centrosymmetric with respect to the center of said frequency generating magnet.

43. An electric rotary machine as claimed in claim 42, wherein said at least two generating wires include a first generating wire which is disposed almost entirely around the circular region opposite said frequency generating magnet, and a second generating wire disposed on a portion of the circular region opposite said frequency generating magnet.

44. An electric rotary machine including a stator and a rotor having a circumference, comprising:
- a first electromagnetic coupling means disposed on said rotor;
- a second electromagnetic coupling means disposed on said stator, and making an electromagnetic coupling with said first electromagnetic coupling means;
- means for providing a change to an output signal of at least one of said first and second electromagnetic coupling means when said rotor rotates, said change being one cycle per one revolution of said rotor, and being caused by changes of magnetic flux between said first and second electromagnetic coupling means; and
- index position detecting means for generating an index signal of said rotor on the basis of said output signal,
- wherein the change to said output signal is a change in an amplitude component of said output signal,
- wherein said first electromagnetic coupling means includes a frequency generating magnet which is disposed on a portion of the periphery of said rotor, and which has multiple magnetized poles,
- wherein said second electromagnetic coupling means includes a comb-like generating wire disposed on said stator opposite said frequency generating magnet, and
- wherein said generating wire is divided into a first section and a second section, the first section generating a first frequency generating signal, and the second generating a second frequency generating signal having an opposite phase to that of the first frequency generating signal.

45. An electric rotary machine as claimed in claim 44, further comprising an adder adding said first and second frequency generating signals to produce a third frequency generating signal.

46. An electric rotary machine as claimed in claim 1, wherein said frequency generating magnet has M poles in opposition to said generating wire, M being a natural number, wherein said first section of said generating wire includes N1 elements, wherein said second section of said generating wire includes N2 elements, wherein said first and second sections produce pulse trains, each of which consists of P/2 pulses per one revolution of said rotor, and wherein $M<P$, $N1 \leq P$, and $N2 \leq P-N1$.

47. An electric rotary machine as claimed in claim 44, wherein said index position detecting means comprises a first amplitude detecting means for detecting the amplitude of an AM component of said first frequency generating signal, a second amplitude detecting means for detecting the amplitude of an AM component of said second frequency generating signal, and a comparating means for comparing the amplitudes of said first and second frequency generating signals to produce said index signal.

48. An electric rotary machine as claimed in claim 47, wherein each of said first and second amplitude detecting means comprises a half-wave rectifying circuit and an integrating circuit.

49. An electric rotary machine as claimed in claim 42, wherein said index position detecting means further comprises an adder adding said first frequency generating signal and said second frequency generating signal, and a differentiating circuit differentiating the output of said adder, and wherein each of said first and second amplitude detecting means comprises a sample-and-hold circuit which operates at a timing determined by the output of said differentiating circuit.

50. An electric rotary machine including a stator and a rotor having a periphery, comprising:
a first electromagnetic coupling means, said first electromagnetic coupling means including a frequency generating magnet which is disposed intermittently on the periphery of said rotor, and which has multiple magnetized poles;
a second electromagnetic coupling means making an electromagnetic coupling with said first electromagnetic coupling means, said second electromagnetic coupling means including a comb-like generating wire disposed on said stator opposite said frequency generating magnet;
means for providing a change to an amplitude component of an output signal of at least one of said first and second electromagnetic coupling means when said rotor rotates, said change being one cycle per one revolution of said rotor, and being caused by changes of magnetic flux between said first and second electromagnetic coupling means;
index position detecting means for generating an index signal of said rotor on the basis of said output signal;
first frequency detecting means for detecting, on the basis of a counterelectromotive voltage induced over the entire length of said generating wire, a first frequency generating signal which is lightly amplitude modulated one cycle per one revolution of said rotor; and
second frequency detecting means for detecting a second frequency generating signal which falls to a minimum value once per one revolution of said rotor on the basis of a counterelectromotive voltage which is induced in a part of said generating wire by said frequency generating magnet and falls to a minimum value once per one revolution of said rotor,
wherein said index position detecting means generates said index signal of said rotor by detecting a change in the second frequency generating signal produced from said second frequency detecting means.

51. An electric rotary machine as claimed in claim 50, wherein said frequency generating magnet has M poles opposite said generating wire, M being a natural number, wherein said entire length of said generating wire includes N1 elements, wherein said part of said generating wire includes N2 elements, wherein said entire length of said generating wire and said part of said generating wire produce respective pulse trains, each of which consists of P/2 pulses per one revolution of said rotor, and wherein $M<P$, $N1 \leq P$, and $N2 \leq P-M$.

52. An electric rotary machine as claimed in claim 50, wherein said index position detecting means detects changes in the amplitude of said second frequency generating signal to obtain minimum values of the amplitude, and generates said index signal in response to pulses of a clock signal which is formed from said first frequency generating signal, said pulses rising or falling immediately after said minimum values.

53. An electric rotary machine as claimed in claim 52, wherein said index position detecting means comprises a differentiating circuit differentiating said first frequency generating signal, and a first comparator comparing the output of said differentiating circuit with a predetermined reference voltage.

54. An electric rotary machine as claimed in claim 52, wherein said index position detecting means comprises:
a first sample-and-hold circuit which samples and holds said second frequency generating signal at rising edges of pulses of said clock signal;
a second sample-and-hold circuit which samples and holds the output of said first sample-and-hold circuit at falling edges of pulses of said clock signal;
a second comparator comparing the outputs of said first and second sample-and-hold circuits; and
a latch circuit accepting the output of said second comparator as a data input so that the data input is latched at a timing from the rising edge to the falling edge of pulses of said clock signal.

55. An electric rotary machine as claimed in claim 54, wherein said latch circuit is enabled while the speed of revolution of said rotor enters within a predetermined range with regard to a reference speed.

56. An electric rotary machine as claimed in claim 52, wherein said index position detecting means comprises:
a first sample-and-hold circuit which samples and holds said second frequency generating signal at falling edges of pulses of said clock signal;
a second sample-and-hold circuit which samples and holds the output of said first sample-and-hold circuit at rising edges of pulses of said clock;
a second comparator comparing the outputs of said first and second sample-and-hold circuits; and
a latch circuit accepting the output of said second comparator as a data input so that the data input is latched at a timing from the falling edge to the rising edge of pulses of said clock signal.

57. An electric rotary machine as claimed in claim 56, wherein said second comparator is disabled between a timing while said first and second sample-and-hold circuits are sampling and while said second frequency generating signal has an amplitude larger than a fixed value predetermined in terms of a maximum value of the amplitude.

58. An electric rotary machine as claimed in claim 50, wherein said minimum value is substantially zero.

* * * * *